(12) United States Patent
Akimoto et al.

(10) Patent No.: US 8,811,140 B2
(45) Date of Patent: Aug. 19, 2014

(54) RECORDABLE OPTICAL DISC, RECORDING DEVICE, AND RECORDING METHOD

(75) Inventors: Yoshihiro Akimoto, Tokyo (JP); Shoei Kobayashi, Tokyo (JP); Motoshi Ito, Kodoma (JP); Yasumori Hino, Kadoma (JP); Hiroyasu Inoue, Tokyo (JP); Harukazu Miyamoto, Tokyo (JP); Koichiro Nishimura, Totsuka-ku (JP); Sung-hee Hwang, Suwon-si (KR); In-oh Hwang, Seongnam-si (KR)

(73) Assignees: Sony Corporation, Tokyo (JP); Panasonic Corporation, Kadoma-shi (JP); TDK Corporation, Tokyo (JP); Hitachi Consumer Electronics Co., Ltd., Tokyo (JP); Samsung Electronics Co., Ltd., Suwon-si (KR)

( * ) Notice: Subject to any disclaimer, the term of this patent is extended or adjusted under 35 U.S.C. 154(b) by 55 days.

(21) Appl. No.: 13/060,606
(22) PCT Filed: Jul. 1, 2010
(86) PCT No.: PCT/JP2010/061573
§ 371 (c)(1),
(2), (4) Date: Apr. 29, 2011
(87) PCT Pub. No.: WO2011/002106
PCT Pub. Date: Jan. 6, 2011

(65) Prior Publication Data
US 2013/0201813 A1 Aug. 8, 2013

(30) Foreign Application Priority Data
Jul. 3, 2009 (JP) ................................. 2009-158452

(51) Int. Cl.
G11B 7/24 (2013.01)
(52) U.S. Cl.
USPC ...................................... 369/275.3
(58) Field of Classification Search
USPC ........................ 369/47.27, 53.22, 94, 275.3
See application file for complete search history.

(56) References Cited

U.S. PATENT DOCUMENTS 7,164,636 B2 * 1/2007 Ijtsma et al. ............... 369/47.53
7,379,410 B2 * 5/2008 Lee et al. ..................... 369/94
(Continued)

FOREIGN PATENT DOCUMENTS

JP 2004 255940 9/2004
JP 2004 295940 10/2004
(Continued)

OTHER PUBLICATIONS

International Search Report Issued Sep. 28, 2010 in PCT/JP10/061573 filed Jul. 1, 2010.

(Continued)

Primary Examiner — Brenda Bernardi
(74) Attorney, Agent, or Firm — Oblon, Spivak, McClelland, Maier & Neustadt, L.L.P.

(57) ABSTRACT

The present invention is to realize a proper inner zone layout in a quadruple-layer disk.
A test area is provided in the inner zone (inner circumference side area) in each of recording layers. If two test areas closer to the outer circumference, of four test areas, are defined as a first pair and two test areas closer to the inner circumference are defined as a second pair, the test areas of the first pair and the test areas of the second pair are so disposed as to be prevented from overlapping with each other in the layer direction. Two test areas of the first pair have the same consumption direction of the test area, and are so disposed that the areas to be used next hardly overlap with each other in the layer direction. Two test areas of the second pair have the same consumption direction of the test area opposite to the consumption direction of the test area in the first pair, and are so disposed that the areas to be used next hardly overlap with each other in the layer direction.

15 Claims, 26 Drawing Sheets

(56) References Cited

U.S. PATENT DOCUMENTS

| | | | |
|---|---|---|---|
| 7,583,573 B2 * | 9/2009 | Lee et al. | 369/47.51 |
| 7,933,184 B2 * | 4/2011 | Miyamoto et al. | 369/94 |
| 8,009,534 B2 * | 8/2011 | Sasa | 369/47.53 |
| 8,385,175 B2 * | 2/2013 | Akahoshi et al. | 369/59.25 |
| 8,411,546 B2 * | 4/2013 | Hwang et al. | 369/94 |
| 2004/0264339 A1 | 12/2004 | Miyagawa et al. | |
| 2006/0153055 A1 | 7/2006 | Suh | |
| 2007/0002483 A1 * | 1/2007 | Suh | 360/55 |
| 2007/0041308 A1 | 2/2007 | Muramatsu et al. | |
| 2007/0121449 A1 * | 5/2007 | Taniguchi et al. | 369/47.53 |
| 2008/0013438 A1 | 1/2008 | Park et al. | |
| 2008/0019239 A1 | 1/2008 | Miura et al. | |
| 2010/0039921 A1 * | 2/2010 | Shoji et al. | 369/275.3 |
| 2010/0214896 A1 * | 8/2010 | Miyamoto et al. | 369/53.41 |
| 2011/0305126 A1 * | 12/2011 | Hwang et al. | 369/47.14 |
| 2011/0310715 A1 * | 12/2011 | Hwang et al. | 369/47.14 |
| 2011/0317535 A1 * | 12/2011 | Miyamoto et al. | 369/53.41 |

FOREIGN PATENT DOCUMENTS

| | | |
|---|---|---|
| JP | 2005 38584 | 2/2005 |
| JP | 2006-127732 A | 5/2006 |
| JP | 2006-527457 A | 11/2006 |
| JP | 2008 527602 | 7/2008 |
| JP | 2009-514127 | 4/2009 |
| JP | WO2010/016264 A1 | 2/2010 |
| JP | 4616422 B2 | 10/2010 |
| KR | 10-2008-0006119 | 1/2008 |
| WO | 2005 034110 | 4/2005 |
| WO | WO 2006/035721 A1 | 4/2006 |
| WO | 2006 075645 | 7/2006 |
| WO | 2008 007898 | 1/2008 |
| WO | 2010 016264 | 2/2010 |

OTHER PUBLICATIONS

U.S. Appl. No. 13/060,602, filed Feb. 24, 2011, Akimoto, et al.

Chinese Office Action issued May 6, 2013 in Chinese Patent Application No. 201080003085.9 with English translation, 13 pages.

Japanese Office Action issued Jul. 23, 2013 in Japanese Patent Application No. 2009-158452, 17 pages.

Office Action issued Nov. 12, 2013 in Japanese Patent Application No. 2009-158452 (with English language translation).

* cited by examiner

F I G . 2

DMA

| CLUSTER NUMBER | CONTENTS | THE NUMBER OF CLUSTERS |
|---|---|---|
| 1-4 | DDS(SAME CONTENTS ARE REPEATED FOUR TIMES) | 4 |
| 5-8 | DFL#1 | 4 |
| 9-12 | DFL#2(SAME CONTENTS AS #1) | 4 |
| 13-16 | DFL#3(SAME CONTENTS AS #1) | 4 |
| 17-20 | DFL#4(SAME CONTENTS AS #1) | 4 |
| 21-24 | DFL#5(SAME CONTENTS AS #1) | 4 |
| 25-28 | DFL#6(SAME CONTENTS AS #1) | 4 |
| 29-32 | DFL#7(SAME CONTENTS AS #1) | 4 |

32 CLUSTERS

FIG. 3

DDS (DISC DEFINITION STRUCTURE)

| BYTE POSITION | CONTENTS | THE NUMBER OF BYTES |
|---|---|---|
| 0 | DDS IDENTIFIER = "DS" | 2 |
| 2 | DDS FORMAT NUMBER | 1 |
| 3 | RESERVE(00h) | 1 |
| 4 | THE NUMBER OF TIMES OF DDS UPDATING (= LAST TDDS SERIAL NUMBER) | 4 |
| 8 | RESERVE(00h) | 8 |
| 16 | STARTING PHYSICAL SECTOR ADDRESS OF DRIVE AREA IN DMA (AD_DRV) | 4 |
| 20 | RESERVE(00h) | 4 |
| 24 | STARTING PHYSICAL SECTOR ADDRESS OF DEFECT LIST IN DMA (AD_DFL) | 4 |
| 28 | RESERVE(00h) | 4 |
| 32 | STARTING PHYSICAL SECTOR ADDRESS OF USER DATA AREA | 4 |
| 36 | ENDING LOGICAL SECTOR ADDRESS OF USER DATA AREA | 4 |
| 40 | SIZE OF ALTERNATION AREA (ISA0) ON INNER CIRCUMFERENCE SIDE IN FIRST LAYER | 4 |
| 44 | SIZE OF ALTERNATION AREA (OSA0, OSA1) ON OUTER CIRCUMFERENCE SIDE | 4 |
| 48 | SIZE OF ALTERNATION AREA (ISA1) ON INNER CIRCUMFERENCE SIDE IN SECOND LAYER | 4 |
| 52 | ALTERNATION AREA AVAILABILITY FLAG | 1 |
| 53 | RESERVE(00h) | 65483 |

1 CLUSTER (65536 BYTES)

F I G. 4

DFL (DEFECT LIST)

| BYTE POSITION | CONTENTS | THE NUMBER OF BYTES |
|---|---|---|
| 0 | DEFECT LIST MANAGEMENT INFORMATION | 64 |
| 64 | ALTERNATION ADDRESS INFORMATION ati#1 | 8 |
| 72 | ALTERNATION ADDRESS INFORMATION ati#2 | 8 |
| | ALTERNATION ADDRESS INFORMATION ati#N | 8 |
| 64+8×N | ALTERNATION ADDRESS INFORMATION TERMINATION 00h | 8 |
| | 00h | |

4 CLUSTERS

DEFECT LIST MANAGEMENT INFORMATION OF DFL/TDFL

| BYTE NUMBER | CONTENTS | THE NUMBER OF BYTES |
|---|---|---|
| 0 | DFL IDENTIFIER = "DL" | 2 |
| 2 | DFL FORMAT NUMBER | 1 |
| 3 | RESERVE 00h | 1 |
| 4 | THE NUMBER OF TIMES OF DFL UPDATING | 4 |
| 8 | RESERVE 00h | 4 |
| 12 | THE NUMBER OF REGISTERED ENTRIES IN DFL (N_DFL) | 4 |
| 16 | RESERVE 00h | 8 |
| 24 | THE NUMBER OF UNRECORDED CLUSTERS IN ISA/OSA | 4 |
| 28 | RESERVE 00h | 36 |

64 BYTES

FIG. 6

ALTERNATION ADDRESS INFORMATION ati OF DFL/TDFL

| BIT b63···b60 | b59···b32 | b31···b28 | b27···b0 |
|---|---|---|---|
| STATUS 1 | ALTERNATION-SUBJECT (DEFECT) CLUSTER STARTING PHYSICAL SECTOR ADDRESS | RESERVE (0000) | ALTERNATIVE CLUSTER STARTING PHYSICAL SECTOR ADDRESS |

←──────── 8 BYTES ────────→

[STATUS 1]
0000·····NORMAL ALTERNATION
0101·····BURST TRANSFER STARTING ADDRESS
1010·····BURST TRANSFER ENDING ADDRESS
OTHER·····RESERVE

FIG. 7

TEMPORARY DMA (TDMA)

| CLUSTER NUMBER | CONTENTS | THE NUMBER OF CLUSTERS |
|---|---|---|
| 1 | SPACE BITMAP FOR LAYER0 | 1 |
| 2 | SPACE BITMAP FOR LAYER1 | 1 |
| 3 | TEMPORARY DEFECT LIST (TDFL) | 1~4 |
| | | |
| 2048 | | |

2048 CLUSTERS

FIG. 9

TDFL (TEMPORARY DEFECT LIST)

| BYTE POSITION | CONTENTS | THE NUMBER OF BYTES |
|---|---|---|
| 0 | DEFECT LIST MANAGEMENT INFORMATION | 64 |
| 64 | ALTERNATION ADDRESS INFORMATION ati#1 | 8 |
| 72 | ALTERNATION ADDRESS INFORMATION ati#2 | 8 |
| ... | ... | |
| 64+8×N | ALTERNATION ADDRESS INFORMATION ati#N | 8 |
| | ALTERNATION ADDRESS INFORMATION TERMINATION | 8 |
| | 00h | |
| 65536×N−2048 | TEMPORARY DDS (TDDS) | 2048 |

1 TO 4 CLUSTERS

FIG.10

TDDS (TEMPORARY DISC DEFINITION STRUCTURE)

| BYTE POSITION | CONTENTS | THE NUMBER OF BYTES |
|---|---|---|
| 0 | DDS IDENTIFIER = "DS" | 2 |
| 2 | DDS FORMAT NUMBER | 1 |
| 3 | RESERVE (00h) | 1 |
| 4 | TDDS SERIAL NUMBER | 4 |
| 8 | RESERVE (00h) | 8 |
| 16 | STARTING PHYSICAL SECTOR ADDRESS OF DRIVE AREA IN TDMA (AD_DRV) | 4 |
| 20 | RESERVE (00h) | 4 |
| 24 | STARTING PHYSICAL SECTOR ADDRESS OF TEMPORARY DEFECT LIST IN TDMA (AD_DFL) | 4 |
| 28 | RESERVE (00h) | 4 |
| 32 | STARTING PHYSICAL SECTOR ADDRESS OF USER DATA AREA | 4 |
| 36 | ENDING LOGICAL SECTOR ADDRESS OF USER DATA AREA | 4 |
| 40 | SIZE OF ALTERNATION AREA (ISA0) ON INNER CIRCUMFERENCE SIDE IN FIRST LAYER | 4 |
| 44 | SIZE OF ALTERNATION AREA (OSA0, OSA1) ON OUTER CIRCUMFERENCE SIDE | 4 |
| 48 | SIZE OF ALTERNATION AREA (ISA1) ON INNER CIRCUMFERENCE SIDE IN SECOND LAYER | 4 |
| 52 | ALTERNATION AREA AVAILABILITY FLAG | 1 |
| 53 | RESERVE (00h) | 971 |
| 1024 | PHYSICAL SECTOR ADDRESS OF LAST RECORDING OF USER DATA (LRA) | 4 |
| 1028 | STARTING PHYSICAL SECTOR ADDRESS OF LATEST SPACE BITMAP (FIST LAYER) IN TDMA (AD_BP0) | 4 |
| 1032 | STARTING PHYSICAL SECTOR ADDRESS OF LATEST SPACE BITMAP (SECOND LAYER) IN TDMA (AD_BP1) | 4 |
| 1036 | OVERWRITING FUNCTION AVAILABILITY FLAG (1:AVAILABLE) | 1 |
| 1037 | RESERVE (00h) | 1011 |

1 SECTOR (2048 BYTES)

FIG. 14

| L0 | START RADIUS | THE NUMBER OF CLUSTERS |
|---|---|---|
| BCA | 21.00 | - |
| PZ1 | 22.20 | - |
| PIC | 22.53 | 2720 |
| PZ2 | 23.09 | 300 |
| BUF | 23.13 | 3078 |
| INFO (#2) | 23.47 | 256 |
| OPC (L0) | 23.50 | 2048 |
| TDMA (#1) | 23.74 | 2048 |
| INFO (#1) | 23.97 | 256 |

| L1 | START RADIUS | THE NUMBER OF CLUSTERS |
|---|---|---|
| BCA | 21.00 | - |
| PZ1 | 22.20 | 2534 |
| BUF | 22.51 | 4101 |
| OPC (L1) | 23.00 | 2048 |
| RSV | 23.25 | 1894 |
| INFO (#4) | 23.47 | 256 |
| TDMA (#2) | 23.50 | 2048 |
| RSV | 23.74 | 2048 |
| INFO (#3) | 23.97 | 256 |

| L2 | START RADIUS | THE NUMBER OF CLUSTERS |
|---|---|---|
| BCA | 21.00 | - |
| PZ1 | 22.20 | 2534 |
| BUF | 22.51 | 200 |
| OPC (L2) | 22.53 | 2048 |
| RSV | 22.78 | 1600 |
| INFO (#3) | 22.97 | 256 |
| TDMA (#3) | 23.00 | 2048 |
| BUF | 23.25 | 6246 |
| INFO (#5) | 23.97 | 256 |

| L0 | START RADIUS | THE NUMBER OF CLUSTERS |
|---|---|---|
| BCA | 21.00 | - |
| PZ1 | 22.20 | - |
| PIC | 22.51 | 2720 |
| PZ2 | 23.09 | 300 |
| BUF | 23.13 | 814 |
| INFO (#2) | 23.23 | 256 |
| OPC (L0) | 23.26 | 2048 |
| BUF | 23.51 | 3794 |
| INFO (#1) | 23.97 | 256 |

| L1 | START RADIUS | THE NUMBER OF CLUSTERS |
|---|---|---|
| BCA | 21.00 | - |
| PZ1 | 22.20 | 2426 |
| BUF | 22.51 | 2500 |
| OPC (L1) | 22.82 | 2048 |
| INFO (#4) | 23.08 | 256 |
| TDMA (#1) | 23.11 | 2304 |
| BUF | 23.39 | 4778 |
| INFO (#3) | 23.97 | 256 |

| L2 | START RADIUS | THE NUMBER OF CLUSTERS |
|---|---|---|
| BCA | 21.00 | - |
| PZ1 | 22.20 | 2426 |
| BUF | 22.51 | 3268 |
| INFO (#6) | 22.92 | 256 |
| TDMA (#2) | 22.95 | 1280 |
| BUF | 23.11 | 3740 |
| OPC (L2) | 23.57 | 2048 |
| TDMA (#3) | 23.82 | 1280 |
| INFO (#5) | 23.97 | 256 |

| L3 | START RADIUS | THE NUMBER OF CLUSTERS |
|---|---|---|
| BCA | 21.00 | - |
| PZ1 | 22.20 | 2426 |
| OPC (L3) | 22.51 | 2048 |
| BUF | 22.77 | 6254 |
| INFO (#8) | 23.54 | 256 |
| TDMA (#4) | 23.57 | 3328 |
| INFO (#7) | 23.97 | 256 |

Gp:153 μm
Gi1:57 μm
Gi2:57 μm

Gf1:153 μm
Gf2:153 μm
Gtf:145 μm

FIG.20
(a) LAYOUT WHEN BUFFER IS ZERO
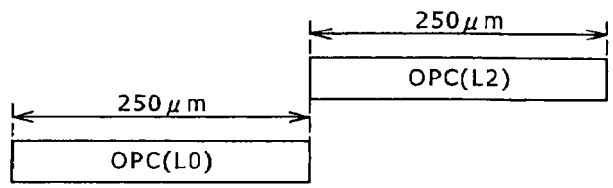
(b) WORST CASE WHEN MAXIMUM TOLERANCE IS 200 μm
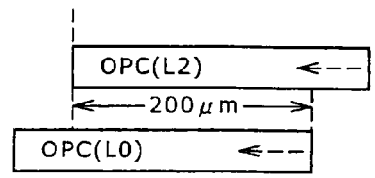
(c) WORST CASE WHEN MAXIMUM TOLERANCE IS 150 μm
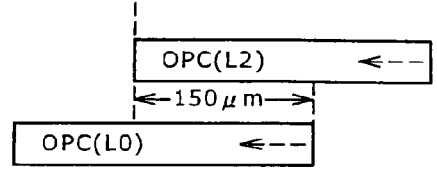
(d) LAYOUT WHEN BUFFER IS 50 μm
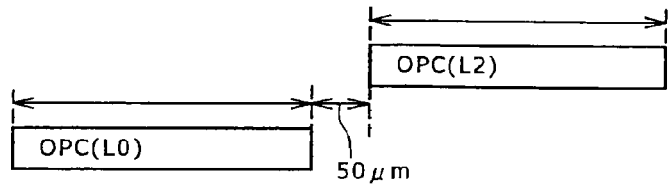
(e) WORST CASE WHEN BUFFER IS 50 μm AND MAXIMUM TOLERANCE IS 150 μm
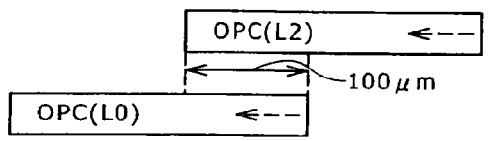

RECORDABLE OPTICAL DISC, RECORDING DEVICE, AND RECORDING METHOD

TECHNICAL FIELD

The present invention relates to a recordable optical disk such as a write-once disk and a rewritable disk, a recording device capable of dealing with a recordable optical disk, and a recording method.

BACKGROUND ART

Optical recording media such as the Blu-ray Disc (registered trademark) are known. In the optical recording media, recording and reproduction of information by use of a semiconductor laser are performed.

The recording to an optical disk by use of a semiconductor laser is greatly affected by variation in the laser power attributed to the temperature and change over time, various kinds of skews and offsets attributed to an adjustment error at the time of the manufacturing, and a recording condition gap in the drive control. Therefore, particularly for recordable optical disks such as a write-once disk and a rewritable disk, variation in the laser drive circuit and the optical element is suppressed and precise light-emission waveform control is carried out.

In an actual information recording device, in general, immediately before data recording, the optimum laser power is sought and the recording laser power and strategy are adjusted to optimize the recording condition by using the test write area (optimum power control (OPC) area) disposed in each recording layer.

In the trial writing process (test write) for this recording laser power adjustment, removal of the above-described perturbations, optimization of the recording power, and optimization of the laser drive pulse need to be carried out in the state in which the optimum recording condition is unclear.

In the seeking of the optimum condition, the test write area is irradiated with laser light having excessively-high energy and the laser irradiation is performed with an improper width of the laser drive pulse (laser emission time) depending on the case. Thus, serious damage is possibly given to the test writing area in the recording layer.

Furthermore, in a so-called multi-layer optical disk, in which plural recording layers are formed over a disk substrate, recording/reproduction of a certain recording layer is affected by another recording layer.

For example, change in the transmittance of a recording layer attributed to recording occurs, which possibly precludes light irradiation of the intended recording layer with a proper amount of light.

Moreover, the transmittance change has a dependency on the recording power. Therefore, the transmittance change, i.e. the degree of the influence on the other recording layers, cannot be controlled in a place where recording is performed with variation in the recording power like the OPC area.

These facts lead to a problem that the desired OPC control cannot be realized and derivation of the accurate optimization condition is difficult depending on the recording statuses of the other recording layers.

Specifically, in the case of performing trial writing in the OPC area in a certain recording layer and adjusting the laser power, this trial writing is affected by the test write area that is in another recording layer and disposed at the same position in the planar direction (disk radial direction) as that of this OPC area (i.e. such a position as to overlap with this OPC area in the thickness direction (=layer direction)).

To address this problem, as the related arts, there have been devised a method in which the test writing areas in different recording layers are mutually shifted along the radial direction of the recording layer and a method in which the same radial position is not used for trial writing between the trial writing areas in different recording layers, as is seen in Patent Document 1 shown below, for example.

Also in the double-layer standard of the existing Blu-ray Disc, it is prescribed that the test writing areas of the respective recording layers, disposed in the lead-in zone on the disk inner circumference side, are so disposed as to be shifted from each other along the radial direction of the recording layer.

PRIOR ART DOCUMENTS

Patent Document

Patent Document 1: PCT Patent Publication No. WO05/034110 brochure

Patent Document 2: Japanese Patent Laid-open No. 2004-295940

SUMMARY OF INVENTION

By the way, for the information recording media, increase in the recording capacity thereof is always required. For example, in the case of the Blu-ray Disc, it is envisaged that further increase in the number of recording layers will be advanced for a triple-layer structure and a quadruple-layer structure and significant increase in the capacity will be realized.

In the development of the quadruple-layer optical disk, it is difficult to design the OPC areas in the respective recording layers and design the areas where various kinds of management information are recorded and reproduced.

One of the reasons therefor is as follows. Because transmittance change occurs due to operation of recording to a recording layer as described above, OPC operation and recording/reproduction operation are affected by another layer. Therefore, the areas need to be designed in view of this point.

Moreover, due to the dependency of the transmittance change on the recording power, the degree of the influence on the other layers is indefinite and the transmittance change cannot be predicted. This is also included in the reasons.

Furthermore, in the design of the OPC areas and the management information areas, compatibility with the existing single-layer disk and double-layer disk is also taken into consideration. Thus, all the necessary areas need to be properly arranged in the predetermined limited radial range (e.g. in the lead-in area).

There is a need for the present invention to consider the above-described points and propose an area arrangement suitable for a recordable quadruple-layer optical disk.

According to an embodiment of the present invention, there is provided a recordable optical disk including four recording layers configured to be provided over a disk substrate, and an optically-transparent layer configured to be formed on the laser-incident surface side. In this recordable optical disk, four test areas for laser power control are each provided in an inner circumference side area closer to the inner circumference than a data zone in which user data is recorded in a respective one of the recording layers. Furthermore, the test areas of a first pair and the test areas of a second pair are so disposed as to be prevented from overlapping with each other in the layer direction if two test areas closer to the disk outer circumference, of four test areas, are defined as the first pair and two test areas closer to the disk inner circumference, of four test areas, are defined as the second pair.

Further, the two test areas of the first pair have the same consumption direction of the test area, and are so disposed that parts to be used next in the test areas are prevented from overlapping with each other in the layer direction.

Still further, the two test areas of the second pair have the same consumption direction of the test area opposite to the consumption direction of the test area in the first pair, and are so disposed that parts to be used next in the test areas are prevented from overlapping with each other in the layer direction.

Still further, the two test areas of the first pair have the same consumption direction of the test area as a first consumption direction, and the test area in the recording layer closer to the disk substrate, of the two test areas of the first pair, is located ahead of the test area in the recording layer closer to a laser-incident surface, of the two test areas of the first pair, in the first consumption direction.

Still further, the two test areas of the second pair have the same consumption direction of the test area as a second consumption direction opposite to the first consumption direction, and the test area in the recording layer closer to the disk substrate, of the two test areas of the second pair, is located ahead of the test area in the recording layer closer to the laser-incident surface, of the two test areas of the second pair, in the second consumption direction.

Specifically, the optical disk has a diameter of 12 cm. In the optical disk: each of the test areas is formed with a radial width of about 250 μm in a range of 22.5 mm to 24.0 mm as a range of a radial position of the optical disk; the recording layers are so formed that a relative error in a radial position of the recording layers is within a tolerance of about 150 μm; an innermost circumference radial position of the test areas of the first pair and an outermost circumference radial position of the test areas of the second pair are disposed at positions that do not overlap with each other in the layer direction and have a gap distance of at least about 150 μm along a radial direction if the relative error in the radial position is zero; the two test areas of the first pair are formed at positions that do not overlap with each other in the layer direction and have a gap distance of at least about 50 μm along the radial direction if the relative error in the radial position is zero; and the two test areas of the second pair are formed at positions that do not overlap with each other in the layer direction and have a gap distance of at least about 50 μm along the radial direction if the relative error in the radial position is zero.

Further, in the recordable optical disk, a management information recording/reproduction area for recording and reproduction of management information is provided in the inner circumference side area in each of the recording layers, and the management information recording/reproduction areas are so disposed that, for each of the test areas in the recording layers, the number of management information recording/reproduction areas overlapping with the test area in the layer direction at a position closer to a laser-incident surface than the test area is equal to or smaller than one.

Still further, the management information recording/reproduction areas are each so disposed as to be prevented from overlapping with the test areas in the recording layers in the layer direction on a disk substrate side of the test areas.

Still further, the management information recording/reproduction area includes a definitive management information area in which latest management information is stored, and the definitive management information areas are so disposed as to be separated from each other by at least a distance equivalent to an allowable defect size in all of the recording layers.

Still further, the management information recording/reproduction area includes a temporary management information area in which management information is additionally stored on an as-needed basis, and the temporary management information area is disposed in the recording layers except the recording layer closest to the disk substrate substantially evenly.

According to another embodiment of the present invention, there is provided a recording device including a controller configured to dispose a test area for laser power control in an inner circumference side area closer to the inner circumference than a data zone in which user data is recorded in each of the recording layers of the above-described recordable optical disk in such a way that the test areas of a first pair and the test areas of a second pair are prevented from overlapping with each other in the layer direction if two test areas closer to the disk outer circumference, of four test areas formed in the recording layers, are defined as the first pair and two test areas closer to the disk inner circumference, of four test areas, are defined as the second pair. The controller carries out control to perform information recording after laser power adjustment by use of the disposed test area.

The controller carries out control relating to test write for laser power adjustment so that parts to be used next in the test areas are prevented from overlapping with each other in the layer direction for the two test areas in each of the first pair and the second pair.

For example, the controller determines whether or not a necessary gap distance dependent on an allowable tolerance relating to overlapping of the recording layers is ensured as a gap distance between the part to be used next in one of the test areas and the part to be used next in the other of the test areas about two test areas in a pair as the first pair or the second pair, and the controller executes processing of changing a start position of the part to be next used in at least one of the test areas if the necessary gap distance is not ensured, to thereby prevent the parts to be used next in the test areas from overlapping with each other in the layer direction for the two test areas in the pair.

According to still another embodiment of the present invention, there is provided a recording method including the step of disposing test areas in such a way that the test areas of the above-described first pair and the test areas of the above-described second pair are prevented from overlapping with each other in the layer direction, and performing information recording after laser power adjustment by use of the disposed test area.

According to further embodiment of the present invention, there is provided a recording device for a recordable optical disk that includes four recording layers provided over a disk substrate and an optically-transparent layer formed on the laser-incident surface side and has the following characteristics. Specifically, four test areas for laser power control are each provided in an inner circumference side area closer to the inner circumference than a data zone in which user data is recorded in a respective one of the recording layers. The test areas of a first pair and the test areas of a second pair are so disposed as to be prevented from overlapping with each other in the layer direction if two test areas closer to the disk outer circumference, of four test areas, are defined as the first pair and two test areas closer to the disk inner circumference, of four test areas, are defined as the second pair. A management information recording/reproduction area for recording and reproduction of management information is provided in the inner circumference side area in each of the recording layers. The management information recording/reproduction areas are so disposed that, for each of the test areas in the recording layers, the number of management information recording/reproduction areas overlapping with the test area in the layer direction at a position closer to a laser-incident surface than this test area is equal to or smaller than one. The recording device includes a controller configured to manage, of the management information recording/reproduction area, a temporary management information area that is so disposed that capacity is substantially even in the recording layers in which the temporary management information area is allowed to be disposed. The controller carries out control to record management information of alternation recording by using the temporary management information area.

According to another embodiment of the present invention, there is provided a recording method including the step of managing a temporary management information area that is so disposed that capacity is substantially even in recording layers in which the temporary management information area is allowed to be disposed, and recording management information of alternation recording by using the temporary management information area.

In these embodiments of the present invention, first the test area (OPC area) is formed in the inner circumference side area in each of four recording layers.

Consideration is so given that the test areas in the respective recording layers are prevented from overlapping with each other in the layer direction. This is to prevent the test area in each recording layer from being affected by transmittance change due to recording in the test area in another layer and the dependency of the transmittance change on the laser power.

For this purpose, four OPC areas are divided into the first pair and the second pair, and first the test areas of the first pair and the test areas of the second pair are so disposed as to be prevented from overlapping with each other in the layer direction. For the test areas in each pair, the apparent gap distance is ensured by preventing the parts to be used next from overlapping with each other.

Furthermore, the number of management information recording/reproduction areas overlapping with the test area in the layer direction at a position closer to the laser-incident surface than this test area is set equal to or smaller than one, to thereby minimize the influence of the transmittance change due to recording in the management information recording/reproduction area on the OPC operation in the test area and achieve compatibility with the existing double-layer disk.

The management information recording/reproduction areas are each so disposed as to be prevented from overlapping with the test areas in the respective recording layers in the layer direction on the disk substrate side of the test areas. Thereby, recording/reproduction in the management information recording/reproduction area is prevented from being affected by transmittance change of the test area and the dependency of the transmittance change on the laser power.

The embodiments of the present invention offer an advantage that, in a recordable multi-layer optical disk such as a quadruple-layer disk, proper arrangement in the inner circumference side area can be realized and proper OPC operation and recording/reproduction of management information are allowed.

BRIEF DESCRIPTION OF DRAWINGS

FIG. 2 is an explanatory diagram of a DMA in the disk of the embodiment.

FIG. 3 is an explanatory diagram of the contents of a DDS in the disk of the embodiment.

FIG. 4 is an explanatory diagram of the contents of a DFL in the disk of the embodiment.

FIG. 6 is an explanatory diagram of alternation address information in the DFL and the TDFL in the disk of the embodiment.

FIG. 7 is an explanatory diagram of a TDMA in the disk of the embodiment.

FIG. 9 is an explanatory diagram of the TDFL in the disk of the embodiment.

FIG. 10 is an explanatory diagram of a TDDS in the disk of the embodiment.

FIG. 14 is an explanatory diagram of the positions of the respective areas in the inner zone of the novel triple-layer BD-R.

FIG. 18 is an explanatory diagram of the positions of the respective areas in the inner zone of the quadruple-layer BD-R of the embodiment.

FIG. 20 is explanatory diagrams of OPC arrangement in the pair in the quadruple-layer disk of the embodiment.

MODE FOR CARRYING OUT THE INVENTION

An embodiment of the present invention will be described below in the following order.
[1. Disk Structure]
[2. DMA]
[3. TDMA]
[4. Plural-layer Disk/Inner Zone of Existing Double-layer Disk]

[5. Inner Zone of Newly-developed Triple-layer Disk]
[6. Inner Zone of Quadruple-layer Disk of Embodiment]
[7. Disk Drive Device]
[1. Disk Structure]

First, the outline of an optical disk of the embodiment will be described. This optical disk can be implemented as a write-once disk (BD-R) or a rewritable disk (BD-RE) in the category of a high-density optical disk system referred to as the so-called Blu-ray Disc.

One example of the physical parameters of the high-density optical disk of the present embodiment will be described.

As the disk size of the optical disk of the present example, the diameter is 120 mm and the disk thickness is 1.2 mm. That is, from these points, this optical disk is the same as a disk of the CD (Compact Disc) system and a disk of the DVD (Digital Versatile Disc) system in terms of the external form.

A so-called blue laser is used as the laser for recording/reproduction, and a high NA (e.g. 0.85) is set for the optical system. Furthermore, a narrow track pitch (e.g. 0.32 µm) and high linear density (e.g. the recording linear density is 0.12 µm/bit) are realized. Based on these features, about 23 to 25 gigabytes (GB) is realized as the user data capacity in the 12-cm-diameter disk. Furthermore, it is considered that capacity of about 30 GB is also permitted by higher-density recording.

In addition, a so-called multi-layer disk having plural recording layers has also been developed. In the multi-layer disk, the user data capacity is multiplied by the number of layers substantially.

Figure 1:
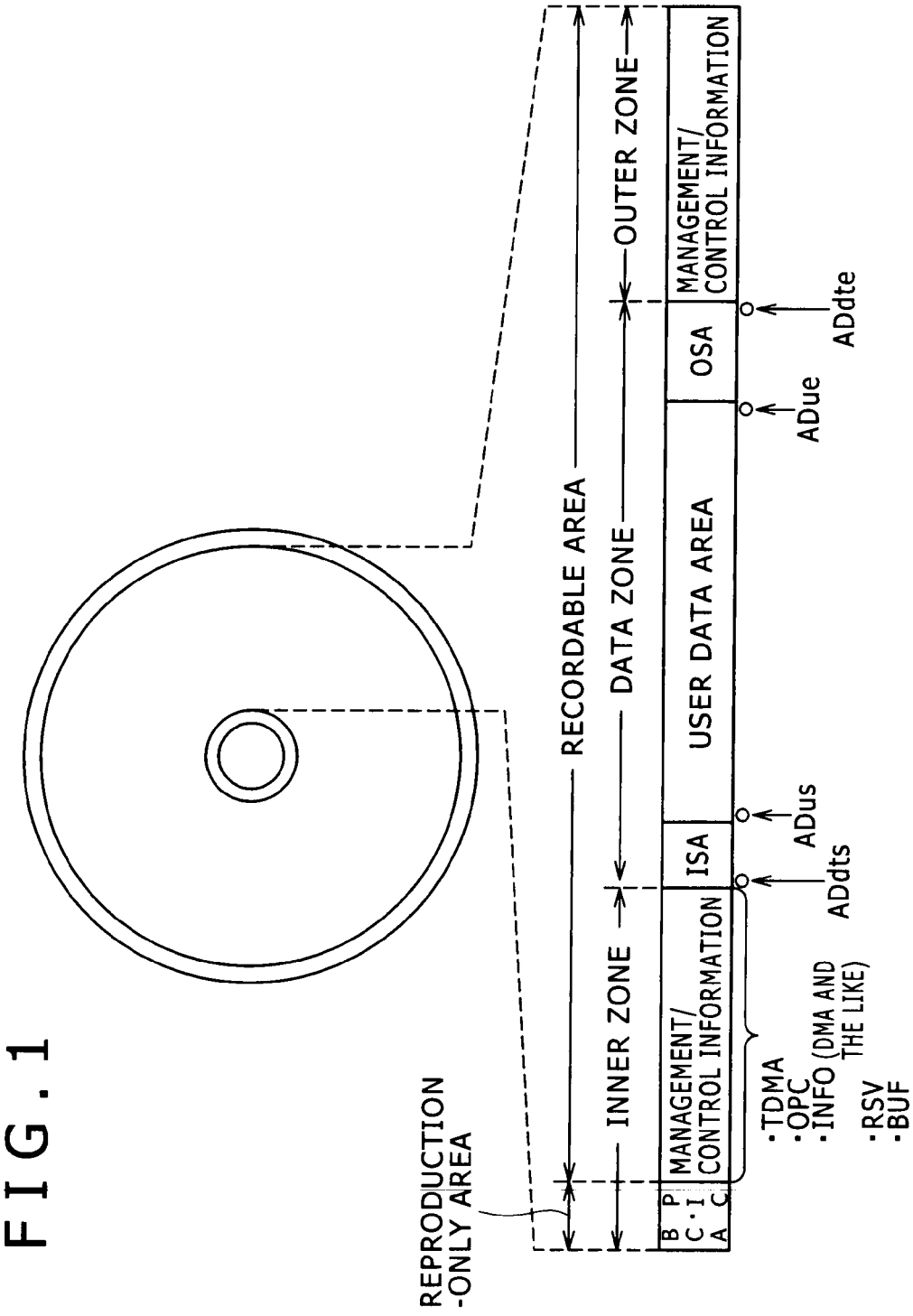
FIG. 1 is an explanatory diagram of the area structure of a disk according to an embodiment of the present invention.

FIG. 1 shows the layout (area configuration) of the entire disk.

As the areas on the disk, the inner zone, the data zone, and the outer zone are disposed from the inner circumference side.

In FIG. 1, the disk is shown with a structure including one recording layer (single-layer structure). In this case, the inner zone serves as the lead-in area, and the outer zone serves as the lead-out area.

The disk of the embodiment is a quadruple-layer disk as described later. In this disk, the inner zone of the first layer (layer L0) serves as the lead-in area. Finally, any of the outer zone of the first layer (layer L0) and the subsequent zones (the inner zones and the outer zones of layers L1, L2, and L3) is employed as the lead-out area depending on user data capacity recorded thereon.

For convenience of description, the inner circumference side areas of the respective recording layers, including the lead-in area of the first layer (layer L0), will be referred to collectively as the inner zone. Furthermore, the outer circumference side areas of the respective recording layers will be referred to collectively as the outer zone.

In terms of the area configuration relating to recording and reproduction, the area on the innermost circumference side, of the inner zone (lead-in area), is used as the reproduction-only area, and the area from the middle of the inner zone to the outer zone is used as the recordable area.

In the reproduction-only area, a BCA (Burst Cutting Area) and PIC (pre-recorded information area) are provided. However, in the inner zone structure of a multi-layer disk having two or more layers, the PIC is provided only in the first layer (layer L0) and the part of the same radius as that of the PIC serves as the recordable area in the second layer (layer L1) and the subsequent recording layers, as described in detail later.

In the recordable area in the inner zone, OPC, TDMA, INFO (including DMA and so forth), a reserve area RSV, etc., which will be described later, are formed for recording of management/control information and so forth.

In the reproduction-only area and the recordable area, the recording track based on a wobbling groove (serpentine trench) is formed into a spiral shape. The groove is used as the guide of the tracking in tracing by a laser spot, and data recording/reproduction is performed with this groove used as the recording track.

The present example is based on the assumption of an optical disk in which data is recorded in the groove. However, the embodiment of the present invention is not limited to an optical disk of such a groove recording system but may be applied to an optical disk of a land recording system, in which data is recorded in the land between the grooves. Furthermore, it can be applied also to an optical disk of a land-and-groove recording system, in which data is recorded in the groove and the land.

The groove used as the recording track has a serpentine shape corresponding to a wobble signal. Therefore, in a disk drive device for the optical disk, the wobble signal can be reproduced by detecting both edge positions of the groove from reflected light of the laser spot emitted onto the groove and extracting a fluctuation component of both edge positions in the disk radial direction while the laser spot is moved along the recording track.

In this wobble signal, address information (physical address, other pieces of additional information, etc.) of the recording track at the recording position thereof is modulated. Thus, in the disk drive device, address control and so forth in data recording/reproduction can be carried out by demodulating the address information and so forth from this wobble signal.

The inner zone shown in FIG. 1 is the area inside the position of radius 24 mm for example.

In the PIC (pre-recorded information area) in the inner zone, disk information such as the recording and reproduction power conditions, information on the areas on the disk, information used for copy protection, etc. are recorded in advance as reproduction-only information by the wobbling of the groove. These pieces of information may be recorded by embossed pits or the like.

The BCA is provided closer to the inner circumference than the PIC. The BCA is made by recording the unique ID specific to the disk recording medium by e.g. a recording system of burning out the recording layer. Specifically, recorded data in a bar-code manner is formed by forming recording marks aligned in the form of concentric circles.

Furthermore, in the inner zone, a predetermined area format having a TDMA (Temporary Defect Management Area), an OPC (Optimum Power Control area: test write area), an INFO (Information area: management information area), a reserve area RSV, a buffer area BUF, and so forth is set.

The OPC is used for e.g. trial writing in setting the data recording/reproduction condition such as the laser power at the time of recording/reproduction. That is, it is the area for adjustment of the recording/reproduction condition.

The INFO includes a DMA (Defect Management Area) and a control data area.

In the control data area, e.g. the disk type, the disk size, the disk version, the layer structure, the channel bit length, BCA information, the transfer rate, data zone position information, the recording linear velocity, and information on the recording/reproduction laser power are recorded.

The DMA is provided in the INFO. In general, in the field of the optical disk, alternation management information for defect management is recorded in the DMA. However, in the disk of the present example, management/control information for realizing not only alternation management for a defect place but also data rewriting in this write-once disk is recorded in the DMA. In this case in particular, management information of ISA and OSA to be described later is recorded in the DMA.

To allow data rewriting by utilizing alternation processing, the contents of the DMA also need to be updated responding to the data rewriting. The TDMA is provided for this updating.

The alternation management information is additionally recorded to the TDMA and updated. In the DMA, the last (latest) alternation management information recorded in the TDMA finally is recorded.

The details of the DMA and the TDMA will be described later.

The INFO including the DMA and so forth is the definitive management information area in which the latest management information is finally stored. The INFO (definitive management information area) is disposed separately from each other by at least the distance equivalent to the allowable defect size in all the recording layers.

On the other hand, the TDMA is the temporary management information area in which management information is additionally stored on an as-needed basis. The TDMA (temporary management information area) is disposed in each recording layer almost evenly for example. In some cases, it is disposed in the plural recording layers except the recording layer closest to the disk substrate almost evenly as described later for an example of the quadruple-layer disk.

The area closer to the outer circumference than the inner zone, specifically e.g. the area corresponding to the radius range of 24.0 to 58.0 mm, is used as the data zone. The data zone is the area where user data are actually recorded and reproduced. The starting address ADdts and ending address ADdte of the data zone are indicated by the data zone position information in the above-described control data area.

In the data zone, an ISA (Inner Spare Area) is provided on the innermost circumference side of the data zone and an OSA (Outer Spare Area) is provided on the outermost circumference side of the data zone. The ISA and OSA are used as an alternation area for a defect and data rewriting (overwriting).

The ISA is formed from the start position of the data zone with a size equivalent to a predetermined number of clusters (one cluster=65536 bytes).

The OSA is formed from the end position of the data zone toward the inner circumference with a size equivalent to a predetermined number of clusters. The sizes of the ISA and OSA are described in the above-described DMA.

The leg sandwiched between the ISA and OSA in the data zone is used as the user data area. This user data area is the normal recording/reproduction area used for recording and reproduction of user data normally.

The position of the user data area, i.e. a starting address ADus and an ending address ADue, are described in the DMA.

The area closer to the outer circumference than the data zone, specifically e.g. the area corresponding to the radius range of 58.0 to 58.5 mm, is used as the outer zone (e.g. lead-out zone). Management/control information is recorded also in the outer zone. Specifically, INFO (control data area, DMA, buffer area) is formed in a predetermined format.

In the control data area, various kinds of management/control information are recorded similarly to the control data area in the inner zone for example. The DMA is prepared as the area in which management information of the ISA and OSA is recorded similarly to the DMA in the inner zone.

The present embodiment has features regarding the structure of the inner zone of a quadruple-layer disk. The layout of the respective areas in the inner zone will be described later, including an existing double-layer disk and a newly-developed triple-layer disk.

[2. DMA]

The structure of the DMA recorded in the inner zone and the outer zone will be described below. FIG. 2 shows the structure of the DMA.

Here, an example in which the size of the DMA is 32 clusters (32×65536 bytes) is shown. The cluster is the minimum unit of data recording.

Of course, the DMA size is not limited to 32 clusters. In FIG. 2, 32 clusters are given cluster numbers 1 to 32 to thereby indicate the data position of each of the contents in the DMA. Furthermore, the size of each of the contents is indicated as the number of clusters.

In the DMA, in the leg of four clusters with cluster numbers 1 to 4, detailed information on the disk is recorded as the disk definition structure (DDS).

The contents of this DDS will be described later with FIG. 3. The DDS has a size of one cluster and is repeatedly recorded four times in this four-cluster leg.

The leg of four clusters with cluster numbers 5 to 8 serves as the first recording area for a defect list DFL (DFL#1). The structure of the defect list DFL will be described later with FIG. 4. The defect list DFL is data having a size of four clusters, and individual pieces of alternation address information are listed therein.

The leg of four clusters with cluster numbers 9 to 12 serves as the second recording area for the defect list DFL (DFL#2).

Furthermore, the recording areas for the third and subsequent defect lists DFL#3 to DFL#6 are prepared by each group of four clusters, so that the leg of four clusters with cluster numbers 29 to 32 serves as the seventh recording area for the defect list DFL (DFL#7).

That is, in the DMA composed of 32 clusters, seven recording areas for the defect lists DFL#1 to DFL#7 are prepared.

In the case of a BD-R (write-once optical disk), processing of closing needs to be executed to record the contents of this DMA. In this case, all of seven defect lists DFL#1 to DFL#7 written in the DMA include the same contents. The written contents are equal to the contents of the latest TDMA.

In a BD-RE (rewritable optical disk), the TDMA is not provided. This is because the DMA may be rewritten every time recording is performed.

The contents of the DDS recorded at the beginning of the DMA of FIG. 2 are shown in FIG. 3.

As described above, the DDS has a size of one cluster (=65536 bytes).

In FIG. 3, the "byte position" shows byte 0 as the beginning byte of the DDS composed of 65536 bytes. "The number of bytes" indicates the number of bytes of each of the data contents.

In two bytes at byte positions 0 and 1, a DDS identifier="DS" for recognition that this cluster is a cluster of the DDS is recorded.

In one byte at byte position 2, the DDS format number (version of the format) is indicated.

In four bytes at byte positions 4 to 7, the number of times of updating of the DDS is recorded. In the present example, the DMA itself is not updated, but alternation management information is written thereto at the time of closing. The alternation management information is updated in the TDMA. Therefore, when the closing is finally carried out, the number of times of updating of the DDS (TDDS: temporary DDS) in the TDMA is recorded at these byte positions.

In four bytes at byte positions 16 to 19, the starting physical sector address of the drive area in the DMA (AD DRV) is recorded.

In four bytes at byte positions 24 to 27, the starting physical sector address of the defect list DFL in the DMA (AD DFL) is recorded.

Four bytes at byte positions 32 to 35 indicate the beginning position of the user data area in the data zone, i.e. the position at which the LSN (logical sector number: logical sector address) is "0," by the PSN (physical sector number: phisical sector address).

Four bytes at byte positions 36 to 39 indicate the end position of the user data area in the data zone by the LSN (logical sector address).

In four bytes at byte positions 40 to 43, the size of the ISA (ISA of a single-layer disk or ISA in layer 0 of a double-layer disk) in the data zone is indicated.

In four bytes at byte positions 44 to 47, the size of the OSA in the data zone is indicated.

In four bytes at byte positions 48 to 51, the size of the ISA (ISA in layer 1 of a double-layer disk) in the data zone is indicated.

In one byte at byte position 52, an alternation area availability flag indicating whether or not data can be rewritten by using the ISA or OSA is indicated. When the whole of the ISA or the OSA has been used, the alternation area availability flag indicates that.

The byte positions other than the above-described positions are regarded as reserves (undefined), and 00h is set at all of these byte positions.

As just described, the DDS includes the addresses of the user data area, the sizes of the ISA and the OSA, and the alternation area availability flag. That is, the DDS is used as management/control information for area management of the ISA and the OSA in the data zone.

Next, the structure of the defect list DFL is shown in FIG. 4.

As described with FIG. 2, the defect list DFL is recorded in the recording area of four clusters.

In FIG. 4, the data position of each of the data contents in the defect list DFL composed of four clusters is shown as the "byte position." The relationship of one cluster=32 sectors=65536 bytes holds, and one sector=2048 bytes.

"The number of bytes" indicates the number of bytes as the size of each of the data contents.

The beginning 64 bytes in the defect list DFL are used as defect list management information.

In this defect list management information, information for recognition that these clusters are clusters of the defect list, the version, the number of times of updating of the defect list, the number of entries in the defect list, etc. are recorded.

At byte position 64 and the subsequent byte positions, pieces of alternation address information ati each composed of eight bytes are recorded as the contents of the entries in the defect list.

Immediately after the last effective alternation address information ati#N, terminator information that is composed of eight bytes and serves as the alternation address information termination is recorded.

In this DFL, 00h is set in all the bytes from the byte subsequent to the alternation address information termination to the last of the clusters.

Figure 5:
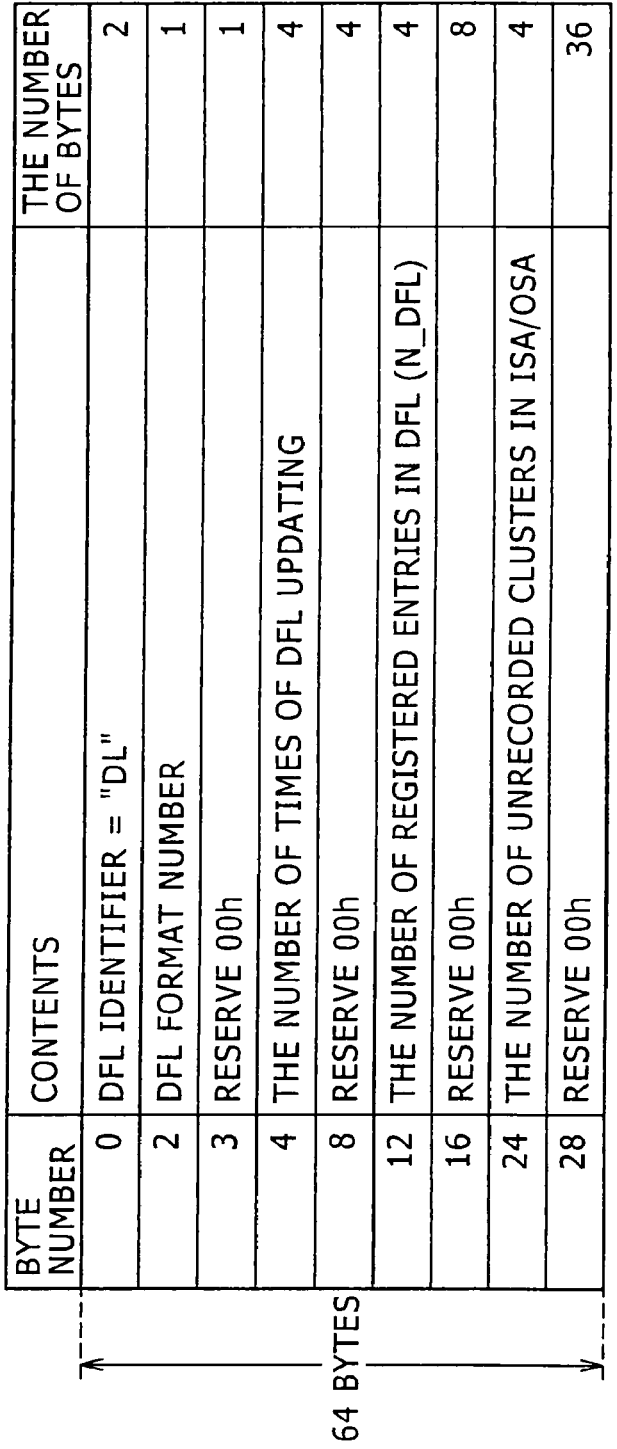
FIG. 5 is an explanatory diagram of defect list management information in the DFL and a TDFL in the disk of the embodiment.

The defect list management information composed of 64 bytes is as shown in FIG. 5.

In two bytes from byte position 0, a character string "DL" is recorded as the identifier of the defect list DFL.

One byte at byte position 2 indicates the format number of the defect list DFL.

Four bytes from byte position 4 indicate the number of times of updating of the defect list DFL. This number is the value following the number of times of updating of a temporary defect list TDFL to be described later.

Four bytes from byte position 12 indicate the number of entries in the defect list DFL, i.e. the number of pieces of the alternation address information ati.

Four bytes from byte position 24 indicate the size of the free area in each of alternation areas ISA0, ISA1, OSA0, and OSA1 by the number of clusters.

The byte positions other than the above-described positions are used as reserves, and 00h is set at all of these byte positions.

FIG. 6 shows the structure of the alternation address information ati. Specifically, the alternation address information ati indicates the contents of the entry resulting from alternation processing.

The maximum total number of pieces of the alternation address information ati is 32759 in the case of a single-layer disk.

One piece of the alternation address information ati is composed of eight bytes (64 bits). The respective bits are represented as bits b63 to b0.

In bits b63 to b60, status information (status 1) of the entry is recorded.

In the DFL, the status information is set to "0000," which indicates a normal alternation processing entry.

The other status information values will be described later in description of the alternation address information ati in the TDFL in the TDMA.

In bits b59 to b32, the starting physical sector address PSN of the alternation-subject cluster is indicated. Specifically, the cluster replaced due to a defect or rewriting is indicated by the physical sector address PSN of the beginning sector of the cluster.

Bits b31 to b28 are used as a reserve. Alternatively, another piece of status information (status 2) of the entry may be recorded therein.

In bits b27 to b0, the starting physical sector address PSN of the alternative cluster is indicated.

Specifically, if a cluster is replaced due to a defect or rewriting, the cluster as the alternative thereto is indicated by the physical sector address PSN of the beginning sector of the cluster.

The above-described alternation address information ati is regarded as one entry, and the alternation-subject cluster and the alternative cluster relating to one round of alternation processing are indicated.

Such entries are registered in the defect list DFL having the structure of FIG. 4.

In the DMA, alternation management information is recorded with the above-described data structure. However, as described above, the time to record these pieces of information in the DMA is when closing of the disk is carried out. At this time, the latest alternation management information in the TDMA is reflected.

Alternation processing for defect management and data rewriting and updating of the alternation management information in response to the alternation processing are carried out in the TDMA to be described next.

[3. TDMA]

The TDMA provided in the inner zone will be described below. The TDMA (temporary DMA) is used as the area in which alternation management information is recorded as with the DMA. However, the TDMA is updated through additional recording of the alternation management information therein in response to the occurrence of alternation processing for data rewriting or detection of a defect.

FIG. 7 shows the structure of the TDMA.

The size of the TDMA is e.g. 2048 clusters.

As shown in the diagram, in the first cluster given cluster number 1, a space bitmap for layer 0 is recorded.

The space bitmap is made by allocating one bit to each of the clusters of the data zone serving as the main data area and the inner zone and the outer zone, which are the areas in which management/control information is recorded. The space bitmap is used as writing-presence/absence presenting information that is so configured as to indicate whether or not writing has been completed in the respective clusters by the one-bit values.

Although one bit is allocated to each of all the clusters from the inner zone to the outer zone in the space bitmap, this space bitmap can be configured with a size of one cluster.

The cluster of cluster number 1 is used as the space bitmap for layer L0 (first layer). The cluster of cluster number 2 is used as the space bitmap for layer L1 (second layer). Although not shown in the diagram, in the case of a triple-layer disk and a quadruple-layer disk, the space bitmaps for layer L2 (third layer) and layer L3 (fourth layer) are prepared in clusters of predetermined cluster numbers. For example, cluster numbers 3 and 4 are allocated to these space bitmaps.

In the TDMA, a TDFL (Temporary Defect List) is additionally recorded in the beginning cluster of the unrecorded area in the TDMA if alternation processing is executed because of change of data content or the like. Therefore, in the case of a double-layer disk, the first TDFL is recorded at the position of cluster number 3 as shown in the diagram. In the case of a single-layer disk, the first TDFL is recorded at the position of cluster number 2 because the space bitmap for layer L1 is unnecessary. From then on, in response to the occurrence of alternation processing, the TDFL is additionally recorded at the cluster positions with the intermediary of no unrecorded area between the recorded clusters.

The size of the TDFL is in the range of one cluster to four clusters.

Because the space bitmap is information indicating the writing status of each cluster, it is updated responding to the occurrence of data writing. In this case, the new space bitmap is recorded from the beginning of the free area in the TDMA similarly to the TDFL.

That is, in the TDMA, the space bitmap or the TDFL is additionally recorded on an as-needed basis.

As described next about the configurations of the space bitmap and the TDFL, a TDDS (temporary DDS (temporary disc definition structure)) as detailed information of the optical disk is recorded in the rearmost sector (2048 bytes) of one cluster used as the space bitmap and the rearmost sector (2048 bytes) of one to four clusters used as the TDFL.

Figure 8:
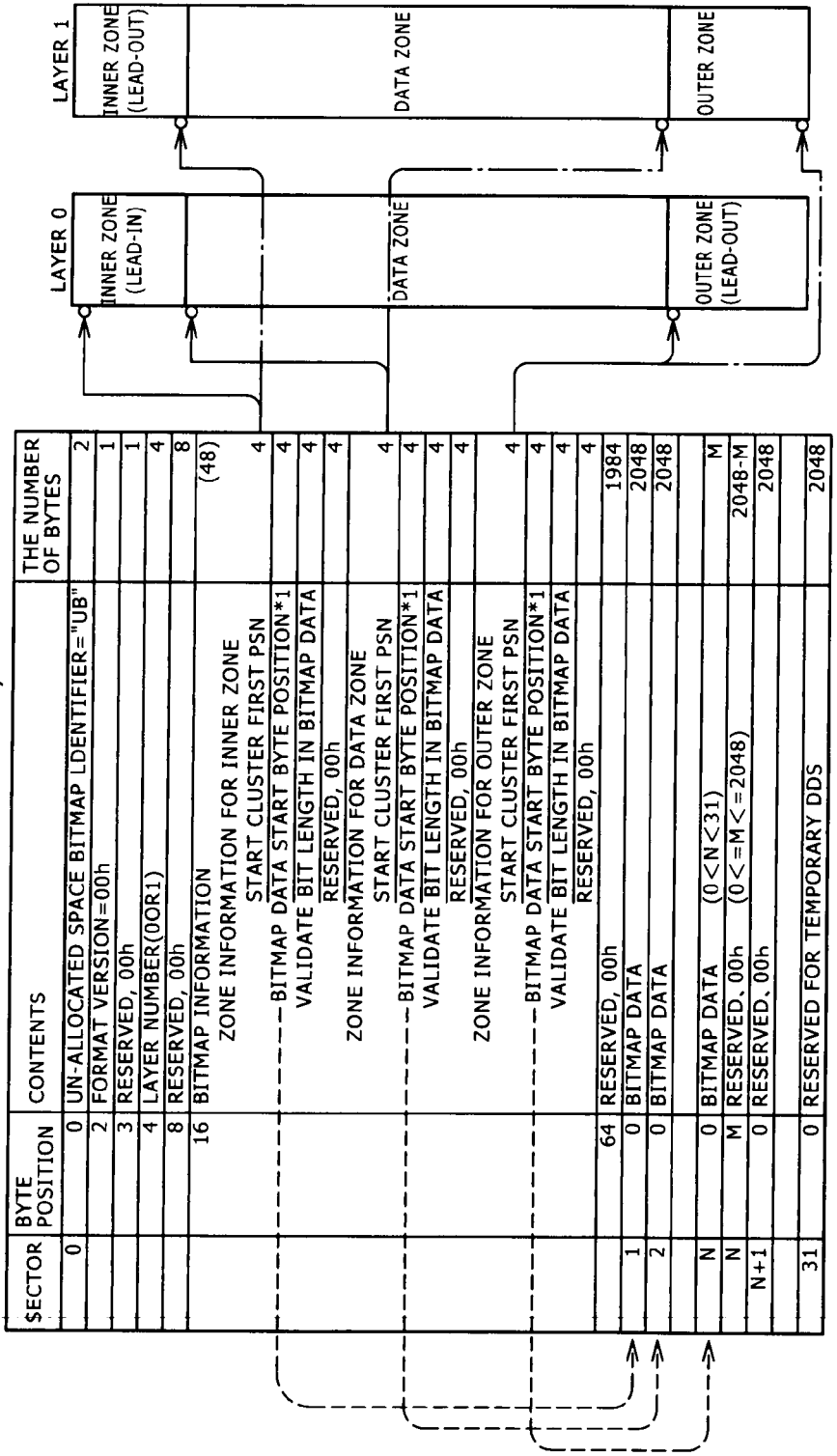
FIG. 8 is an explanatory diagram of a space bitmap in the disk of the embodiment.

FIG. 8 shows the configuration of the space bitmap.

As described above, the space bitmap is a bitmap that represents the recorded/unrecorded state of one cluster on the disk by one bit, and in which e.g. "1" is set to the corresponding bit if the cluster is in the unrecorded state. FIG. 8 shows a space bitmap for the case of a double-layer disk as an example of the bitmap that holds information independent on a layer-by-layer basis. In the case of a triple-layer disk and a quadruple-layer disk, this bitmap is expansively treated.

In FIG. 8, 32 sectors in one cluster are shown as sectors 0 to 31. The "byte position" is shown as the byte position in the sector.

In the beginning sector 0, management information of the space bitmap is recorded.

In two bytes from byte position 0 of sector 0, "UB" is recorded as the space bitmap ID (Un-allocated Space Bitmap Identifier).

In one byte at byte position 2, the format version (format number) is recorded and e.g. "00h" is set therein.

In four bytes from byte position 4, the layer number is recorded. Specifically, whether this space bitmap corresponds to layer L0 or layer L1 is indicated.

In 48 bytes from byte position 16, bitmap information (Bitmap Information) is recorded.

The bitmap information is composed of pieces of zone information corresponding to a respective one of the inner zone, the data zone, and the outer zone (Zone Information for Inner Zone) (Zone Information for Data Zone) (Zone Information for Outer Zone).

Each of the pieces of zone information is composed of 16 bytes. Specifically, in each of the pieces of zone information, four bytes are allocated to each of the start position of the zone (Start Cluster First PSN), the start position of the bitmap data (Start Byte Position of Bitmap data), the size of the bitmap data (Validate Bit Length in Bitmap data), and a reserve.

In the start position of the zone (Start Cluster First PSN), the start position of the zone on the disk, i.e. the start address in turning the zone into the bitmap, is indicated by the PSN (physical sector address).

In the start position of the bitmap data (Start Byte Position of Bitmap data), the start position of the bitmap data relating to the zone is indicated by the number of bytes as the relative position from the Un-allocated Space Bitmap Identifier at the beginning of the space bitmap.

In the size of the bitmap data (Validate Bit Length in Bitmap data), the size of the bitmap data of the zone is indicated by the number of bits.

From byte position 0 of the second sector (=sector 1) of the space bitmap, actual bitmap data (Bitmap data) are recorded. The size of the bitmap data is one sector per 1 GB.

The area from the byte subsequent to the last bitmap data to the byte previous to the final sector (sector 31) is used as reserves and "00h" is set therein.

In the final sector (sector 31) of the space bitmap, the TDDS is recorded.

Management by the above-described bitmap information is as follows.

First, a description will be made about the case of a space bitmap in which layer L0 is indicated as the layer number at byte position 4, i.e. a space bitmap corresponding to layer L0 of a single-layer disk or a multi-layer disk.

In this case, information on the inner zone in layer L0, i.e. the lead-in zone, is indicated by Zone Information for Inner Zone.

By the start position of the zone (Start Cluster First PSN), the PSN of the start position of the inner zone (in this case, the lead-in zone) is indicated as shown by a full-line arrowhead.

By the start position of the bitmap data (Start Byte Position of Bitmap data), the position of the bitmap data corresponding to the inner zone in this space bitmap (information indicating byte position 0 in sector 1) is indicated as shown by a dashed line.

By the size of the bitmap data (Validate Bit Length in Bitmap data), the size of the bitmap data for the inner zone is indicated.

In Zone Information for Data Zone, information on the data zone in layer L0 is indicated.

By the start position of the zone (Start Cluster First PSN), the PSN of the start position of the data zone is indicated as shown by a full-line arrowhead.

By the start position of the bitmap data (Start Byte Position of Bitmap data), the position of the bitmap data corresponding to the data zone in this space bitmap (information indicating byte position 0 in sector 2) is indicated as shown by a dashed line.

By the size of the bitmap data (Validate Bit Length in Bitmap data), the size of the bitmap data for the data zone is indicated.

By Zone Information for Outer Zone, information on the outer zone in layer L0 (e.g. the lead-out zone of a single-layer disk) is indicated.

By the start position of the zone (Start Cluster First PSN), the PSN of the start position of the outer zone is indicated as shown by a full-line arrowhead.

By the start position of the bitmap data (Start Byte Position of Bitmap data), the position of the bitmap data corresponding to the outer zone in this space bitmap (information indicating byte position 0 in sector N) is indicated as shown by a dashed line.

By the size of the bitmap data (Validate Bit Length in Bitmap data), the size of the bitmap data for the outer zone is indicated.

Similar management is carried out also in the space bitmaps about the second and subsequent recording layers such as layer L1. For example, in the space bitmap about layer L1, management of the inner zone, the data zone, and the outer zone about layer L1 is carried out as shown by the one-dot chain lines.

Next, the configuration of the TDFL (temporary DFL) will be described. As described above, the TDFL is recorded in the free area subsequent to the space bitmap in the TDMA, and is additionally recorded at the beginning of the free area in response to every updating.

FIG. 9 shows the configuration of the TDFL.

The TDFL is composed of one to four clusters. As is apparent from comparison with the DFL of FIG. 4, the contents of the TDFL are the same as those of the DFL in that the beginning 64 bytes are used as defect list management information and pieces of alternation address information ati each composed of eight bytes are recorded at byte position 64 and the subsequent byte positions, and in that eight bytes subsequent to the last alternation address information ati#N are used as the alternation address information termination.

However, in the TDFL composed of one to four clusters, a temporary DDS (TDDS) is recorded in 2048 bytes as the last sector thereof, differently from the DFL.

In the case of the TDFL, 00h is set in the area to the byte previous to the final sector of the cluster to which the alternation address information termination belongs. The TDDS is recorded in the final sector. If the alternation address information termination belongs to the final sector of the cluster, 0 is set in the area to the byte previous to the final sector of the next cluster, and the TDDS is recorded in the final sector.

The defect list management information composed of 64 bytes is similar to that in the DFL described with FIG. 5.

However, as the number of times of updating of the defect list by four bytes from byte position 4, the serial number of the defect list is recorded. Due to this feature, the serial number of defect list management information in the latest TDFL indicates the number of times of updating of the defect list.

Furthermore, values at the timing of updating of the TDFL are recorded as the number of entries in the defect list DFL, i.e. the number of pieces of the alternation address information ati, by four bytes from byte position 12 and the size (the number of clusters) of the free area in each of the alternation areas ISA0, ISA1, OSA0, and OSA1 by four bytes from byte position 24.

The structure of the alternation address information ati in the TDFL is also similar to that of the alternation address information ati in the DFL shown in FIG. 6. The alternation address information ati is regarded as one entry and the alternation-subject cluster and the alternative cluster relating to one round of alternation processing are indicated. Such entries are registered in the temporary defect list TDFL having the structure of FIG. 9.

However, as status 1 of the alternation address information ati in the TDFL, "0101" or "1010" is often set besides "0000."

"0101" or "1010" is set as status 1 when physically-consecutive plural clusters are collectively subjected to alternation processing and alternation management (burst transfer management) for these plural clusters is collectively carried out.

Specifically, if status 1 is "0101," the starting physical sector address of the alternation-subject cluster and the starting physical sector address of the alternative cluster in the alternation address information ati indicate the alternation-subject and the alternative about the beginning cluster of physically-consecutive plural clusters.

If status 1 is "1010," the starting physical sector address of the alternation-subject cluster and the starting physical sector address of the alternative cluster in the alternation address information ati indicate the alternation-subject and the alternative about the last cluster of physically-consecutive plural clusters.

Therefore, in the case of carrying out alternation management for physically-consecutive plural clusters collectively, the alternation address information ati does not need to be recorded as an entry for every one of all the plural clusters, but it is enough that two pieces of the alternation address information ati about the beginning cluster and the end cluster are recorded as entries.

As described above, the TDFL basically has the same structure as that of the DFL but has characteristics that the size thereof can be extended to four clusters, the TDDS is recorded in the last sector, burst transfer management is permitted as the alternation address information ati, and so forth.

In the TDMA, the space bitmap and the TDFL are recorded as shown in FIG. 7. As described above, the temporary disk definition structure (TDDS) is recorded in 2048 bytes as the last sector of the space bitmap and the TDFL.

The structure of this TDDS is shown in FIG. 10.

The TDDS is composed of one sector (2048 bytes) and includes the same contents as those of the DDS in the above-described DMA. Although the size of the DDS is one cluster (65536 bytes), the area where substantial contents are defined in the DDS is the area to byte position 52 as described with FIG. 3. That is, the substantial contents are recorded in the beginning sector of one cluster. Therefore, the TDDS can encompass the contents of the DDS although the size thereof is one sector.

As is apparent from comparison between FIG. 10 and FIG. 3, the TDDS has contents similar to those of the DDS at byte positions 0 to 53. However, in the TDDS, the TDDS serial number is recorded from byte position 4. The starting physical address of the drive area in the TDMA is recorded from byte position 16. The starting physical address of the TDFL in the TDMA (AD DFL) is recorded from byte position 24.

At byte position 1024 and the subsequent byte positions in the TDDS, information that is absent in the DDS is recorded.

In four bytes from byte position 1024, the physical sector address PSN of the outermost circumference of the data-recorded area in the user data area is recorded.

In four bytes from byte position 1028, the starting physical sector address of the latest space bitmap for layer L0 in the TDMA (AD BP0) is recorded.

In four bytes from byte position 1032, the starting physical sector address of the latest space bitmap for layer L1 in the TDMA (AD BP1) is recorded.

In one byte at byte position 1036, a flag to control the use of the overwriting function is recorded.

The bytes other than those at these byte positions are used as reserves, and all the contents thereof are 00h.

However, for example in the case of a triple-layer disk, predetermined byte positions in the reserves are decided, and the starting physical sector address of the latest space bitmap for layer L2 in the TDMA (AD BP2) is recorded at these positions.

In the case of a quadruple-layer disk, predetermined byte positions in the reserves are decided, and the starting physical sector address of the latest space bitmap for layer L2 in the TDMA (AD BP2) and the starting physical sector address of the latest space bitmap for layer L3 (AD BP3) are recorded.

Furthermore, at any positions regarded as the reserve in FIG. 10, the next OPC operation executable addresses (Next available Ln OPC Address) about the OPC areas in the respective layers are each recorded by four bytes. That is, the addresses of the parts to be used next for the OPC operation are recorded.

For example, in the case of a triple-layer disk, the starting addresses of the unused parts (parts where the OPC operation has not yet been carried out) in the respective OPC areas provided in layers L0, L1, and L2 as described later are each described by four bytes as the address of the part to be used next in general.

In the case of a quadruple-layer disk, the starting addresses of the unused parts in the respective OPC areas provided in layers L0, L1, L2, and L3 as described later are each described by four bytes as the address of the part to be used next in general.

However, as described later for an example of FIG. 26, "Next available Ln OPC Address" as the address of the part to be used next is often changed to the address of the position that is not at the beginning of the unused part.

As just described, the TDDS includes the address of the user data area, the sizes of the ISA and the OSA, and the alternation area availability flag. That is, the TDDS is used as management/control information for area management of the ISA and the OSA in the data zone. The TDDS is the same as the DDS in this point.

Moreover, the TDDS has the information indicating the positions of the latest effective space bitmaps (AD BP0, AD BP1 (in addition, AD BP2, AD BP3)), and has the information indicating the position of the latest effective temporary DFL (TDFL) (AD DFL).

In addition, the TDDS has the next OPC operation executable addresses (Next available Ln OPC Address) indicating the unused parts of the OPC areas in the respective layers.

This TDDS is recorded in the final sector of the space bitmap and the TDFL. Therefore, a new TDDS is recorded every time the space bitmap or the TDFL is added. Thus, in the TDMA of FIG. 7, the TDDS in the last added space bitmap or TDFL is the latest TDDS, and the latest space bitmap and the TDFL are indicated therein.

A simple description will be made below about updating of the TDMA.

Alternation processing by use of the ISA and the OSA shown in FIG. 1, which serve as alternation areas, is executed in the following manner. The case of data rewriting is taken as an example. For example, suppose that a request for data writing to a cluster in which data has been already recorded in the user data area, i.e. a request for rewriting, is issued. In this case, writing to this cluster is impossible because the disk is a write-once disk. Therefore, this rewriting data is written to a certain cluster in the ISA or the OSA. This is the alternation processing.

This alternation processing is managed as the entry of the above-described alternation address information ati. Specifically, one piece of the alternation address information ati is recorded as an entry that indicates the address of the cluster in which data has been originally recorded as the alternation-subject and indicates the address of the cluster in which the rewriting data is written in the ISA or the OSA as the alternative.

That is, in the case of data rewriting, rewriting data is recorded in the ISA or the OSA, and the alternation of the data position due to this rewriting is managed by the alternation address information ati in the TDFL in the TDMA. Thereby, despite the write-once disk, data rewriting can be substantially realized (from the viewpoint of e.g. the OS of a host system and the file system).

Similar operation is carried out also in the case of defect management. If a certain cluster is regarded as a defect area, data that should be written therein is written in a certain cluster in the ISA or the OSA by alternation processing. For management of this alternation processing, one piece of the alternation address information ati is recorded as an entry.

Furthermore, in response to recording operation (cluster consumption), updating of the space bitmap is also performed.

In this manner, in the TDMA, the space bitmap and the TDFL are updated on an as-needed basis in response to data rewriting and alternation processing. At the time of closing, the contents of the latest TDMA are recorded in the DMA in the INFO, so that the management information is settled.

In a multi-layer disk such as a triple-layer disk and a quadruple-layer disk, the TDMA is disposed in all or part of the respective recording layers as described later. These TDMAs are used for updating of the TDFL/space bitmap in such a manner as to be exhausted in turn. Due to this feature, the TDMAs in the respective recording layers are collectively used as one large TDMA, and thus the plural TDMAs can be efficiently used.

Furthermore, the effective TDFL/space bitmap can be grasped by merely seeking the last recorded TDDS irrespective of the TDMAs in the respective layers.

Moreover, although not shown in FIG. 7, for determination of the latest TDMA, a first predetermined number of clusters in the TDMA are used as a TDMA access indicator only in the beginning TDMA (e.g. TDMA#1 to be described later).

Supposing that 12 TDMAs, TDMA0 to TDMA11, are provided in the entire disk, the first 12 clusters in the beginning TDMA0 are used as the TDMA access indicator and each represent information of recording of a respective one of TDMAs 1 to 11 and the DMA.

During the use of the beginning TDMA0, no data is recorded in the TDMA access indicator. When the whole of TDMA0 has been used and the use of TDMA1 is started, e.g. "00h" data is recorded in the whole of the first cluster (corresponding to TDMA1) of the TDMA access indicator. When the whole of TDMA1 has been used and the use of TDMA2 is started, e.g. "00h" data is recorded in the whole of the second cluster (corresponding to TDMA2) of the TDMA access indicator. If the TDMA access indicator is used in this manner, the following advantage is achieved. Specifically, e.g. at the time of loading of the disk, the disk drive device can get to know the TDMA in which the TDMA data that is the latest at this timing is recorded by accessing the first TDMA0 and reading the TDMA access indicator. If "00h" has been already recorded in all of 12 clusters of the TDMA access indicator, the disk drive device can get to know that data is recorded in the DMA.

[4. Plural-layer Disk/Inner Zone of Existing Double-layer Disk]

Figure 11:
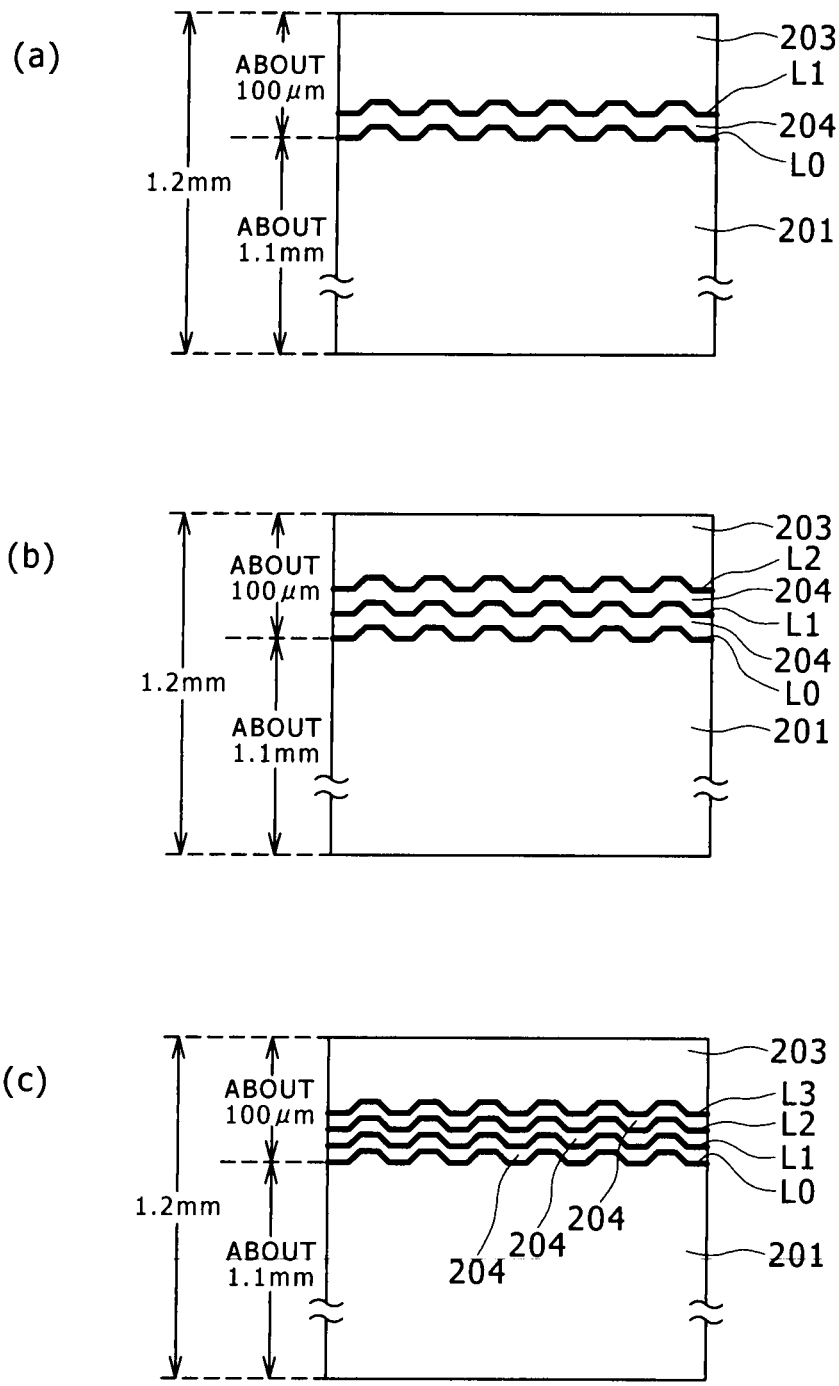
FIG. 11 is explanatory diagrams of the layer structure of the disk of the embodiment.

The layer structures of multi-layer disks will be described below with FIG. 11.

FIG. 11(a), (b), and (c) schematically show the layer structure of an existing double-layer disk, a newly-developed triple-layer disk, and a quadruple-layer disk of the embodiment, respectively.

Each of the disks of FIGS. 11(a), 11(b), and 11(c) has a disk substrate 201 having a thickness of about 1.1 mm. The disk substrate 201 is shaped by e.g. injection molding of a polycarbonate resin. A stamper is set in a mold for the injection molding, and thereby the disk substrate 201 to which a groove shape is transferred is formed.

In the case of the double-layer disk, as shown in FIG. 11(a), the first layer (layer L0) is formed on the substrate 201, and the second layer (layer L1) is formed with the intermediary of an intermediate layer 204. Furthermore, an optically-transparent layer 203 is formed on the second layer (layer L1).

The surface of the optically-transparent layer 203 serves as the laser-incident surface.

The optically-transparent layer 203 is formed for the purpose of protecting the optical disk. Recording and reproduction of an information signal are performed by e.g. focusing of laser light on layer L0 or L1 through the optically-transparent layer 203.

The optically-transparent layer 203 is formed by e.g. spin-coating of a UV-curable resin and curing thereof by UV irradiation. Alternatively, it is also possible to form the optically-transparent layer 203 by using a UV-curable resin and a polycarbonate sheet or an adhesive layer and a polycarbonate sheet.

The optically-transparent layer 203 has a thickness of about 100 μm. When it is combined with the substrate 201 having a thickness of about 1.1 mm, the thickness of the entire optical disk is about 1.2 mm.

The triple-layer disk of FIG. 11(b) includes three recording layers, i.e. layers L0, L1, and L2.

Also in this disk, layers L0, L1, and L2 are formed over the substrate 201 with the intermediary of the intermediate layers 204.

The quadruple-layer disk of FIG. 11(c) includes four recording layers, i.e. layers L0, L1, L2, and L3. Also in this disk, layers L0, L1, L2, and L3 are formed over the substrate 201 with the intermediary of the intermediate layers 204.

Each of the intermediate layers 204 in FIGS. 11(a), (b), and (c) is formed by e.g. rotational coating of an optically-transparent material having UV-photosensitivity by a spin-coating method and curing thereof by UV irradiation.

In the case of performing recording/reproduction of an information signal to/from a multi-layer optical disk recording medium, the arrangement and film thickness of this intermediate layer 204 are designed for the purpose of suppressing inter-layer crosstalk.

In the triple-layer disk, layer L2 is provided at a position distant from the laser-incident surface by about 50 μm. In the quadruple-layer disk, the thickness of the intermediate layers 204 is adjusted and layer L3 is provided at a position distant from the laser-incident surface by about 50 μm.

The triple-layer disk of FIG. 11(b) is manufactured through the following procedure (ST1 to ST7) for example.

(ST1) The disk substrate 201 to which the groove pattern of layer L0 is transferred is fabricated by injection molding with use of a stamper for layer L0.
(ST2) A recording film is deposited on the groove pattern for L0 by sputtering or the like to form layer L0.
(ST3) A resin is extended on layer L0 by spin-coating and the resin is cured while a stamper for layer L1 is pressed against the resin. Thereby, the intermediate layer 204 to which the groove pattern of layer L1 is transferred is formed.
(ST4) A recording film is deposited on the groove pattern for L1 by sputtering or the like to form layer L1.
(ST5) A resin is extended on layer L1 by spin-coating and the resin is cured while a stamper for layer L2 is pressed against the resin. Thereby, the intermediate layer 204 to which the groove pattern of layer L2 is transferred is formed.
(ST6) A recording film is deposited on the groove pattern for L2 by sputtering or the like to form layer L2.
(ST7) The optically-transparent layer 203 is formed by a technique such as spin-coating and curing, or sheet bonding.

Through the above-described steps, the triple-layer disk is manufactured.

In the case of the quadruple-layer disk, the steps for layer L3 are added, so that it is manufactured through the following procedure (ST11 to ST19) for example.
(ST11) The disk substrate 201 to which the groove pattern of layer L0 is transferred is fabricated by injection molding with use of a stamper for layer L0.
(ST12) A recording film is deposited on the groove pattern for L0 by sputtering or the like to form layer L0.
(ST13) A resin is extended on layer L0 by spin-coating and the resin is cured while a stamper for layer L1 is pressed against the resin. Thereby, the intermediate layer 204 to which the groove pattern of layer L1 is transferred is formed.
(ST14) A recording film is deposited on the groove pattern for L1 by sputtering or the like to form layer L1.
(ST15) A resin is extended on layer L1 by spin-coating and the resin is cured while a stamper for layer L2 is pressed against the resin. Thereby, the intermediate layer 204 to which the groove pattern of layer L2 is transferred is formed.
(ST16) A recording film is deposited on the groove pattern for L2 by sputtering or the like to form layer L2.
(ST17) A resin is extended on layer L2 by spin-coating and the resin is cured while a stamper for layer L3 is pressed against the resin. Thereby, the intermediate layer 204 to which the groove pattern of layer L3 is transferred is formed.
(ST18) A recording film is deposited on the groove pattern for L3 by sputtering or the like to form layer L3.
(ST19) The optically-transparent layer 203 is formed by a technique such as spin-coating and curing, or sheet bonding.

Through the above-described steps, the quadruple-layer disk is manufactured.

For comparison with the triple-layer disk to be described later and the quadruple-layer disk of the embodiment, the layout of the inner zone of an existing double-layer disk will be described below with FIG. 12.

The inner zone is set in the radial position range of 21.0 mm to 24.0 mm.

The BCA is formed from a radial position of 21.0 mm.

In each of layers L0 and L1, a protection zone PZ1 is provided from a radial position of 22.2 mm for the purpose of separating the BCA from the area where recording/reproduction of management information is performed.

In layer L0, the PIC, in which reproduction-only management information is recorded by the wobbling groove as described above, is formed in the radial position range of 22.5 mm to about 23.1 mm.

In layer L0, the area to this PIC serves as the reproduction-only area.

In the area from the PIC toward the outer circumference to a radial position of 24.0 mm, a protection zone PZ2, a buffer area BUF, INFO#2, OPC(L0), TDMA#1, and INFO#1 are sequentially disposed.

In layer L1, in the radial position range of 22.5 mm to about 24.0 mm, the buffer area BUF, OPC(L1), the reserve area RSV, INFO#4, TDMA#2, the reserve area RSV, and INFO#3 are sequentially disposed.

The buffer area BUF is an area that is not used for recording/reproduction of management information. The reserve area RSV is an area that is not used currently but will be possibly used for recording/reproduction of management information in the future.

The OPC area as the test write area is provided in each layer. In the description of the areas in the inner zone, representation "OPC(Lx)" refers to "the OPC area existing in layer Lx."

Although the TDMA and the INFO are shown with symbols #1 to #n, they are collectively used as one TDMA area and one INFO area as a whole irrespective of the layers in which they are disposed.

[5. Inner Zone of Newly-Developed Triple-Layer Disk]

The inner zone of the newly-developed triple-layer disk will be described below.

This triple-layer disk realizes capacity of about 33 GB per one layer due to increase in the recording density. An inner zone layout proper for this case is necessary.

First, points P1 to P6 to which attention is paid in the development of the triple-layer disk will be described.

(P1) The anchor positions are fixed.

In view of the existing double-layer disk, consideration is given to the usability and compatibility of the inner zone for the disk drive device. For this purpose, the positions indicated by arrowheads F in FIG. 12, i.e. the BCA termination (radial position 22.2 mm), the termination of the protection zone PZ1 (radial position 22.5 mm), and the inner zone termination (radial position 24.0 mm), are fixed.

That is, the PIC, the OPC, the TDMA, and so forth are arranged in the radial position range of 22.5 mm to 24.0 mm. However, slight variation in the radial position occurs due to the difference in the data linear density among the double-layer disk, the triple-layer disk, and the quadruple-layer disk.

(P2) The OPC areas in the respective layers are prevented from overlapping with each other in the layer direction.

This point is to properly carry out the OPC operation. When recording to a recording layer is performed, change in the transmittance of the recording layer occurs, and the transmittance change has a dependency on the recording power. Thus, a variety of transmittance changes occur in the place where recording is performed with variation in the recording power like the OPC area. If a certain OPC area overlaps with another OPC area in the layer direction, possibly proper OPC operation cannot be carried out in the OPC area remoter from the laser-incident surface (closer to the disk substrate 201).

For example, suppose that OPC(L0) overlaps with OPC (L1). Due to OPC operation with variation in the laser power in OPC(L1), the transmittance of OPC(L1) varies on a part-by-part basis. After this, laser irradiation with the intended power for OPC(L0) remoter from the laser-incident surface is impossible due to the influence of the transmittance change in OPC(L1). Furthermore, laser irradiation with excessive power is often performed for the OPC area, and thus the recording layer is often damaged.

For these reasons, overlapping of the OPC areas in the layer direction causes an obstacle to operation in the OPC area closer to the disk substrate 201. Thus, the OPC areas in the respective layers need to be prevented from overlapping with each other in the layer direction.

(P3) The management information capacity of the existing double-layer disk is followed.

The PIC is written fivefold as with the existing single-layer disk and double-layer disk, and it is enough that it exists in at least one recording layer.

Figure 12:
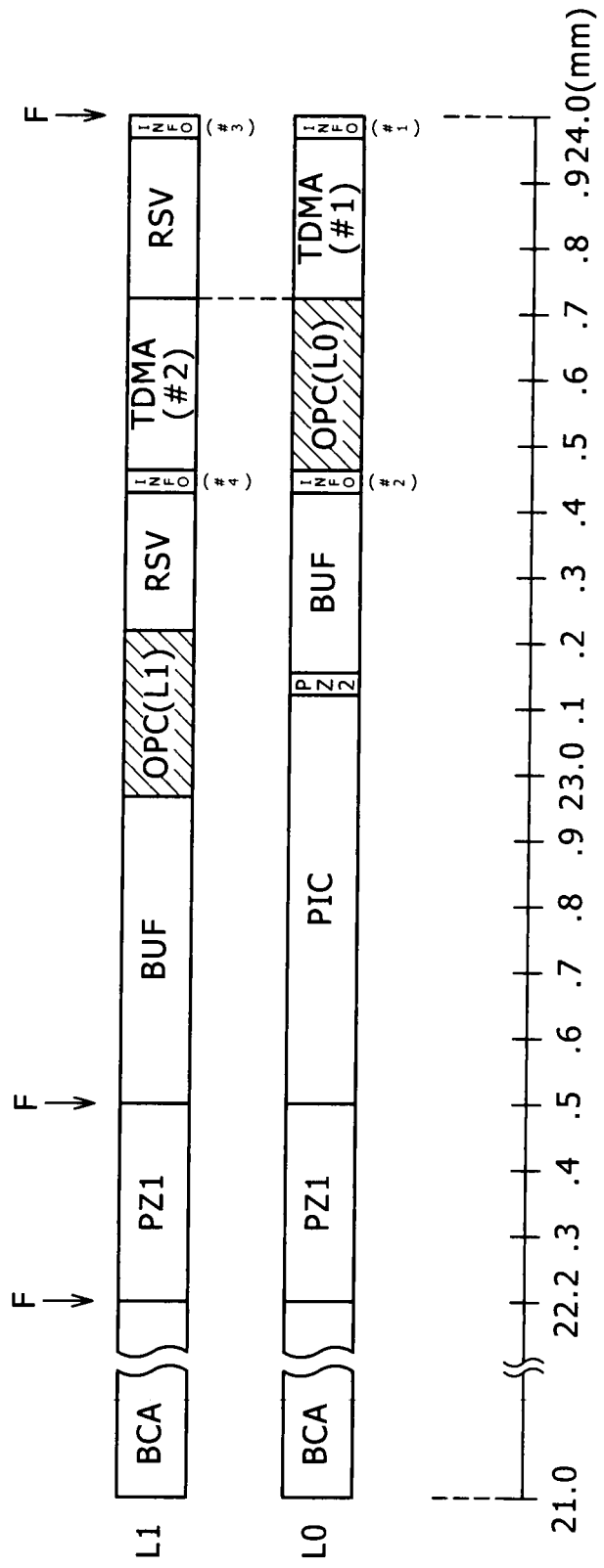
FIG. 12 is an explanatory diagram of the inner zone configuration of an existing double-layer BD-R.

For example, as the PIC in the double-layer disk shown in FIG. 12, the same information is repeatedly recorded five times for safety of information and sureness of readout. This scheme is followed also in the triple-layer disk. Therefore, the radial range of the PIC depends on the amount of data corresponding to five times of recording.

Furthermore, the following characteristics are also followed: the size of the TDMA is 2048 clusters per one layer, and the size of the OPC area in each layer is also 2048 clusters. This is to avoid change in the usability of the TDMA and the OPC.

Thus, in the triple-layer disk, 2048×3=6144 clusters are ensured for the TDMA in total. For the OPC area, 2048 clusters are ensured in each layer.

Updating of the TDMA accompanies recording operation. Therefore, e.g. in the case of a device in which the recording laser power is adjusted in the OPC area immediately before recording operation, the OPC area is similarly consumed through frequent TDMA updating accompanying disk eject operation and so forth. Thus, the capacity of the TDMA is disposed as evenly as possible in the respective layers in which the TDMA can be disposed.

(P4) The management information recording/reproduction area is not so disposed as to overlap with the OPC area at a position closer to the disk substrate 201 than this OPC area.

The "management information recording/reproduction area" is the generic term of the areas where recording/reproduction of management/control information is performed in the inner zone. That is, the INFO, the TDMA, and the reserve area RSV are equivalent to the management information recording/reproduction area. Because the reserve area RSV will be possibly used for recording/reproduction of management information in the future, it is included in the management information recording/reproduction area.

Because the PIC is a reproduction area, it is not included in the management information recording/reproduction area. Furthermore, the buffer area BUF and the protection zone PZ2 are not included in the management information recording/reproduction area because recording and reproduction are not performed therein.

Preventing the management information recording/reproduction area from overlapping with the OPC area at a position closer to the disk substrate 201 than this OPC area is for the purpose of proper recording and reproducing in the management information recording/reproduction area.

As described above, transmittance variation indeterminately occurs in the OPC area. Because of the influence thereof, if the management information recording/reproduction area overlapping with the OPC area exists at a position closer to the disk substrate 201 than this OPC area, laser irradiation with a proper amount of light for this management information recording/reproduction area is impossible and recording/reproduction operation therein is unstable. To avoid this problem, the management information recording/reproduction area such as the TDMA is not disposed on the disk substrate 201 side of the OPC area.

(P5) Only one management information recording/reproduction area is permitted to exist at a position closer to the laser-incident surface than the OPC area.

As described above, transmittance variation occurs due to recording/reproduction to/from the recording layer. Therefore, for accurate OPC operation, it is preferred that an area where recording is performed does not exist at a position closer to the laser-incident surface than the OPC area. However, the existence of such an area is permitted in the existing double-layer disk. For example, in FIG. 12, TDMA#2 is disposed at a position closer to the laser-incident surface than OPC(L0).

This is because of the following reason. In the management information recording/reproduction area, recording/reproduction is performed with proper laser power, and therefore the accompanying transmittance variation falls within the predicted range. Thus, this transmittance variation does not have much influence on the test write in the OPC area on the back side of the management information recording/reproduction area.

However, a multi-layer disk such as a triple-layer disk and a quadruple-layer disk involves a possibility that two or more management information recording/reproduction areas are disposed at positions closer to the laser-incident surface than the OPC area. If plural management information recording/reproduction areas overlap with the OPC area and each of these areas is in the recorded state or unrecorded state, the transmittance of these areas from the viewpoint of the OPC area on the back side of these areas is unpredictable.

To avoid this problem, two or more management information recording/reproduction areas are not so disposed as to overlap with the OPC area at positions closer to the laser-incident surface than this OPC area.

(P6) Two INFOs in one layer are separated from each other by at least 150 μm.

Because it is prescribed that two INFOs in one layer are separated from each other by at least 150 μm, which is the allowable defect size, the triple-layer disk also obeys this prescription.

Figure 13:
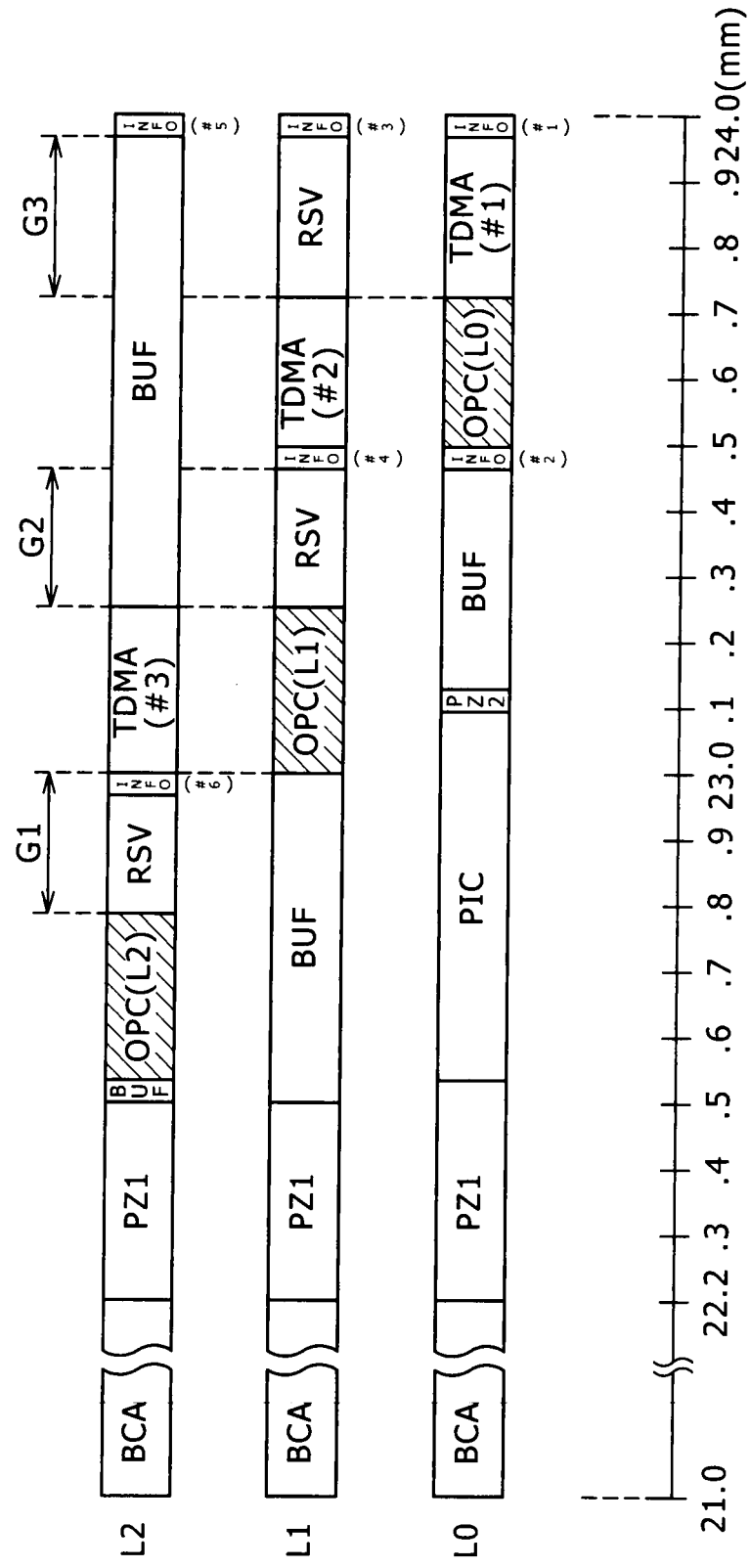
FIG. 13 is an explanatory diagram of the inner zone configuration of a novel triple-layer BD-R.

The inner zone layout developed for the triple-layer disk (BD-R) with attention paid to the above-described points P1 to P6 is as shown in FIG. 13. FIG. 14 shows the start radial position and the number of clusters of each area.

In layer L0, subsequent to the BCA and the protection zone PZ1, the PIC is disposed on the outer circumference side. The PIC has the size corresponding to the data capacity for fivefold writing in accordance with the above-described point P3. The BCA, the protection zone PZ, and the PIC serve as the reproduction-only area.

Subsequent to the PIC, the protection zone PZ2, the buffer area BUF, INFO#2, OPC(L0), TDMA#1, and INFO#1 are disposed along the direction toward the outer circumference.

In layer L1, only the BCA and the protection zone PZ1 serve as the reproduction-only area. Subsequent to the protection zone PZ1, the buffer area BUF, OPC(L1), the reserve area RSV, INFO#4, TDMA#2, the reserve area RSV, and INFO#3 are disposed along the direction toward the outer circumference.

Also in layer L2, only the BCA and the protection zone PZ1 serve as the reproduction-only area. Subsequent to the protection zone PZ1, the buffer area BUF, OPC(L2), the reserve area RSV, INFO#6, TDMA#3, the buffer area BUF, and INFO#5 are disposed along the direction toward the outer circumference.

The radial position and the number of clusters of each area will be apparent from reference to FIG. 14.

For this inner zone layout of FIG. 13, the above-described points P1 to P6 are taken into consideration.

As point P1, the BCA, the protection zone PZ1, and the inner zone termination are fixed. Based on this feature, the PIC, the OPC, the TDMA, the INFO, and so forth are arranged in the radial position range of 22.5 mm to 24.0 mm.

As point P3, the PIC capacity, the TDMA capacity, and the OPC size are followed.

As point P6, separation by at least 150 μm is ensured between INFO#1 and INFO#2 in layer L0, between INFO#3 and INFO#4 in layer L1, and between INFO#5 and INFO#6 in layer L2.

As point P2, overlapping of the OPC areas in the layer direction is avoided.

As shown in FIG. 13, OPC(L2) and OPC(L1) have a gap distance G1 therebetween along the radial direction to thereby be prevented from overlapping with each other.

Furthermore, a gap distance G2 is set between OPC(L1) and INFO#2 in layer L0. Thus, OPC(L1) and OPC(L0) are also prevented from overlapping with each other by the intermediary of the gap distance G2 or longer along the radial direction.

The gap distances G1 and G2 are 222 μm in the example of the radial position setting of FIG. 14.

A description will be made below about why the arrangement setting with the gap distances G1 and G2 can avoid overlapping of the OPC areas in the layer direction.

As described above, the groove patterns for forming the tracks in layers L0, L1, and L2 are each shaped by a corresponding one of the stampers at the time of the fabrication of the disk substrate 201 and at the time of the formation of the intermediate layer 204. Thus, it is difficult to make the center points of the groove patterns serving as the tracks completely match each other, and a predetermined tolerance is permitted.

Figure 15:
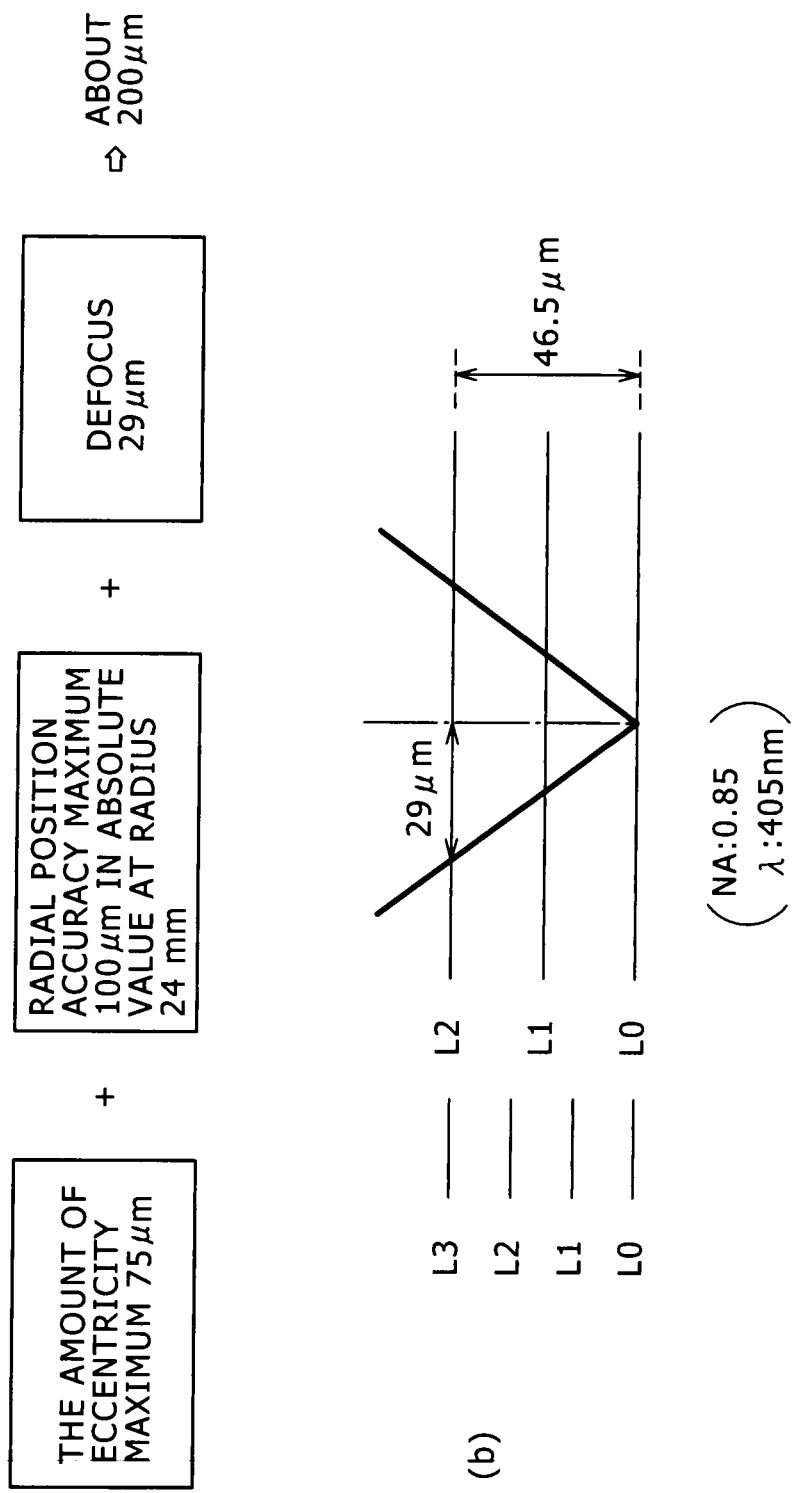
FIG. 15 is explanatory diagrams of the tolerance of the respective recording layers in a novel triple-layer disk.

As shown in FIG. 15(a), a maximum of 75 μm is permitted as the amount of eccentricity of each recording layer. Furthermore, as the radial position accuracy, a maximum of 100 μm in the absolute value is permitted as the error of the position of the radius 24 mm of each recording layer. For example, it is enough that, on the basis of the position of the radius 24 mm in layer L0, the error of the position of the radius 24 mm in the other layers is smaller than 100 μm.

In this case, the mutual positional offset among the respective recording layers is 175 μm in the worst case.

However, defocus needs to be also taken into consideration. As shown in FIG. 15(b), layer L2, which is the recording layer closest to the laser-incident surface in the triple-layer disk, is separate from layer L0 by a distance slightly shorter than 50 μm. Suppose that this distance is 46.5 μm for example. In this case, when recording to layer L0 is performed with focus on layer L0, the laser irradiation range of layer L2 is a range of radius 29 μm.

In consideration of the above-described characteristics, the possibility of overlapping of the OPC areas arises unless a gap distance of about 200 μm or longer is ensured.

In the present example, 222 μm is ensured as each of the gap distances G1 and G2 by arranging the respective areas as shown in FIG. 13 and FIG. 14.

Thus, OPC(L2) and OPC(L1) do not overlap with each other in the layer direction even when layers L1 and L2 are formed with the maximum offset in the allowable range. Similarly, OPC(L1) and OPC(L0) also do not overlap with each other even in the worst case.

Therefore, the condition of point P2 can be completely satisfied, which can ensure proper OPC operation in each OPC area.

The condition of point P4, i.e. the condition that the management information recording/reproduction area is not so disposed as to overlap with the OPC area at a position closer to the disk substrate 201 than this OPC area, is also satisfied.

As shown in FIG. 13, on the disk substrate 201 side of OPC(L2), the buffer area BUF in layer L1 and the PIC in layer L0 are disposed and thus no management information recording/reproduction area exists.

Furthermore, on the disk substrate 201 side of OPC(L1), the PIC, the protection zone PZ2, and the buffer area BUF in layer L0 are disposed and thus no management information recording/reproduction area exists. Even if the maximum offset within the above-described tolerance occurs between layers L1 and L0, INFO#2 is never located on the disk substrate 201 side of OPC(L1) because the gap distance G2 is 222 μm.

Consequently, no management information recording/reproduction area is disposed on the back side (on the disk substrate 201 side) of the OPC area. This avoids a problem that the recording/reproducing operation in the management information recording/reproduction area is unstable depending on the recording status of the OPC area.

The condition of point P5, i.e. the condition that only one management information recording/reproduction area is permitted to exist at a position closer to the laser-incident surface than the OPC area, is also satisfied.

This point becomes a matter of concern when the arrangement in layers L1 and L2 from the viewpoint of OPC(L0) in layer L0 is considered. This is because it is impossible that two or more management information recording/reproduction areas are disposed at positions closer to the laser-incident surface than OPC(L1) and OPC(L2).

At positions closer to the laser-incident surface than OPC (L0), TDMA#2 in layer L1 and the buffer area BUF in layer L2 are disposed. Thus, the management information recording/reproduction area closer to the laser-incident surface than OPC(L0) is only TDMA#2.

If the maximum offset within the allowable tolerance exists, INFO#4 and the reserve area RSV in layer L1 possibly overlap with OPC(L0) in the layer direction. However, because the gap distance G2 is 222 μm, TDMA#3 in layer L2 never overlaps with OPC(L0) in the layer direction. Moreover, a gap distance G3 in FIG. 13 is 235 μm in the design of FIG. 14. Thus, INFO#5 in layer L2 also never overlaps with OPC(L0) in the layer direction.

Consequently, even in the worst case within the allowable tolerance, two or more management information recording/reproduction areas never exist at positions closer to the laser-incident surface than the OPC area.

As described above, the triple-layer disk of the present embodiment is allowed to have a proper layout satisfying the conditions of points P1 to P6 by employing the inner zone layout like that of FIG. 13 and FIG. 14 for example.

The main points of the triple-layer disk of the present example are as follows.

This triple-layer disk is a recordable disk as a plural-layer disk obtained by providing three recording layers (layers L0 to L2) over the disk substrate 201 and forming the optically-transparent layer 203 on the laser-incident surface side.

In each of the recording layers (layers L0 to L2), the test area for laser power control (OPC(L0), OPC(L1), OPC (L2)) is provided in the inner zone closer to the inner circumference than the data zone, in which user data is recorded.

The test areas (OPC(L0), OPC(L1), OPC(L2)) in the respective recording layers (layers L0 to L2) are so disposed as to be prevented from overlapping with each other in the layer direction.

In the inner zones of the respective recording layers (layers L0 to L2), the management information recording/reproduction areas where recording and reproduction of management information are performed are provided.

The management information recording/reproduction areas are so disposed that, for each of the test areas (OPC(L0), OPC(L1), OPC(L2)) in the respective recording layers, the number of management information recording/reproduction areas overlapping with the test area in the layer direction at a position closer to the laser-incident surface than this test area is equal to or smaller than one.

The management information recording/reproduction areas are so disposed as to be prevented from overlapping with the test areas (OPC(L0), OPC(L1), OPC(L2)) in the respective recording layers in the layer direction on the disk substrate 201 side of the test areas.

The example of FIG. 13 is shown regarding the BD-R, which is a write-once disk. In the case of the BD-RE as a rewritable disk, the inner zone layout can be designed as shown in FIG. 16.

Figure 16:
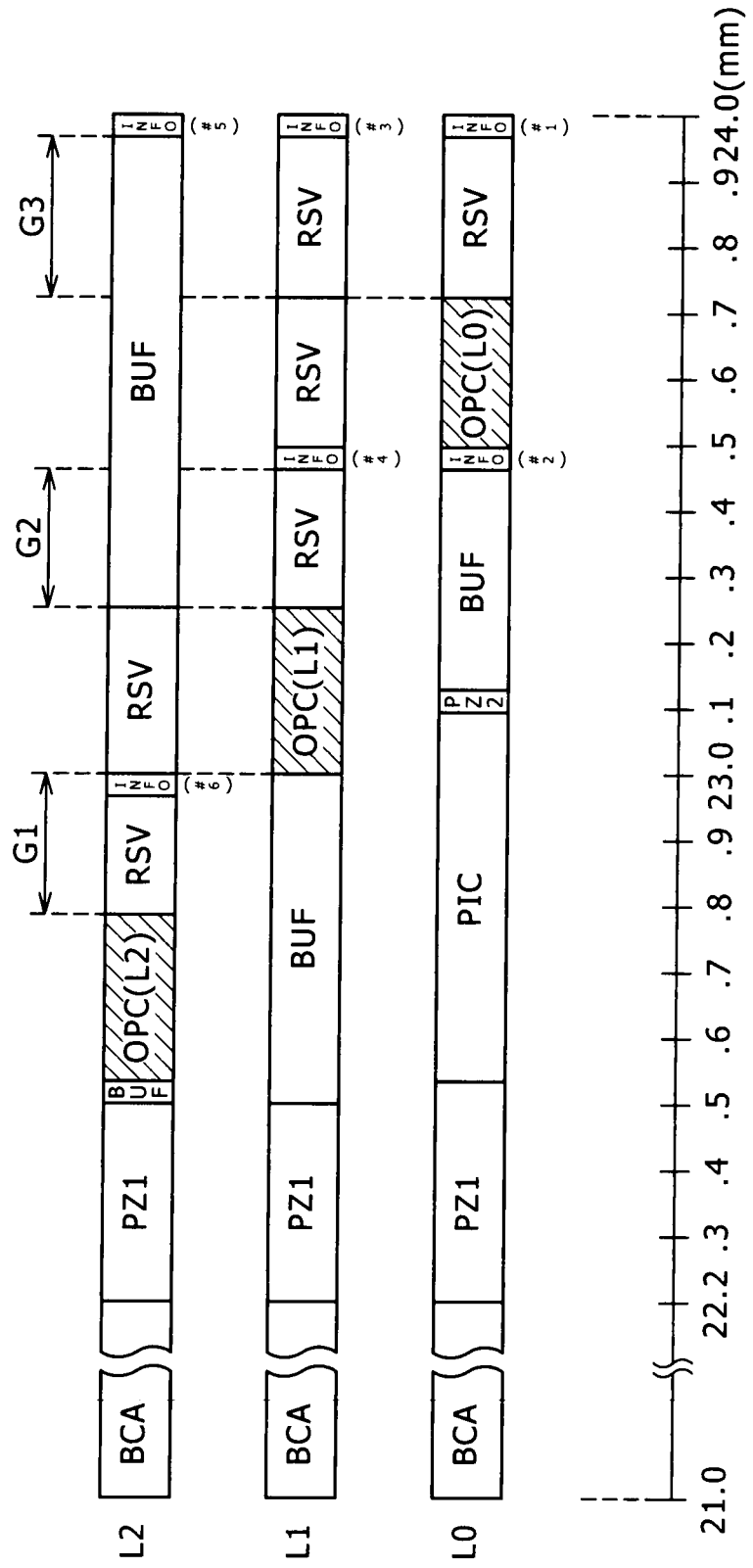
FIG. 16 is an explanatory diagram of the inner zone configuration of a novel triple-layer BD-RE of the embodiment.

The layout of FIG. 16 is obtained by replacing the TDMA in FIG. 13 by the reserve area RSV. The size of each area is the same as that shown in FIG. 14. The position of the TDMA in FIG. 14 can be treated as that of the reserve area RSV.

As described above, the TDMA is used for sequential updating of the TDFL and the space bitmap and so forth for data rewriting and alternation processing until final closing processing. In a rewritable disk allowing data rewriting, the TDMA is unnecessary because the DMA in the INFO can be rewritten directly.

Therefore, the layout shown in FIG. 16, obtained by replacing the TDMA in FIG. 13 by the reserve area RSV, can be employed. Of course, this layout satisfies the conditions of points P1 to P6.

By such an inner zone layout, test write and recording/reproduction of management information in the inner zone can be properly performed also in the BD-RE.

[6. Inner Zone of Quadruple-Layer Disk of Embodiment]

The inner zone of the quadruple-layer disk of the embodiment will be described below.

This quadruple-layer disk realizes capacity of about 32 GB per one layer due to increase in the recording density. An inner zone layout proper for this case is necessary.

The points to which attention is paid in the development of the quadruple-layer disk of the embodiment are the same as the above-described points P1 to P6. However, in the quadruple-layer disk, satisfaction of the conditions of points P1 to P6 cannot be simply achieved because of the following reasons.

First, also in the quadruple-layer disk, the PIC, the OPC, the TDMA, and so forth are disposed in the radial position range of 22.5 mm to 24.0 mm for obedience to point P1. Furthermore, in accordance with point P3, the capacity of the OPC area, the TDMA, and so forth is ensured similarly.

Specifically, the size of the OPC area is set to 2048 clusters in each layer.

The size of the TDMA is 2048 clusters per one layer. Therefore, although the arrangement positions thereof may be in any recording layer, 2048×4=8192 clusters are ensured as a whole. Furthermore, the TDMA is so disposed that the capacity thereof is as even as possible in the recording layers in which the TDMA can be disposed.

However, if the layout is based on this premise as it is, the state in which the gap distances G1 and G2 between the OPC areas are set to at least 200 μm cannot be kept.

This possibly causes the situation in which the condition of point P2 that the OPC areas do not overlap with each other in the layer direction cannot be kept even when the offset among the respective layers is within the tolerance. That is, possibly the condition of point P2 is not satisfied.

Therefore, in the case of the quadruple-layer disk, an idea of OPC pairs and an idea of tolerance reduction are employed to address this problem.

First, the inner zone layout developed for the quadruple-layer disk (BD-R) of the present example will be described with FIG. 17. The start radial position and the number of clusters of each area are shown in FIG. 18.

In layer L0, subsequent to the BCA and the protection zone PZ1, the PIC is disposed on the outer circumference side. The PIC has the size corresponding to the data capacity for five-fold writing in accordance with the above-described point P3. The BCA, the protection zone PZ, and the PIC serve as the reproduction-only area.

Subsequent to the PIC, the protection zone PZ2, the buffer area BUF, INFO#2, OPC(L0), the buffer area BUF, and INFO#1 are disposed along the direction toward the outer circumference.

In layer L1, only the BCA and the protection zone PZ1 serve as the reproduction-only area. Subsequent to the protection zone PZ1, the buffer area BUF, OPC(L1), INFO#4, TDMA#1, the buffer area BUF, and INFO#3 are disposed along the direction toward the outer circumference.

Also in layer L2, only the BCA and the protection zone PZ1 serve as the reproduction-only area. Subsequent to the protection zone PZ1, the buffer area BUF, INFO#6, TDMA#2, the buffer area BUF, OPC(L2), TDMA#3, and INFO#5 are disposed along the direction toward the outer circumference.

Also in layer L3, only the BCA and the protection zone PZ1 serve as the reproduction-only area. Subsequent to the protection zone PZ1, OPC(L3), the buffer area BUF, INFO#8, TDMA#4, and INFO#7 are disposed along the direction toward the outer circumference.

The radial position and the number of clusters of each area will be apparent from reference to FIG. 18.

In this case, the inner zone layout obeys points P1, P3, and P6.

As point P1, the BCA, the protection zone PZ1, and the inner zone termination are fixed. Based on this feature, the PIC, the OPC, the TDMA, the INFO, and so forth are arranged in the radial position range of 22.5 mm to 24.0 mm.

As point P3, the PIC capacity, the TDMA capacity, and the OPC size are followed.

The TDMA is so disposed that the capacity is even among layers L1, L2, and L3, in which the TDMA can be disposed. This point will be described later as additional points P7 and P8.

As point P6, separation by at least 150 µm is ensured between INFO#1 and INFO#2 in layer L0, between INFO#3 and INFO#4 in layer L1, between INFO#5 and INFO#6 in layer L2, and between INFO#7 and INFO#8 in layer L3.

A description will be made below about how to satisfy the conditions of points P2 (the OPC areas do not overlap with each other), P4 (the management information recording/reproduction area is not disposed at a position closer to the disk substrate 201 than the OPC area), and P5 (two or more management information recording/reproduction areas are not disposed at positions closer to the laser-incident surface than the OPC area).

First, the idea of OPC pairs, i.e. a first OPC pair and a second OPC pair shown in FIG. 17, will be described below.

Figure 19:
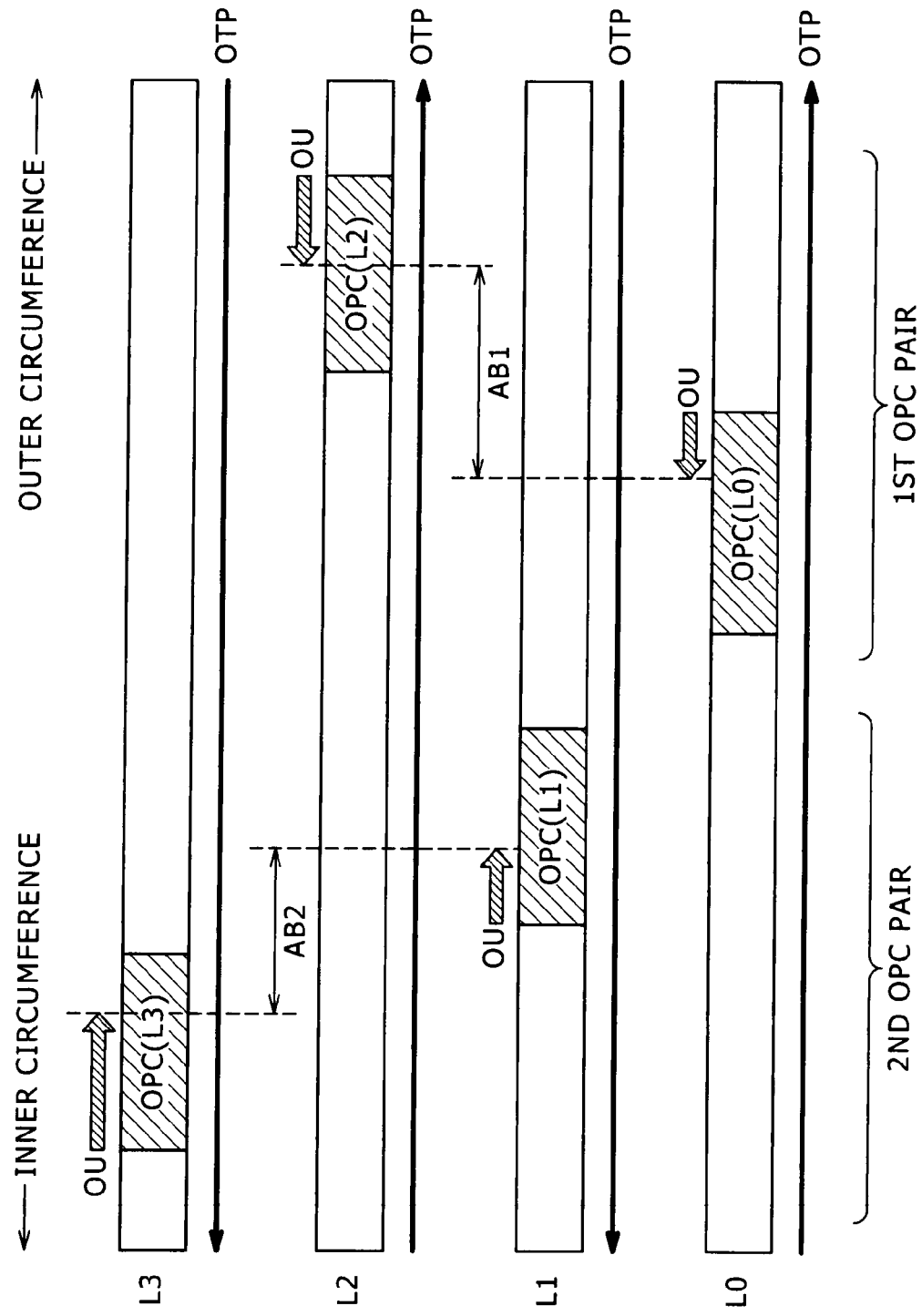
FIG. 19 is an explanatory diagram of OPC pairs in a quadruple-layer disk of the embodiment.

FIG. 19 shows the OPC areas in the respective layers.

The quadruple-layer disk of the present example is based on the assumption that the so-called opposite track path is employed. This is such a track path that the traveling direction of recording/reproduction (the traveling direction of the address) is alternately reversed from layer to layer. Specifically, the traveling direction is from the inner circumference toward the outer circumference in layer L0, from the outer circumference toward the inner circumference in layer L1, from the inner circumference toward the outer circumference in layer L2, and from the outer circumference toward the inner circumference in layer L3. In FIG. 19, the track path direction is shown by arrowheads OTP.

Such a track path that the recording/reproduction direction is from the inner circumference toward the outer circumference in all the layers is referred to as the parallel track path. The concept of the present embodiment to be described below can be employed also for the parallel track path.

As shown in FIG. 19, OPC(L0) and OPC(L2), which are two OPC areas disposed closer to the outer circumference in the inner zone, are defined as the first OPC pair.

Furthermore, OPC(L1) and OPC(L3), which are two OPC areas disposed closer to the inner circumference, are defined as the second OPC pair.

It is prescribed that the OPC area is consumed in the opposite direction of the recording/reproduction direction (track path). This is because of the following reason. In the OPC area, test write is performed with very-high laser power, and thus the OPC area is often partially damaged. Therefore, if the addresses are used from the smaller address side, possibly the OPC execution position cannot be accessed at the time of OPC operation.

Thus, in every test write, the OPC area is used from the larger address side by a predetermined number of sectors used in the test write. Arrowheads OU in the diagram indicate the consumption direction of the OPC area.

Therefore, in the case of the opposite track path, OPC(L0) and OPC(L2) are consumed from the outer circumference side by the predetermined number of sectors sequentially in every test write, whereas OPC(L1) and OPC(L3) are consumed from the inner circumference side by the predetermined number of sectors sequentially in every test write.

The consumption direction OU is the same between two OPC areas in the pair.

Regarding two OPC areas in each pair, the apparent gap distance is considered. Specifically, a gap distance AB1 relating to OPC(L0) and OPC(L2) and a gap distance AB2 relating to OPC(L1) and OPC(L3) are considered.

The apparent gap distances AB1 and AB2 are the gap distance between the beginnings of the parts to be used next in the OPC areas (the positions to be consumed in the next OPC operation). In general, the apparent gap distances AB1 and AB2 are the gap distance between the beginnings of the unused parts that have not yet been consumed in the OPC areas. The beginning of "the part to be used next" is equivalent to the address indicated as the OPC operation executable address (Next available Ln OPC Address) in the above-described TDDS.

If it is supposed that the part indicated by the length of the arrowhead OU has been already consumed by the OPC operation in each OPC area, the apparent gap distances AB1 and AB2 are as shown in the diagram.

If the apparent gap distances AB1 and AB2 are ensured, such a virtual gap distance that the purpose of the above-described point P2 (the OPC areas do not overlap with each other) is fulfilled can be achieved depending on the way of use of the OPC areas.

For example, if OPC(L0) and OPC(L2) are consumed as shown by the arrowheads OU in the first OPC pair in FIG. 19, the OPC positions to be used next do not overlap with each other. However, if the maximum tolerance is taken into consideration and for example the amount of consumption of OPC(L2) is significantly larger than that of OPC(L0), possibly the OPC areas practically overlap with each other.

This point will be described below with FIG. 20 by taking the first OPC pair as an example.

FIG. 20(a) shows the assumption of a layout in which no gap distance is set between OPC(L0) and OPC(L2) along the radial direction.

The radial size of the OPC area composed of 2048 clusters is about 250 μm.

Even if no gap distance is set as shown in FIG. 20(a), OPC(L0) and OPC(L2) do not overlap with each other in the layer direction in the ideal state.

However, if a tolerance of about 200 μm is permitted as described above and the offset between layers L0 and L2 is the maximum, overlapping occurs in a range of about 200 μm as shown in FIG. 20(b).

However, if the above-described apparent gap distance AB1 is taken into consideration, the state in which the positions to be used for OPC recording do not overlap with each other can be achieved even when the overlapping in the layer direction occurs as shown in FIG. 20(b). For example, if OPC(L0) and OPC(L2) are always consumed almost evenly as shown by the dashed-line arrowheads in the diagram, the apparent gap distance AB1 is always ensured (the apparent gap distance AB1 is equivalent to the gap distance between the tips of the respective dashed-line arrowheads).

However, the amounts of consumption of the respective OPC areas are not necessarily even. Although the consumption of OPC(L0) proceeds faster in many cases, the consumption of OPC(L2) often proceeds faster depending on the case. In the case of FIG. 20(b), if the amount of consumption of OPC(L2) becomes twice that of OPC(L0), the apparent gap distance AB1 becomes zero.

This is a rare case occurring when the offset between layers L0 and L2 is the maximum within the tolerance and the balance of consumption between OPC(L0) and OPC(L2) becomes considerably low. However, the possibility of the occurrence of such a situation should be as low as possible.

The tolerance will be reviewed below.

Figure 21:
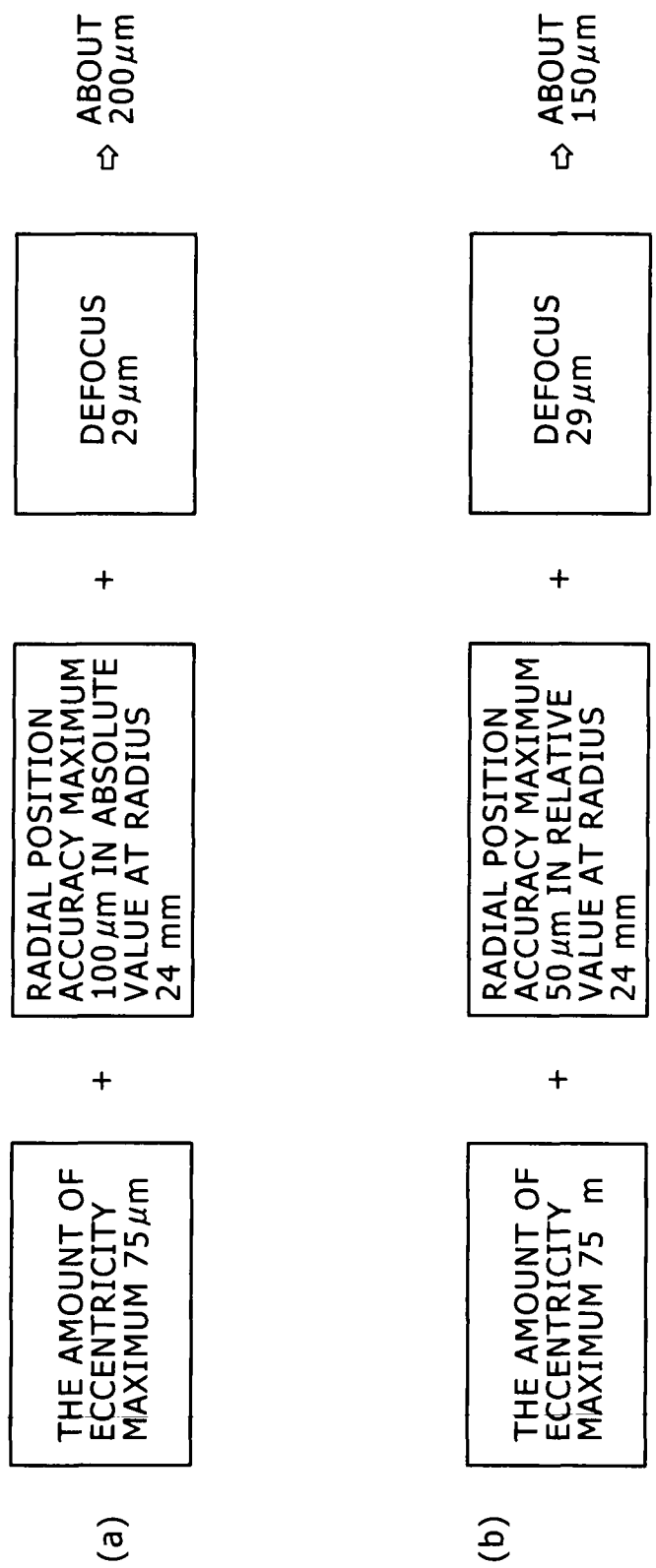
FIG. 21 is explanatory diagrams of the tolerance of the respective recording layers in the quadruple-layer disk of the embodiment.

FIG. 21(a) shows the condition in which the maximum tolerance is set to about 200 μm in the above-described triple-layer disk.

This condition will be reviewed. First, the amount of eccentricity is a matter of the disk manufacturing and it is difficult to set it smaller than 75 μm. Furthermore, 29 μm as the defocus can also not be changed.

Therefore, as shown in FIG. 21(b), the radial position accuracy is so defined that the maximum error is 50 μm in the relative value at the position of a radius of 24 mm. In the case of the triple-layer disk, the absolute-value error from the reference layer is employed. However, in practice, the offset of the layers has a relative influence among the respective layers. Thus, the allowable tolerance is changed. Specifically, the offset among the layers is permitted as long as the offset at the position of a radius of 24 mm between two layers having the largest offset among four layers is within the range of 50 μm.

In this case, the maximum tolerance can be estimated to be about 150 μm. Therefore, the quadruple-layer disk is based on the premise that the offset among the respective layers is equal to or smaller than 150 μm even in the worst case.

In this case, when the offset between layers L0 and L2 is the largest, overlapping occurs in a range of about 150 μm as shown in FIG. 20(c). This state is better than the state of FIG. 20(b). That is, the possibility that the apparent gap distance AB1 becomes zero when the amount of consumption of OPC(L2) becomes larger than that of OPC(L0) can be decreased.

A consideration will be made below about how to further decrease the possibility that the apparent gap distance AB1 becomes zero.

First, the inter-pair gap distance between the first OPC pair and the second OPC pair will be considered.

Figure 17:
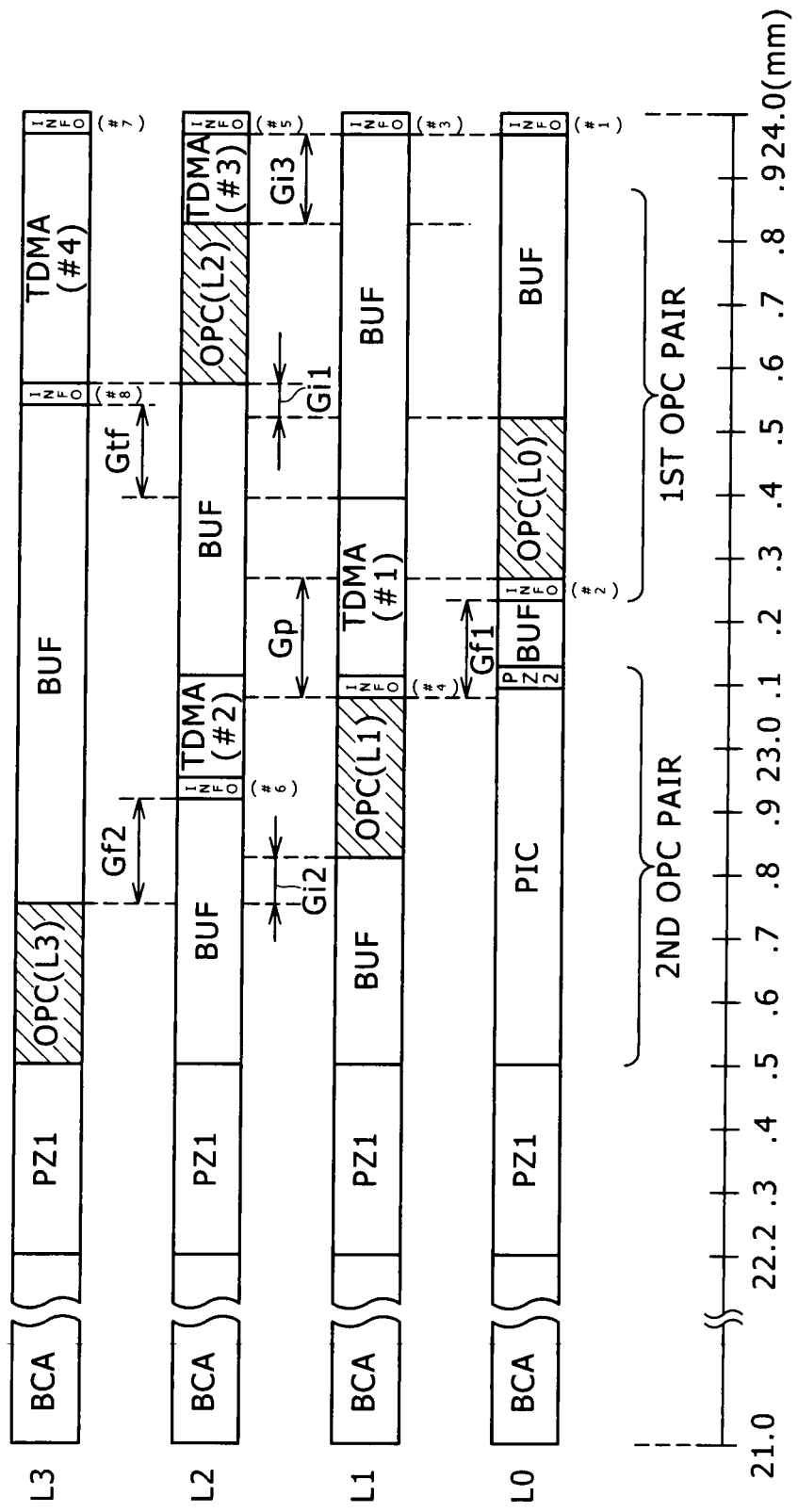
FIG. 17 is an explanatory diagram of the inner zone configuration of a quadruple-layer BD-R of the embodiment.

Because the maximum tolerance is set to 150 μm, it is enough that the gap distance between the pairs, i.e. a gap distance Gp between the innermost circumference side of OPC(L0) in FIG. 17 and the outermost circumference side of OPC(L1), is at least 150 μm.

This is because, when the gap distance Gp is at least 150 μm, OPC(L0) and OPC(L1) do not overlap with each other in the layer direction even if the offset between layers L0 and L1 is the largest.

In the case of the arrangement shown in FIG. 17 and FIG. 18, this gap distance Gp is 153 μm.

The next consideration will be made below about OPC(L3) in terms of point P4 (the management information recording/reproduction area is not disposed at a position closer to the disk substrate 201 than the OPC area).

In FIG. 17, at positions closer to the disk substrate 201 than OPC(L3), the buffer area BUF in layer L2, the buffer area BUF in layer L1, and the PIC in layer L0 are disposed and thus no management information recording/reproduction area exists.

However, in consideration of the offset of the layers, INFO#6 in layer L2 needs to be sufficiently separate in the radial direction. That is a gap distance Gf2 in FIG. 17.

In this case, the gap distance Gf2 needs to be at least 200 μm if the maximum tolerance is set to 200 μm. In contrast, if the maximum tolerance is set to 150 μm as described above, it is enough that the gap distance Gf2 is at least 150 μm. In the case of the arrangement shown in FIG. 17 and FIG. 18, this gap distance Gf1 is 153 μm.

Furthermore, attention will be paid to OPC(L0) in terms of point P5 (two or more management information recording/reproduction areas are not disposed at positions closer to the laser-incident surface than the OPC area).

Only TDMA#1 in layer L1 is disposed as the management information recording/reproduction area closer to the laser-incident surface than OPC(L0). However, if the offset of the layers is taken into consideration, the positional relationship between TDMA#1 in layer L1 and INFO#8 in layer L3 becomes a matter of concern. That is a gap distance Gtf in FIG. 17.

Also in this case, the gap distance Gtf needs to be at least 175 μm if the maximum tolerance except for the error due to defocus is set to 175 μm. However, if the maximum tolerance except for the error due to defocus is set to 125 μm, it is enough that the gap distance Gtf is about 125 μm. In the case of the arrangement shown in FIG. 17 and FIG. 18, this gap distance Gtf is 145 μm.

The reason why the error due to defocus can be excluded from the maximum tolerance regarding the gap distance Gtf is as follows. Referring to FIG. 15(b), even if layer L1 and layer L2 have been recorded from the left side and the right side to the one-dot chain line in the diagram, the influence on layer L0 is caused by one layer as a whole, i.e. each of layer L1 and layer L2 causes half of the influence.

As just described, the gap distances Gf2 and Gtf do not need to be at least 200 μm and 175 μm, respectively, but it is enough that the gap distances Gf2 and Gtf are at least 150 μm and 125 μm, respectively. This means that each of the gap distances Gf2 and Gtf can be decreased by 50 μm by setting the tolerance to 150 μm.

In this case, the margin of each 50 μm can be applied to gap distances Gi1 and Gi2 in the respective OPC pairs.

Because of the above-described characteristics, as shown in FIG. 20(*d*), a gap distance of 50 μm can be set in the arrangement of OPC(L0) and OPC(L2) in the pair (this gap distance is equivalent to the gap distance Gi1 in FIG. 17).

In this case, when the offset between layers L0 and L2 is the largest, overlapping occurs in a range of about 100 μm as shown in FIG. 20(*e*). This state is further better than the state of FIG. 20(*c*).

That is, the possibility that the apparent gap distance AB1 becomes zero is low even when the amount of consumption of OPC(L2) becomes considerably larger than that of OPC(L0).

In practice, even in the worst case, the disappearance of the apparent gap distance AB1 can be mostly avoided.

In addition, it is possible that the use of the OPC area is adjusted through processing of OPC(L2) and OPC(L0) on the recording device side so that the disappearance of the apparent gap distance AB1 can be prevented. This characteristic will be described later with FIG. 25 and FIG. 26.

Based on the above-described characteristics, the gap distance Gi1 is set between OPC(L2) and OPC(L0) of the first OPC pair, and the gap distance Gi2 is set between OPC(L3) and OPC(L1) of the second OPC pair. In the case of the arrangement shown in FIG. 17 and FIG. 18, the gap distances Gi1=Gi2=57 μm.

Due to this setting, the apparent gap distances AB1 and AB2 shown in FIG. 19 are ensured, and overlapping between OPC(L2) and OPC(L0) and between OPC(L3) and OPC(L1) in the layer direction are avoided virtually.

Furthermore, the gap distance Gp of 153 μm is set between the innermost circumference side of OPC(L0) and the outermost circumference side of OPC(L1) as described above. Thus, overlapping between OPC(L0) and OPC(L1) in the layer direction also never occurs even when the offset of the layers is the largest within the tolerance.

Therefore, the layout of FIG. 17 and FIG. 18 satisfies the condition of point P2 (the OPC areas do not overlap with each other) virtually.

Verification about point P4 (the management information recording/reproduction area is not disposed at a position closer to the disk substrate 201 than the OPC area) is as follows.

For OPC(L3), the management information recording/reproduction area is not disposed on the disk substrate 201 side thereof as described above.

As for OPC(L2), on the disk substrate 201 side thereof, the buffer area BUF in layer L1 and the buffer area BUF in layer L0 are located and thus no management information recording/reproduction area exists. The areas that should be considered in terms of the offset of the layers are INFO#1 in layer L0 and INFO#3 in layer L1. However, as is apparent from the description made thus far, it is enough that a gap distance Gi3 shown in FIG. 17 is at least 150 μm. In the case of the arrangement shown in FIG. 17 and FIG. 18, the gap distance Gi3 is 153 μm. Thus, the management information recording/reproduction area is never located on the disk substrate 201 side of OPC(L2).

As for OPC(L1), on the disk substrate 201 side thereof, the PIC in layer L0 is located and thus no management information recording/reproduction area exists. The area that should be considered in terms of the offset of the layers is INFO#2 in layer L0. However, it is enough that a gap distance Gf1 is at least 150 μm similarly to the above description. In the case of the arrangement shown in FIG. 17 and FIG. 18, the gap distance Gf2 is 153 μm. Thus, the management information recording/reproduction area is never located on the disk substrate 201 side of OPC(L1).

From the above-described facts, the condition of point P4 is also satisfied.

Verification about point P5 (two or more management information recording/reproduction areas are not disposed at positions closer to the laser-incident surface than the OPC area) is as follows.

The subject of the verification is the positions of OPC(L0) and OPC(L1) in the layer direction. For OPC(L0), there is no problem as described above.

As for OPC(L1), on the laser-incident surface side thereof, INFO#6 and TDMA#2 in layer L2 and the buffer area BUF in layer L3 exist. Thus, there is no problem.

That is, the condition of point P5 is satisfied.

As is apparent from FIG. 17 and FIG. 18, the TDMA is not disposed in layer L0. This is a technique to satisfy the conditions of point P4 and point P5 and ensure as long the gap distances Gi1 and Gi2 as possible. As described above, the TDMAs of the respective recording layers are collectively used as one large TDMA, and therefore the TDMA does not have to be disposed in all the recording layers.

In consideration of the layout of the quadruple-layer disk, emphasis is placed on the overlapping of the OPC areas in the layer direction and the TDMA is removed from the recording layer closest to the disk substrate.

This is defined as additional point P7 for the quadruple-layer disk and reference thereto will be made hereinafter.

Furthermore, seeing FIG. 17 and FIG. 18 regarding the TDMA will make it apparent that the sizes of the TDMAs in layers L1 to L3 are almost equal to each other. If the TDMA is disposed in one recording layer, e.g. layer L3, in a concentrated manner, OPC(L3) is consumed by recording adjustment for layer L3 for updating of the TDMA.

Therefore, it is preferable to allocate the TDMA to the respective recording layers as evenly as possible so that imbalance of the OPC area consumption can be prevented.

In the present embodiment, the TDMA can be regarded as being almost evenly allocated if the TDMA allocation size in the recording layer having the largest allocation size is equal to or smaller than twice that in the recording layer having the smallest allocation size.

This is defined as additional point P8 for the quadruple-layer disk and reference thereto will be made hereinafter.

As described above, the quadruple-layer disk of the present example is allowed to have a proper layout satisfying the conditions of points P1 to P8 by employing the inner zone layout like that shown in FIG. 17 and FIG. 18 for example.

The main points of the quadruple-layer disk of the present example are as follows.

This quadruple-layer disk is a recordable optical disk obtained by providing four recording layers (layers L0 to L3) over the disk substrate 201 and forming the optically-transparent layer 203 on the laser-incident surface side.

In the recording layers (layers L0 to L3), OPC(L0), OPC(L1), OPC(L2), and OPC(L3) are provided as the test area for laser power control in the inner circumference side area (inner zone) closer to the inner circumference than the data zone, in which user data is recorded. Thus, the quadruple-layer disk has four test areas.

Of four test areas, two test areas closer to the disk outer circumference (OPC(L0) and OPC(L2)) are defined as the first OPC pair, and two test areas closer to the disk inner circumference (OPC(L1) and OPC(L3)) are defined as the second OPC pair. The test areas forming the first OPC pair and the test areas forming the second OPC pair are so disposed as to be prevented from overlapping with each other in the layer direction.

Two test areas of the first OPC pair (OPC(L0) and OPC (L2)) have the same consumption direction of the test area. Furthermore, the respective test areas are so disposed that the parts to be used next in the test areas are prevented from overlapping with each other in the layer direction by the intermediary of the apparent gap distance AB1.

Two test areas of the second OPC pair (OPC(L1) and OPC(L3)) have the same consumption direction of the test area opposite to the consumption direction of the test area in the first OPC pair (however, they have the same consumption direction as that of the test area in the first OPC pair if the above-described parallel track path is employed). Furthermore, the respective test areas (OPC (L1) and OPC(L3)) are so disposed that the parts to be used next in the test areas are prevented from overlapping with each other in the layer direction by the intermediary of the apparent gap distance AB2.

In the above-described inner circumference side area in each recording layer, the management information recording/reproduction areas for recording and reproduction of management information are provided. As the total size thereof, the size obtained by multiplying the management information size of the existing single-layer disk by the number of layers is ensured.

The management information recording/reproduction areas are so disposed that, for each of the test areas (OPC(L0), OPC(L1), OPC(L2), OPC(L3)) in the respective recording layers (layers L0 to L3), the number of management information recording/reproduction areas overlapping with the test area in the layer direction at a position closer to the laser-incident surface than this test area is equal to or smaller than one.

The management information recording/reproduction areas are so disposed as to be prevented from overlapping with the test areas (OPC(L0), OPC(L1), OPC(L2), OPC(L3)) in the respective recording layers in the layer direction on the disk substrate 201 side of the test areas.

Emphasis is placed on the overlapping of the OPC areas in the layer direction and the TDMA is removed from the recording layer (layer L0) closest to the disk substrate.

The TDMA is allocated to the recording layers in which the TDMA is disposed with as even size as possible.

To be more specific for the practical arrangement, the following main points can be cited.

The quadruple-layer disk of the present example is an optical disk having a diameter of 12 cm. The respective test areas (OPC(L0), OPC(L1), OPC(L2), OPC(L3)) are formed with a radial width of about 250 µm in the radial position range of 22.5 mm to 24.0 mm of the optical disk.

The respective recording layers (layers L0 to L3) are so formed that the relative error in the radial position of the layers is within the tolerance of about 150 µm.

The innermost circumference radial position of the test areas forming the first OPC pair (the innermost circumference side of OPC(L0)) and the outermost circumference radial position of the test areas forming the second OPC pair (the outermost circumference side of OPC (L1)) are disposed at positions that do not overlap with each other in the layer direction but have the gap distance Gp of at least about 150 µm along the radial direction if the above-described relative error in the radial position is considered as zero.

Two test areas of the first OPC pair (OPC(L0) and OPC (L2)) are formed at positions that do not overlap with each other in the layer direction but have the gap distance Gi1 of at least about 50 µm along the radial direction if the above-described relative error in the radial position is considered as zero.

Two test areas of the second OPC pair (OPC(L1) and OPC(L3)) are formed at positions that do not overlap with each other in the layer direction but have the gap distance Gi2 of at least about 50 µm along the radial direction if the above-described relative error in the radial position is considered as zero.

The TDMA is not disposed in layer L0 but disposed in layers L1 to L3 with even size.

The example of FIG. 17 is shown regarding the BD-R, which is a write-once disk. In the case of the BD-RE as a rewritable disk, the inner zone layout can be designed as shown in FIG. 22.

Figure 22:
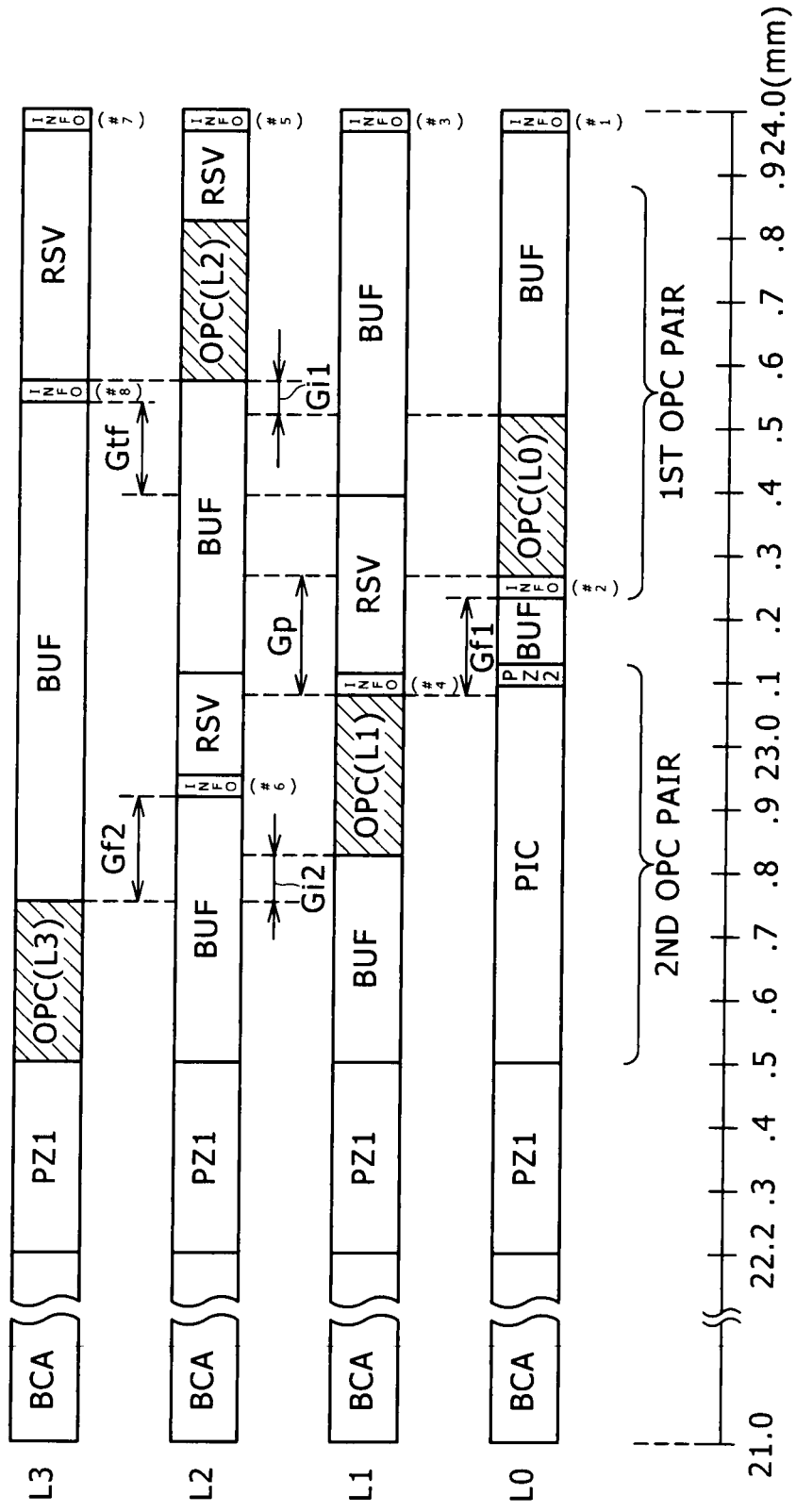
FIG. 22 is an explanatory diagram of the inner zone configuration of a quadruple-layer BD-RE of the embodiment.

The layout of FIG. 22 is obtained by replacing the TDMA in FIG. 17 by the reserve area RSV. The size of each area is the same as that shown in FIG. 18. The position of the TDMA in FIG. 18 can be treated as that of the reserve area RSV.

As described above, the TDMA is used for sequential updating of the TDFL and the space bitmap and so forth for data rewriting and alternation processing until final closing processing. In a rewritable disk allowing data rewriting, the TDMA is unnecessary because the DMA in the INFO can be rewritten directly.

Therefore, the layout shown in FIG. 22, obtained by replacing the TDMA in FIG. 17 by the reserve area RSV, can be employed. Of course, this layout satisfies the conditions of points P1 to P8.

By such an inner zone layout, test write and recording/reproduction of management information in the inner zone can be properly performed also in the BD-RE.

[7. Disk Drive Device]

Next, a description will be made below about a disk drive device (recording/reproduction device) capable of dealing with the triple-layer disk and the quadruple-layer disk of the present example as e.g. the BD-R and the BD-RE.

The disk drive device of the present example executes format processing for a disk in which e.g. only the above-described BCA and PIC are formed but no data is recorded in the recordable area. Thereby, the disk layout in the state described with FIG. 13 or FIG. 17 can be formed. Furthermore, for such a formatted disk, the disk drive device performs recording/reproduction of data to/from the user data area. The disk drive device also performs recording/updating of the TDMA, the ISA, and the OSA on an as-needed basis.

Figure 23:
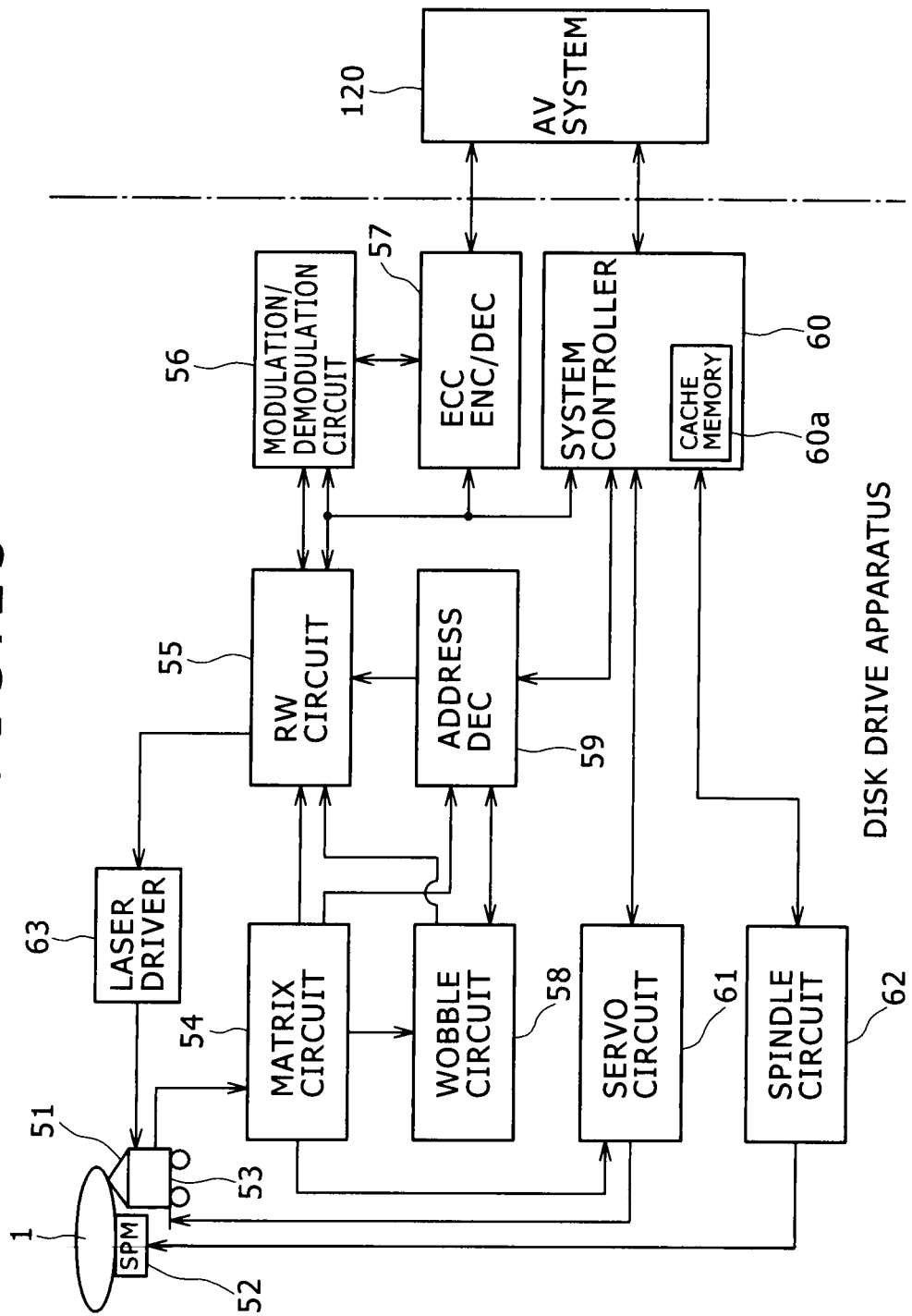
FIG. 23 is a block diagram of a disk drive device of the embodiment.

FIG. 23 shows the configuration of the disk drive device.

A disk 1 is the triple-layer disk of the above-described embodiment or the quadruple-layer disk. The disk 1 is placed on a turntable (not shown) and is rotationally driven by a spindle motor 52 at a constant linear velocity (CLV) at the time of recording/reproduction.

An optical pick-up (optical head) 51 reads out management/control information as the ADIP address and pre-recorded information embedded as the wobbling of the groove track on the disk 1.

At the time of initialization format and at the time of user data recording, management/control information and user data are recorded in the track in the recordable area by the optical pick-up 51. At the time of reproduction, the recorded data is read out by the optical pick-up 51.

In the optical pick-up 51, the following components (not shown) are formed: a laser diode serving as the laser light source; a photodetector for detecting reflected light; an objective lens serving as the output terminal of laser light; and an optical system that emits the laser light to the disk recording surface via the objective lens and guides reflected light of the laser light to the photodetector.

In the optical pick-up 51, the objective lens is held movably in the tracking direction and the focus direction by a biaxial mechanism.

The whole of the optical pick-up 51 is permitted to move in the disk radial direction by a sled mechanism 53.

The laser diode in the optical pick-up 51 is driven for laser light emission by a drive signal (drive current) from a laser driver 63.

Reflected-light information from the disk 1 is detected by the photodetector in the optical pick-up 51, and is converted to an electrical signal dependent on the amount of received light to be supplied to a matrix circuit 54.

The matrix circuit 54 includes a current-voltage conversion circuit, a matrix calculation/amplification circuit, and so forth for the output current from plural light-receiving elements as the photodetector, and generates the necessary signal by matrix calculation processing.

For example, the matrix circuit 54 generates a high-frequency signal equivalent to reproduction data (reproduction data signal), a focus error signal and a tracking error signal for servo control, and so forth.

Furthermore, the matrix circuit 54 generates a push-pull signal as a signal relating to the wobbling of the groove, i.e. a signal to detect the wobbling.

The matrix circuit 54 is integrally formed in the optical pick-up 51 in some cases.

The reproduction data signal output from the matrix circuit 54 is supplied to a reader/writer circuit 55. The focus error signal and the tracking error signal are supplied to a servo circuit 61. The push-pull signal is supplied to a wobble circuit 58.

The reader/writer circuit 55 executes binarization processing, reproduction clock generation processing by a PLL, and so forth for the reproduction data signal to reproduce the data read out by the optical pick-up 51 and supply the data to a modulation/demodulation circuit 56.

The modulation/demodulation circuit 56 includes a functional part serving as a decoder at the time of reproduction and a functional part serving as an encoder at the time of recording.

At the time of reproduction, the modulation/demodulation circuit 56 executes demodulation processing of the run-length limited code based on the reproduction clock, as decode processing.

An ECC encoder/decoder 57 executes ECC encode processing of adding the error correction code at the time of recording, and executes ECC decode processing of performing error correction at the time of reproduction.

At the time of reproduction, the ECC encoder/decoder 57 captures the data resulting from demodulation by the modulation/demodulation circuit 56 into the internal memory and executes error detection/correction processing, deinterleaving processing, and so forth to obtain reproduction data.

The data obtained by the decoding to the reproduction data by the ECC encoder/decoder 57 is read out and transferred to connected apparatus such as an AV (Audio-Visual) system 120 based on a command by a system controller 60.

The push-pull signal output from the matrix circuit 54 as the signal relating to the wobbling of the groove is processed in the wobble circuit 58. The push-pull signal as ADIP information is demodulated into a data stream forming the ADIP address in the wobble circuit 58 and is supplied to an address decoder 59.

The address decoder 59 decodes the supplied data to obtain an address value and supply it to the system controller 60.

Furthermore, the address decoder 59 generates a clock by PLL processing by use of the wobble signal supplied from the wobble circuit 58, and supplies the clock to the respective units as e.g. an encode clock at the time of recording.

Furthermore, as the push-pull signal output from the matrix circuit 54 as the signal relating to the wobbling of the groove, the push-pull signal as pre-recorded information (PIC) is subjected to bandpass filter processing in the wobble circuit 58 and then supplied to the reader/writer circuit 55. Subsequently, the signal is binarized to be turned to a data bit stream and thereafter subjected to ECC decode and deinterleaving in the ECC encoder/decoder 57, so that data as the pre-recorded information is extracted. The extracted pre-recorded information is supplied to the system controller 60.

The system controller 60 can execute various kinds of operation setting processing, copy protect processing, and so forth based on the read pre-recorded information.

At the time of recording, recording data is transferred from the AV system 120. This recording data is sent to a memory in the ECC encoder/decoder 57 and buffered therein.

In this case, the ECC encoder/decoder 57 executes error correction code addition, interleaving, and addition of a sub-code and so forth as encode processing for the buffered recording data.

The data resulting from the ECC encode is subjected to modulation of e.g. the RLL (1-7) PP system in the modulation/demodulation circuit 56, and then supplied to the reader/writer circuit 55.

As the encode clock serving as the reference clock for the encode processing at the time of recording, the clock generated from the wobble signal as described above is used.

The recording data generated by the encode processing is subjected to recording compensation processing by the reader/writer circuit 55. As the recording compensation processing, the reader/writer circuit 55 carries out e.g. fine adjustment of the optimum recording power dependent on the characteristics of the recording layer, the spot shape of the laser light, the recording linear velocity, and so forth and adjustment of the waveform of the laser drive pulse. Thereafter, the recording data is sent to the laser driver 63 as the laser drive pulse.

The laser driver 63 gives the supplied laser drive pulse to the laser diode in the optical pick-up 51 to carry out laser light emission driving. Thereby, the pits corresponding to the recording data are formed on the disk 1.

The laser driver 63 includes a so-called APC circuit (Auto Power Control) and controls the laser output so that the laser output may be kept constant irrespective of the temperature and so forth while monitoring the laser output power based on the output of a detector for laser power monitoring provided in the optical pick-up 51. The target values of the laser output in recording and reproduction are given from the system controller 60, and the laser output level is so controlled as to be at the target value in each of recording and reproduction.

The servo circuit 61 generates various kinds of servo drive signals for focus, tracking, and sled from the focus error signal and the tracking error signal from the matrix circuit 54 to make the related components carry out servo operation.

Specifically, the servo circuit 61 generates a focus drive signal and a tracking drive signal depending on the focus error signal and the tracking error signal to drive a focus coil and a tracking coil of the biaxial mechanism in the optical pick-up 51. Thereby, a tracking servo loop and a focus servo loop by the optical pick-up 51, the matrix circuit 54, the servo circuit 61, and the biaxial mechanism are formed.

Furthermore, in response to a track jump command from the system controller 60, the servo circuit 61 turns off the tracking servo loop and outputs a jump drive signal to thereby make the related components carry out track jump operation.

In addition, the servo circuit 61 generates a sled drive signal based on a sled error signal obtained as the low-frequency component of the tracking error signal, access execution control from the system controller 60, and so forth, to drive the sled mechanism 53. The sled mechanism 53 has a mechanism formed of a main shaft for holding the optical pick-up 51, a sled motor, a transmission gear, and so forth, although not shown in the diagram. The sled mechanism 53 drives the sled motor in accordance with the sled drive signal, and thereby the requisite slide movement of the optical pick-up 51 is performed.

A spindle servo circuit 62 carries out control to cause the CLV rotation of the spindle motor 2.

The spindle servo circuit 62 obtains the clock generated by the PLL processing for the wobble signal as information on the present rotational velocity of the spindle motor 52, and compares the information with predetermined CLV reference velocity information to thereby generate a spindle error signal.

At the time of data reproduction, the reproduction clock (clock serving as the basis of decode processing) generated by the PLL in the reader/writer circuit 55 serves as the information on the present rotational velocity of the spindle motor 52. Thus, it is also possible for the spindle servo circuit 62 to generate the spindle error signal by comparing this information with the predetermined CLV reference velocity information.

The spindle servo circuit 62 outputs a spindle drive signal generated depending on the spindle error signal to cause the CLV rotation of the spindle motor 62.

In addition, the spindle servo circuit 62 generates the spindle drive signal in response to a spindle kick/brake control signal from the system controller 60 to thereby make the spindle motor 2 carry out also operation of activation, stop, acceleration, deceleration, etc.

Various kinds of operation of the above-described servo system and recording/reproduction system are controlled by the system controller 60 formed of a microcomputer.

The system controller 60 executes various kinds of processing in response to a command from the AV system 120.

For example, when a writing order (write command) is issued from the AV system 120, first the system controller 60 makes the optical pick-up 51 move to the address to which data should be written. Subsequently, the system controller 60 makes the ECC encoder/decoder 57 and the modulation/demodulation circuit 56 execute the encode processing for data (e.g. video data of any of various systems such as the MPEG2 and audio data) transferred from the AV system 120 in the above-described manner. Subsequently, the laser drive pulse from the reader/writer circuit 55 is supplied to the laser driver 63, and thereby recording is performed.

For example when a read command for requiring transfer of certain data (e.g. MPEG2 video data) recorded in the disk 1 is supplied from the AV system 120, first the system controller 60 carries out seek operation control with the aim of the indicated address. Specifically, the system controller 60 issues a command to the servo circuit 61 to make the optical pick-up 51 carry out access operation with targeting on the address specified by the seek command.

Thereafter, the system controller 60 carries out operation control necessary to transfer data of the indicated data leg to the AV system 120. That is, the system controller 60 performs data readout from the disk 1, and makes the reader/writer circuit 55, the modulation/demodulation circuit 56, and the ECC encoder/decoder 57 execute decode/buffering and so forth to transfer the requested data.

At the time of recording/reproducing of these data, the system controller 60 can control access and recording/reproduction operation by using the ADIP address detected by the wobble circuit 58 and the address decoder 59.

Furthermore, at a predetermined timing such as the timing of loading of the disk 1, the system controller 60 makes the related units perform readout of the unique ID recorded in the BCA of the disk 1 and the pre-recorded information (PIC) recorded in the reproduction-only area as the wobbling groove.

In this case, first the system controller 60 carries out seek operation control with the aim of the BCA and the PIC. Specifically, the system controller 60 issues a command to the servo circuit 61 to make the optical pick-up 51 carry out access operation to the disk innermost circumference side.

Thereafter, the system controller 60 makes the optical pick-up 51 perform reproduction tracing to obtain the push-pull signal as reflected-light information, and makes the wobble circuit 58, the reader/writer circuit 55, and the ECC encoder/decoder 57 execute decode processing. Thereby, the system controller 60 obtains reproduction data as the BCA information and the pre-recorded information.

The system controller 60 carries out laser power setting, copy protect processing, and so forth based on the BCA information and the pre-recorded information read out in this manner.

In FIG. 23, a cache memory 60*a* is shown in the system controller 60. This cache memory 60*a* is utilized for e.g. holding and updating of the TDFL/space bitmap read out from the TDMA in the disk 1.

When the disk 1 is loaded for example, the system controller 60 controls the respective units to make them perform readout of the TDFL/space bitmap recorded in the TDMA, and holds the read information in the cache memory 60*a*.

Thereafter, when alternation processing due to data rewriting or a defect is executed, the TDFL/space bitmap in the cache memory 60*a* is updated.

For example, the TDFL or the space bitmap may be additionally recorded in the TDMA in the disk 1 every time alternation processing is executed due to data writing, data rewriting, or the like and the space bitmap or the TDFL is updated. However, this scheme consumes the TDMA in the disk 1 fast.

To avoid this disadvantage, the TDFL/space bitmap is updated in the cache memory 60*a* during the period until the disk 1 is ejected from the disk drive device for example. At the time of the ejection or the like, the final (latest) TDFL/space bitmap in the cache memory 60*a* is written to the TDMA in the disk 1. Thus, updating on the disk 1 is so performed that a large number of times of updating of the TDFL/space bitmap are put together. This can reduce the consumption of the TDMA in the disk 1.

In the configuration example of the disk drive device of FIG. 23, the disk drive device is connected to the AV system 120. However, the disk drive device according to the embodiment of the present invention may be connected to e.g. a personal computer.

Alternatively, it is also possible to employ a form in which the disk drive device is not connected to another device. In this case, the disk drive device is provided with an operating unit and a display unit, and the configuration of the interface part for data input/output is different from that in FIG. 23. That is, recording and reproduction are performed in accordance with the operation by the user, and a terminal part for input/output of various kinds of data is formed.

Of course, a wide verity of other configuration examples will also be possible. For example, an example as a recording-only device or a reproduction-only device will also be available.

Figure 24:
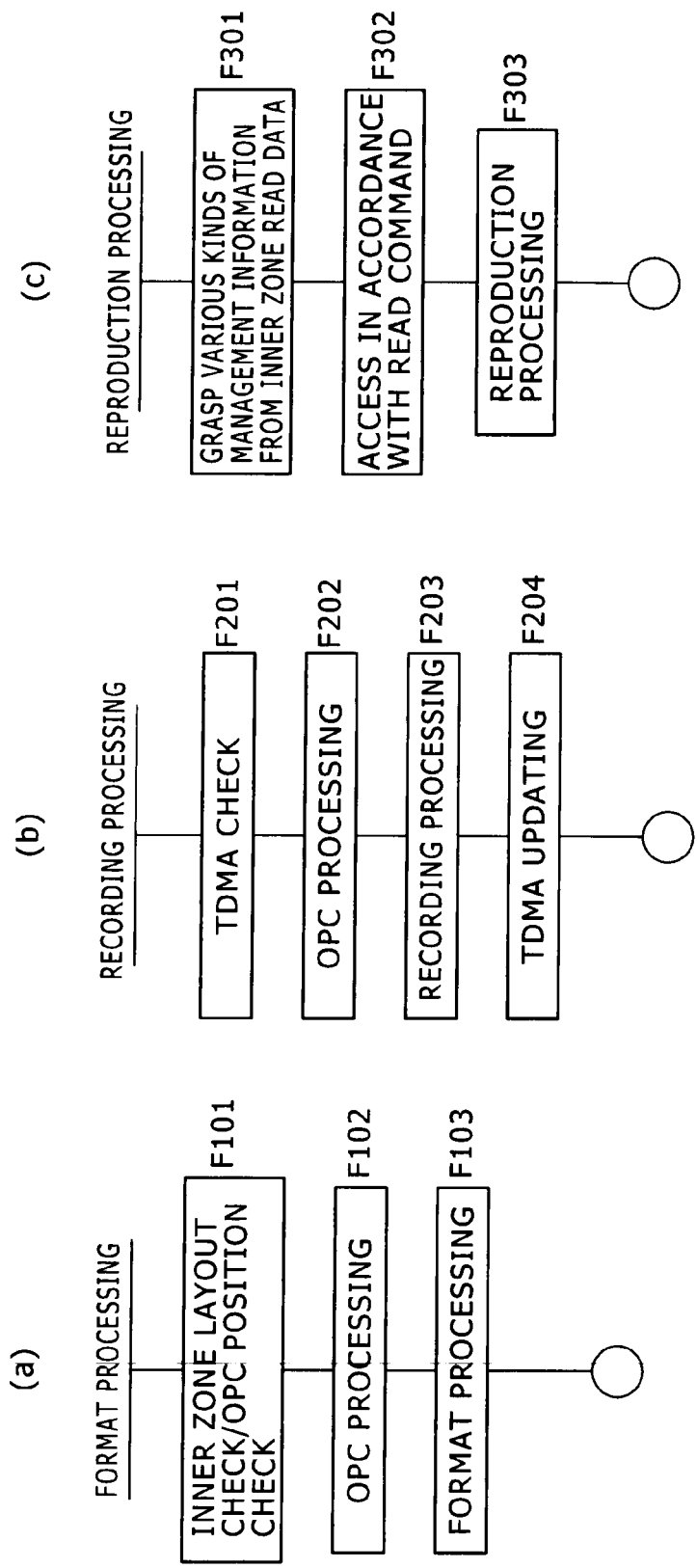
FIG. 24 is flowcharts of processing by the disk drive device of the embodiment.

FIG. 24 shows control processing examples of the system controller 60 for the operation of the disk drive device.

FIG. 24(a) shows format processing.

When an unformatted disk 1 is loaded and the format processing is executed, first the system controller 60 performs disk discrimination to check the inner zone layout and grasp the positions of the OPC areas.

A wide verity of methods are available regarding the technique of the disk discrimination. Although not described in detail here, the number of recording layers is determined when the disk 1 as the Blu-ray Disc is loaded for example. The following description will deal with processing when a triple-layer disk or a quadruple-layer disk is loaded.

The system controller 60 holds, in its internal memory, information on the area configuration of the inner zone described with FIG. 13 and FIG. 14 regarding the triple-layer disk and information on the area configuration of the inner zone described with FIG. 17 and FIG. 18 regarding the quadruple-layer disk.

In a step F101, the system controller 60 checks the positions of the OPC areas in the loaded disk 1 (triple-layer disk or quadruple-layer disk) from this information of the area configuration.

In a step F102, the system controller 60 executes OPC control processing. Specifically, the system controller 60 instructs the servo circuit 61 and the spindle circuit 62 to make the optical pick-up 54 access the OPC area. Furthermore, the system controller 60 makes the reader/writer circuit 55 supply a signal as an OPC test pattern to the laser driver 63, and makes the laser driver 63 perform test recording to the OPC area. Moreover, the system controller 60 performs reproduction from the OPC area in which the recording has been performed and obtains the evaluation values about a reproduction information signal, such as the jitter, the asymmetry, and the error rate, to determine the optimum recording laser power. Then the system controller 60 sets the laser power to the optimum power.

Thereafter, in a step F103, the system controller 60 controls recording operation as the format processing.

For example, the system controller 60 controls execution of e.g. recording operation of recording, in the TDDS, the addresses of the space bitmap, the TDFL, and so forth in the TDMA that is disposed in the recording layers in which the TDMA can be disposed with as even capacity as possible so that the structure of the TDMA can be grasped from the information of the TDDS from then on.

By such format processing, the disk 1 having the format of FIG. 13 or FIG. 17 is allowed to be used from then on.

FIG. 24(b) shows processing at the time of recording.

In recording operation for user data or management information, first in a step F201, the system controller 60 checks information on the TDMA to grasp the necessary items such as the TDDS, the defect list, the space bitmap, and the OPC area that can be used next.

Next, in a step F202, the system controller 60 makes the related units carry out OPC operation by using the OPC area, and sets the optimum recording laser power from the result of the OPC operation.

In a step F203, the system controller 60 makes the related units carry out recording operation for user data or the like.

After the recording, in a step F204, the system controller 60 updates the TDMA. Specifically, the system controller 60 newly records the TDMA resulting from updating of the necessary information among the pieces of information, such as the TDDS, the defect list, the space bitmap, and the OPC area that can be used next.

FIG. 24(c) shows processing at the time of reproduction.

In a step F301, the system controller 60 grasps various kinds of management information from read data such as the TDMA and the file system.

In a step F302, the system controller 60 makes the optical pick-up 51 access the intended address in accordance with a read command from the AV system 120, and makes the related units carry out reproduction operation in a step F303. Specifically, the system controller 60 performs data readout from the disk 1 and makes the reader/writer circuit 55, the modulation/demodulation circuit 56, and the ECC encoder/decoder 57 execute decode/buffering and so forth to transfer the requested data to the AV system 120.

The above description relates to the format processing, the recording processing, and the reproduction processing executed by the disk drive device for a triple-layer disk and a quadruple-layer disk.

Processing relating to the OPC operation when the disk 1 is a quadruple-layer disk will be described below.

As described above, in the quadruple-layer disk, the idea of the first OPC pair and the second OPC pair is introduced for four OPC areas. Furthermore, the apparent gap distance (gap distance between the beginnings of the parts to be used next) is ensured between two OPC areas in each pair, to thereby prevent the parts used in the OPC operation from overlapping with each other in the layer direction.

For example, in the above-described layout of FIG. 17 and FIG. 18, the apparent gap distances (AB1 and AB2 in FIG. 19) are usually ensured even when the offset of the layers is the worst within the allowable tolerance. However, for example regarding the first OPC pair, the possibility of the disappearance of the apparent gap distance (AB1) is not zero if the amount of consumption of OPC(L2) is too larger than that of OPC(L0). Thus, it is preferable that the disk drive device side also have ingenuity relating to the OPC operation processing for keeping the apparent gap distance.

Figure 25:
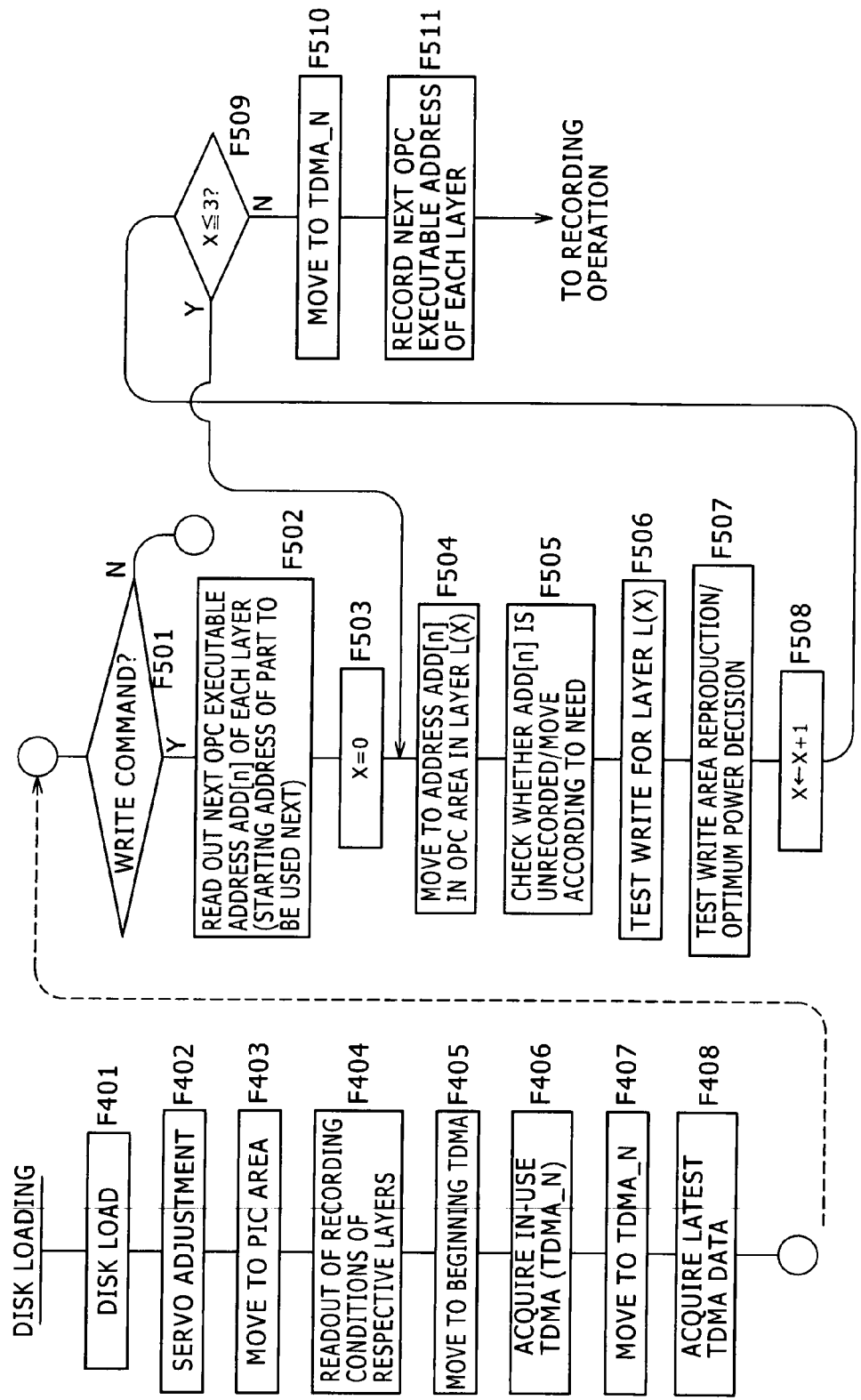
FIG. 25 is a flowchart of OPC processing by the disk drive device of the embodiment.
Figure 26:
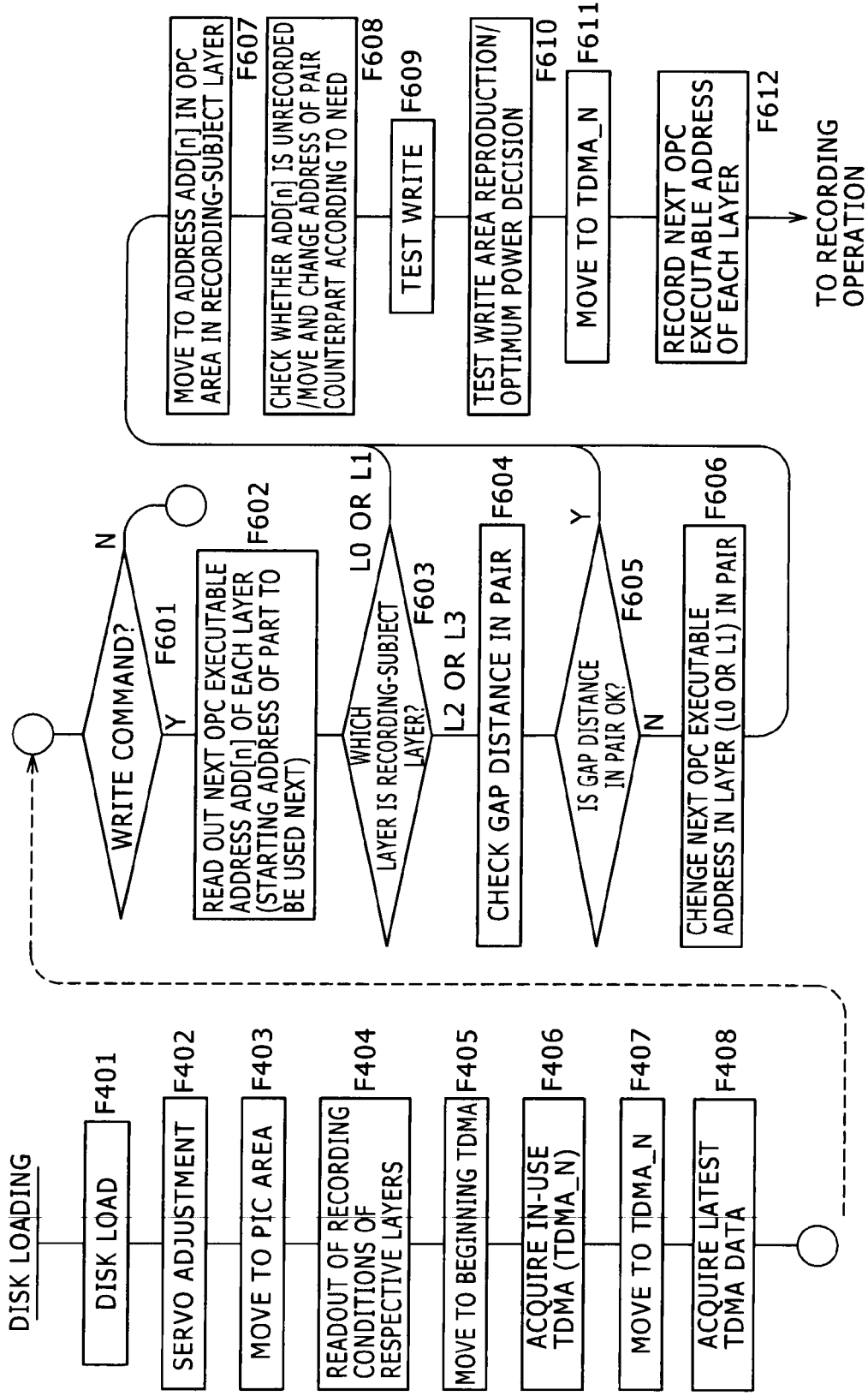
FIG. 26 is a flowchart of OPC processing by the disk drive device of the embodiment.

FIG. 25 and FIG. 26 to be described next each show a processing example of the disk drive device side for preventing the occurrence of a situation in which the apparent gap distance between the OPC areas in the pair disappears for each of the first OPC pair and the second OPC pair.

First, the processing example of FIG. 25 will be described below.

In FIG. 25, initially processing at the time of disk loading is shown as steps F401 to F408. The processing of the steps F401 to F408 is similarly executed also when the loaded disk 1 is a triple-layer disk. This processing is executed prior to the processing of FIGS. 24(a), (b), and (c) for example.

In the step F401, disk load is carried out. The system controller 60 detects disk insertion to control a disk loading mechanism (not shown in FIG. 23) and make the disk 1 enter such a state as to allow recording/reproduction driving by the optical pick-up 51 and the spindle motor 52 (chucking state).

In the step F402, servo adjustment is carried out. Specifically, the system controller 60 controls the activation of the spindle motor 52 and the servo start-up of the optical pick-up 51. The system controller 60 controls the spindle circuit 62 to obtain settlement to a predetermined rotational velocity, and controls the servo circuit 61 to make it carry out focus search, focus servo-on, tracking servo-on, and so forth, to thereby achieve the reproducible state.

Upon the completion of the start-up operation described so far, the system controller 60 makes the optical pick-up 51 access the PIC area in the disk 1 in the step F403. In the step F403, the system controller 60 makes the related units reproduce data in the PIC area to thereby perform read of PIC information such as the recording conditions of the respective recording layers.

Next, in the step F405, the system controller 60 makes the optical pick-up 51 access the beginning TDMA. As described above, the TDMA access indicator is provided in the beginning TDMA (e.g. TDMA#1 in FIG. 17). In the step F406, by making the related units reproduce the TDMA access indicator, the system controller 60 can discriminate the in-use TDMA (hereinafter, TDMA_N), in which the latest TDDS and so forth is recorded.

Subsequently, in the step F407, the system controller 60 makes the optical pick-up 51 access TDMA_N. In the step F408, the system controller 60 makes the related units reproduce this TDMA_N to read the latest TDMA data (the latest TDDS and so forth).

The end of the step F408 is equivalent to the completion of the management information read at the time of disk loading. From then on, the system controller 60 waits for a command from the host apparatus (AV system 120).

As an example in which the OPC processing is executed in response to issuing of a write command, processing of steps F501 to F511 will be described below.

An operation example is also possible in which the OPC operation about the respective recording layers is carried out after the management information read at the time of disk loading even if the issuing of the write command is absent.

The OPC processing example of the steps F501 to F511 in FIG. 25 is an example in which the OPC operation is carried out for each of the respective layers L0 to L3 in response to the write command.

Upon the issuing of the write command, the system controller 60 forwards the processing from the step F501 to the step F502, where the system controller 60 grasps the address ADD[n] at which the next OPC operation can be carried out about the OPC areas in the respective layers. This address ADD[n] is indicated as the OPC operation executable address (Next available Ln OPC Address) in the above-described TDDS.

About each of the respective OPC areas (OPC(L0), OPC (L1), OPC(L2), OPC(L3)), the system controller 60 grasps the address ADD[n] from the latest TDDS from which the address ADD[n], at which the next OPC operation can be carried out, has been already read.

In the step F503, the system controller 60 sets a variable X indicating the layer to 0. Subsequently, in the steps F504 to F509, the system controller 60 makes the related units carry out the OPC operation in the OPC areas in the respective layers (OPC(L0), OPC(L1), OPC(L2), OPC(L3)).

In the step F504, the system controller 60 makes the optical pick-up 51 access the address ADD[n] of the part to be used next in the OPC area in layer L(X) (OPC(L(X))).

In the step F505, the system controller 60 checks whether this address ADD[n] is surely unrecorded (i.e. whether the address ADD[n] can be used for the OPC operation). For example, the system controller 60 makes the related units perform reproduction from the address ADD[n] to check whether the recording is present or absent at this address ADD[n]. If the part from this address ADD[n] has been used, the system controller 60 seeks an unused part and causes movement to this unused part.

In the step F506, the system controller 60 instructs the respective requisite units of the recording system (the ECC encoder/decoder 57, the modulation/demodulation circuit 56, the reader/writer circuit 55, the laser driver 63, and so forth) to execute test write in the part from the address ADD[n]. For example, the system controller 60 makes these units carry out data recording operation by a predetermined test pattern, random data, or the like with stepwise variation in the recording laser power.

After the end of the test write, in the step F507, the system controller 60 makes the part in which the test write has been executed be reproduced by the optical pick-up 51. At this time, the system controller 60 measures the index values (e.g. the jitter, the asymmetry, the error rate, and the SAM value) corresponding to the respective values of the recording laser power, and decides the optimum recording laser power.

The system controller 60 increments the variable X in the step F508. If the variable X is equal to or smaller than 3 in the step F509, the processing returns to the step F504.

Therefore, the steps F504 to F507 are carried out with increment of the variable X. That is, the OPC operation is carried out in OPC(L0), OPC(L1), OPC(L2), and OPC(L3) sequentially.

At the timing of the completion of the above-described OPC operation in four OPC areas, the optimum recording laser power has been decided for each of the respective layers L0 to L3. At this timing, the processing proceeds from the step F509 to the step F510.

In the step F510, the system controller 60 makes the optical pick-up 51 access TDMA_N. In the step F511, the system controller 60 updates the OPC operation executable address (Next available Ln OPC Address) for each of the respective layers L0 to L3. Specifically, because the OPC operation of this time causes change of the address of the part to be used next in each layer, the latest TDDS in which a new "Next available Ln OPC Address" is described for each layer is recorded in TDMA_N.

As above, the OPC operation is completed. Thereafter, recording operation ordered by the write command is carried out with the optimum recording laser power.

In the processing of FIG. 25, as one example for description, actual data recording is performed after the TDDS recording processing in the steps F510 and F511. However, the actual updating of the TDDS on the disk 1 may be performed at a timing after the end of data recording or the timing of disk ejection, power-off, or the like. This is to suppress unnecessary consumption of the TDMA area.

That is, the timing of the TDDS updating on the disk 1 does not need to be the timing shown as the steps F510 and F511. Thus, this processing of the steps F510 and F511 may be regarded as processing in which the system controller 60 stores new TDDS information (in this case, "Next available Ln OPC Address") in the internal memory for at least TDDS recording at a later timing.

The above-described OPC operation is one example. In this example, the amounts of consumption of OPC(L0), OPC (L1), OPC(L2), and OPC(L3) are always equal to each other because the OPC operation is carried out for all the layers in response to the write command. Even though the amounts are not equal to each other in a precise sense because of the occurrence of OPC retry or the like attributed to any error, the amounts can be regarded as being almost equal to each other.

Thus, "catching up" of the amount of consumption, by which the apparent gap distance disappears between two OPC areas in the pair, never occurs.

For example, a consideration will be made below about two OPC areas (OPC(L0) and OPC(L2)) in the pair described with FIG. 20. The address of the part to be used next (Next available Ln OPC Address) in OPC(L0), which is the chaser side in the consumption direction, and the address of the part to be used next (Next available Ln OPC Address) in OPC(L2), which is the chased side, proceed toward the disk inner circumference with almost equal amounts of consumption. Therefore, it can be said that the possibility of the "catching up," i.e. the possibility that the apparent gap distance AB1 becomes shorter than 150 μm as the allowable tolerance of the offset of the recording layers and disappears, is substantially zero.

The execution of the OPC operation for all the layers in response to every write command can be regarded also as unnecessary consumption of the OPC areas. Thus, e.g. the following processing way will also be available. Specifically, the OPC processing like that of FIG. 25 is executed only at the time of the first OPC operation after disk loading, and the OPC operation is not carried out at a later write command timing.

In this case, to address change over time, temperature change, and so forth, it will also be possible that the OPC processing for all the layers is executed not in response to every write command but e.g. after the elapse of a predetermined time according to need.

Next, with FIG. 26, a description will be made below about a processing example in which the OPC operation is carried out only for the layer in which recording will be performed in response to a write command.

Steps F401 to F408 in FIG. 26 are steps of the same processing at the time of disk loading as that in FIG. 25, and therefore overlapping description thereof is omitted.

The following description will deal with processing of steps F601 to F612 as an example in which the OPC processing is executed in response to issuing of the write command.

Upon the issuing of the write command, the system controller 60 forwards the processing from the step F601 to the step F602, where the system controller 60 grasps the address ADD[n] at which the next OPC operation can be carried out about the OPC areas in the respective layers. This address ADD[n] is indicated as the OPC operation executable address (Next available Ln OPC Address) in the above-described TDDS.

About each of the respective OPC areas (OPC(L0), OPC (L1), OPC(L2), OPC(L3)), the system controller 60 grasps the address ADD[n] from the latest TDDS from which the address ADD[n], at which the next OPC operation can be carried out, has been already read.

In the step F603, the system controller 60 discriminates the layer as the subject of the data recording ordered by the write command of this time.

The processing diverges to different courses depending on whether the subject layer is layer L0 or L1 or it is layer L2 or L3.

Layer L0 or L1 is the layer in which the OPC area (OPC (L0), OPC(L1)) is the chased side in the pair in the consumption direction.

Layer L2 or L3 is the layer in which the OPC area (OPC (L2), OPC(L3)) is the chaser side in the pair in the consumption direction.

First, the case in which the subject layer of the recording is layer L0 or L1 will be described below.

In this case, the system controller 60 forwards the processing to the step F607, where the system controller 60 makes the optical pick-up 51 access the address ADD[n] of the part to be used next in the OPC area in the subject layer. For example, if layer L1 is the layer of the recording subject, the system controller 60 makes the optical pick-up 51 access the address ADD[n] in OPC(L1).

In the step F608, the system controller 60 checks whether this address ADD[n] is surely unrecorded (i.e. whether the address ADD[n] can be used for the OPC operation). For example, the system controller 60 makes the related units perform reproduction from the address ADD[n] to check whether the recording is present or absent at this address ADD[n]. If the part from this address ADD[n] has been used, the system controller 60 seeks an unused part and causes movement to this unused part.

In the step F609, the system controller 60 instructs the respective requisite units of the recording system to execute test write in the part from the address ADD[n]. For example, the system controller 60 makes these units carry out data recording operation by a predetermined test pattern, random data, or the like with stepwise variation in the recording laser power.

After the end of the test write, in the step F610, the system controller 60 makes the part in which the test write has been executed be reproduced by the optical pick-up 51. At this time, the system controller 60 measures the index values (e.g. the jitter, the asymmetry, the error rate, and the SAM value) corresponding to the respective values of the recording laser power, and decides the optimum recording laser power.

In the step F611, the system controller 60 makes the optical pick-up 51 access TDMA_N. In the step F612, the system controller 60 updates the OPC operation executable address (Next available Ln OPC Address) for the layer in which the OPC operation has been carried out. Specifically, because the OPC operation of this time causes change of the address of the part to be used next in the OPC area in this layer, the latest TDDS in which a new "Next available Ln OPC Address" is described for each layer is recorded in TDMA_N.

The end of the step F612 is equivalent to the completion of the OPC operation. Thereafter, recording operation ordered by the write command is carried out with the optimum recording laser power.

Similarly to the processing of FIG. 25, the actual TDDS updating on the disk 1 does not need to be performed at the timing of the steps F611 and F612. Thus, this processing of the steps F611 and F612 may be regarded as processing in which the system controller 60 stores new TDDS information (in this case, "Next available Ln OPC Address" in the subject layer) in the internal memory for at least TDDS recording at a later timing.

As just described, the OPC processing is normally executed in accordance with "Next available Ln OPC Address" if the layer of the recording subject is layer L0 or L1 and the OPC area as the chased side in the pair (OPC(L0) or OPC(L1)) is used in the OPC operation in this layer.

On the other hand, if the layer of the recording subject is layer L2 or L3 and the OPC area as the chaser side in the pair (OPC(L2) or OPC(L3)) is used in the OPC operation in this layer, processing to prevent the occurrence of "catching up" of the OPC area consumption is added.

This is processing of the steps F604 to F606.

If the layer of the recording subject is layer L2 or L3, the system controller 60 forwards the processing from the step F603 to the step F604.

In this step, the system controller 60 checks the apparent gap distance in the pair.

The following description will deal with the case in which the layer of the recording subject is layer L2.

At the timing of this step F604, the system controller 60 obtains the apparent gap distance AB1 in the pair shown in FIG. 19. Specifically, the system controller 60 obtains the address difference between the address ADD[n] in OPC(L2) and the address ADD[n] in OPC(L0) in the same pair, which are checked in the step F602, and converts the address difference into the gap distance along the radial direction.

It is appropriate in terms of obtaining of the gap distance AB1 after the OPC of this time that the address ADD[n] in OPC(L2) is not directly used as it is but the address obtained by address forwarding from the address ADD[n] by the predetermined number of sectors used in the OPC operation of this time is used.

The system controller 60 determines whether or not a predetermined gap distance can be kept as the apparent gap distance AB1 in this pair. Specifically, the system controller 60 determines whether or not a gap distance of at least 150 µm, which is equivalent to the allowable tolerance of the above-described layer overlapping error, is ensured.

If the gap distance AB1 equal to or longer than the allowable tolerance is ensured, the system controller 60 forwards the processing from the step F605 to the step F607, and carries out the OPC operation of this time from the address ADD[n] in OPC(L2) in layer L2 (F607 to F610). Subsequently, in TDMA_N, the system controller 60 performs TDDS writing (or storing for later TDDS writing) for updating the OPC operation executable address (Next available Ln OPC Address) about layer L2, in which the OPC operation of this time is carried out (F611, F612).

Thereafter, recording operation ordered by the predetermined write command for layer L2 is carried out with the optimum recording laser power.

On the other hand, if it is determined in the step F605 that the predetermined gap distance cannot be ensured as the apparent gap distance AB1 in the pair, the system controller 60 forwards the processing to the step F606, where the system controller 60 executes processing of changing the OPC operation executable address (Next available Ln OPC Address) about OPC(L0) in layer L0, which is the counterpart of the pair.

This is processing of forwarding the part to be used next in OPC(L0) as the chased side in the consumption direction because the sufficient gap distance AB1 is lost when the OPC area as the chaser side (OPC(L2)) is used in the OPC operation of this time. In the case of OPC(L0), the OPC operation executable address (Next available Ln OPC Address) is forwarded toward the inner circumference by a predetermined amount in this processing.

The system controller 60 newly sets the OPC operation executable address (Next available Ln OPC Address) about OPC(L0) and stores it in the internal memory, followed by processing forwarding to the step F607.

In the steps F607 to F610, the OPC operation for layer L2 as the subject is carried out.

In the subsequent steps F611 and F612, the system controller 60 executes processing for updating of the OPC operation executable address (Next available Ln OPC Address) about layer L2, in which the OPC operation is carried out this time, and the OPC operation executable address (Next available Ln OPC Address) changed about layer L0. That is, the system controller 60 performs TDDS writing or storing for later TDDS writing.

Thereafter, recording operation ordered by the predetermined write command for layer L2 is carried out with the optimum recording laser power.

In the above-described example, layer L2 is the layer of the recording subject. Also when layer L3 is the recording subject, the same processing is executed in the relationship with layer L1.

As described above, in the example of FIG. 26, the OPC operation for the subject layer is carried out in response to a write command, and at this time the processing for keeping a gap distance of at least 150 µm equivalent to the allowable tolerance as the apparent gap distance in the pair is executed.

Specifically, when the OPC area as the chaser side in the pair is used, the system controller 60 determines whether or not the necessary gap distance (at least 150 µm) dependent on the allowable tolerance relating to overlapping of the respective recording layers is ensured as the apparent gap distance. If the necessary gap distance cannot be ensured, the system controller 60 executes processing of changing the start position of the part to be used next in the OPC area as the chased side.

This processing prevents overlapping of the parts to be used next in the OPC areas in the layer direction in the first OPC pair and the second OPC pair even if the offset of the recording layers is the maximum within the allowable tolerance.

In the example of FIG. 26, the apparent gap distance is checked when the OPC area as the chaser side is used. Alternatively, in the OPC operation, processing of checking the apparent gap distance may be executed irrespective of the OPC area to be used. Of course, also in this case, one OPC operation executable address (Next available Ln OPC Address) is changed according to need.

In the example of FIG. 26, the processing of changing the OPC operation executable address (Next available Ln OPC Address) is executed when the OPC area as the chaser side is used. Similarly, the processing of changing the OPC operation executable address (Next available Ln OPC Address) may be executed when the OPC area as the chased side is used.

In the example of FIG. 26, the OPC operation executable address (Next available Ln OPC Address) is acquired from the TDDS in the step F602. Alternatively, it will also be possible to seek the OPC operation executable address through search for the unrecorded part in the OPC area. Therefore, in the step F606, processing for regarding the unrecorded part generated due to the processing of changing the OPC operation executable address (Next available Ln OPC Address) as the already-recorded area, or processing of setting the length of the unrecorded area shorter than the predetermined length may be added.

The disk of the embodiment of the present invention and the disk drive device capable of dealing with the disk have been described above. However, the present invention is not limited to these examples but various modification examples may be made without departing from the scope of the present invention.

EXPLANATION OF REFERENCE NUMERALS

1: Disk, 51: Pick-up, 52: Spindle motor, 53: Sled mechanism, 54: Matrix circuit, 55: Reader/writer circuit, 56: Modulation/demodulation circuit, 57: ECC encoder/decoder, 58: Wobble circuit, 59: Address decoder, 60: System controller, 60*a*: Cache memory, 61: Servo circuit, 62: Spindle servo circuit, 63: Laser driver, 120: AV system, 201: Disk substrate, 203: Optically-transparent layer, 204: Intermediate layer

The invention claimed is:

1. A recordable optical disk comprising:
four recording layers configured to be provided over a disk substrate; and
an optically-transparent layer configured to be formed on a laser-incident surface side, wherein
four test areas for laser power control are each provided in an inner circumference side area closer to an inner circumference than a data zone in which user data is recorded in a respective one of the recording layers, the test areas of a first pair and the test areas of a second pair are so disposed as to be prevented from overlapping with each other in a layer direction if two test areas closer to a disk outer circumference, of the four test areas, are defined as the first pair and two test areas closer to a disk inner circumference, of the four test areas, are defined as the second pair, the two test areas of the first pair have the same consumption direction of the test area, and are so disposed that parts to be used next in the test areas are prevented from overlapping with each other in the layer direction, the two test areas of the second pair have the same consumption direction of the test area opposite to the consumption direction of the test area in the first pair, and are so disposed that parts to be used next in the test areas are prevented from overlapping with each other in the layer direction, the optical disk has a diameter of 12 cm, each of the test areas is formed with a radial width of about 250 μm in a range of 22.5 mm to 24.0 mm as a range of a radial position of the optical disk, the recording layers are so formed that a relative error in a radial position of the recording layers is within a tolerance of about 150 μm, an innermost circumference radial position of the test areas of the first pair and an outermost circumference radial position of the test areas of the second pair are disposed at positions that do not overlap with each other in the layer direction and have a gap distance of at least about 150 μm along a radial direction if the relative error in the radial position is zero, the two test areas of the first pair are formed at positions that do not overlap with each other in the layer direction and have a gap distance of at least about 50 μm along the radial direction if the relative error in the radial position is zero, and the two test areas of the second pair are formed at positions that do not overlap with each other in the layer direction and have a gap distance of at least about 50 μm along the radial direction if the relative error in the radial position is zero.

2. The recordable optical disk according to claim 1, wherein the two test areas of the first pair have the same consumption direction of the test area as a first consumption direction, and the test area in the recording layer closer to the disk substrate, of the two test areas of the first pair, is located ahead of the test area in the recording layer closer to a laser-incident surface, of the two test areas of the first pair, in the first consumption direction.

3. The recordable optical disk according to claim 1, wherein the two test areas of the second pair have the same consumption direction of the test area as a second consumption direction opposite to the first consumption direction, and the test area in the recording layer closer to the disk substrate, of the two test areas of the second pair, is located ahead of the test area in the recording layer closer to the laser-incident surface, of the two test areas of the second pair, in the second consumption direction.

4. The recordable optical disk according to claim 1, wherein a management information recording/reproduction area for recording and reproduction of management information is provided in the inner circumference side area in each of the recording layers, and the management information recording/reproduction areas are so disposed that, for each of the test areas in the recording layers, the number of management information recording/reproduction areas overlapping with the test area in the layer direction at a position closer to a laser-incident surface than the test area is equal to or smaller than one.

5. The recordable optical disk according to claim 4, wherein the management information recording/reproduction areas are each so disposed as to be prevented from overlapping with the test areas in the recording layers in the layer direction on a disk substrate side of the test areas.

6. The recordable optical disk according to claim 4, wherein the management information recording/reproduction area includes a definitive management information area in which latest management information is stored, and the definitive management information areas are so disposed as to be separated from each other by at least a distance equivalent to an allowable defect size in all of the recording layers.

7. The recordable optical disk according to claim 4, wherein the management information recording/reproduction area includes a temporary management information area in which management information is additionally stored on an as-needed basis, and the temporary management information area is disposed in the recording layers except the recording layer closest to the disk substrate substantially evenly.

8. A recording device for a recordable optical disk that includes four recording layers provided over a disk substrate and an optically-transparent layer formed on a laser-incident surface side, the recording device comprising:

a controller configured to dispose a test area for laser power control in an inner circumference side area closer to an inner circumference than a data zone in which user data is recorded in each of the recording layers of the recordable optical disk in such a way that the test areas of a first pair and the test areas of a second pair are prevented from overlapping with each other in a layer direction if two test areas closer to a disk outer circumference, of four test areas formed in the recording layers, are defined as the first pair and two test areas closer to a disk inner circumference, of the four test areas, are defined as the second pair, the controller carrying out control to perform information recording after laser power adjustment by use of the disposed test area, wherein the two test areas of the first pair have the same consumption direction of the test area, and are so disposed that parts to be used next in the test areas are prevented from overlapping with each other in the layer direction, the two test areas of the second pair have the same consumption direction of the test area opposite to the consumption direction of the test area in the first pair, and are so disposed that parts to be used next in the test areas are prevented from overlapping with each other in the layer direction, the optical disk has a diameter of 12 cm, each of the test areas is formed with a radial width of about 250 μm in a range of 22.5 mm to 24.0 mm as a range of a radial position of the optical disk, the recording layers are so formed that a relative error in a radial position of the recording layers is within a tolerance of about 150 μm, an innermost circumference radial position of the test areas of the first pair and an outermost circumference radial position of the test areas of the second pair are disposed at positions that do not overlap with each other in the layer direction and have a gap distance of at least about 150 μm along a radial direction if the relative error in the radial position is zero, the two test areas of the first pair are formed at positions that do not overlap with each other in the layer direction and have a gap distance of at least about 50 μm along the radial direction if the relative error in the radial position is zero, and the two test areas of the second pair are formed at positions that do not overlap with each other in the layer direction and have a gap distance of at least about 50 μm along the radial direction if the relative error in the radial position is zero.

9. The recording device according to claim 8, wherein the controller carries out control relating to test write for laser power adjustment so that parts to be used next in the test areas are prevented from overlapping with each other in the layer direction for the two test areas in each of the first pair and the second pair.

10. The recording device according to claim 9, wherein the controller determines whether or not a necessary gap distance dependent on an allowable tolerance relating to overlapping of the recording layers is ensured as a gap distance between the part to be used next in one of the test areas and the part to be used next in the other of the test areas about two test areas in a pair as the first pair or the second pair, and the controller executes processing of changing a start position of the part to be next used in at least one of the test areas if the necessary gap distance is not ensured, to thereby prevent the parts to be used next in the test areas from overlapping with each other in the layer direction for the two test areas in the pair.

11. A recording device for a recordable optical disk that includes four recording layers provided over a disk substrate and an optically-transparent layer formed on a laser-incident surface side, four test areas for laser power control being each provided in an inner circumference side area closer to an inner circumference than a data zone in which user data is recorded in a respective one of the recording layers, the test areas of a first pair and the test areas of a second pair being so disposed as to be prevented from overlapping with each other in a layer direction if two test areas closer to a disk outer circumference, of the four test areas, are defined as the first pair and two test areas closer to a disk inner circumference, of the four test areas, are defined as the second pair, a management information recording/reproduction area for recording and reproduction of management information being provided in the inner circumference side area in each of the recording layers, the management information recording/reproduction areas being so disposed that, for each of the test areas in the recording layers, the number of management information recording/reproduction areas overlapping with the test area in the layer direction at a position closer to a laser-incident surface than the test area is equal to or smaller than one, the recording device comprising
a controller configured to manage, of the management information recording/reproduction area, a temporary management information area that is so disposed that capacity is substantially even in the recording layers in which the temporary management information area is allowed to be disposed, the controller carrying out control to record management information of alternation recording by using the temporary management information area, the two test areas of the second pair have the same consumption direction of the test area opposite to the consumption direction of the test area in the first pair, and are so disposed that parts to be used next in the test areas are prevented from overlapping with each other in the layer direction, the optical disk has a diameter of 12 cm, each of the test areas is formed with a radial width of about 250 μm in a range of 22.5 mm to 24.0 mm as a range of a radial position of the optical disk, the recording layers are so formed that a relative error in a radial position of the recording layers is within a tolerance of about 150 μm, an innermost circumference radial position of the test areas of the first pair and an outermost circumference radial position of the test areas of the second pair are disposed at positions that do not overlap with each other in the layer direction and have a gap distance of at least about 150 μm along a radial direction if the relative error in the radial position is zero, the two test areas of the first pair are formed at positions that do not overlap with each other in the layer direction and have a gap distance of at least about 50 μm along the radial direction if the relative error in the radial position is zero, and the two test areas of the second pair are formed at positions that do not overlap with each other in the layer direction and have a gap distance of at least about 50 μm along the radial direction if the relative error in the radial position is zero.

12. A recording method for a recordable optical disk that includes four recording layers provided over a disk substrate and an optically-transparent layer formed on a laser-incident surface side, the recording method comprising the step of:

disposing a test area for laser power control in an inner circumference side area closer to an inner circumference than a data zone in which user data is recorded in each of the recording layers of the recordable optical disk in such a way that the test areas of a first pair and the test areas of a second pair are prevented from overlapping with each other in a layer direction if two test areas closer to a disk outer circumference, of four test areas formed in the recording layers, are defined as the first pair and two test areas closer to a disk inner circumference, of the four test areas, are defined as the second pair, and performing information recording after laser power adjustment by use of the disposed test area, wherein the two test areas of the first pair have the same consumption direction of the test area, and are so disposed that parts to be used next in the test areas are prevented from overlapping with each other in the layer direction, wherein the two test areas of the second pair have the same consumption direction of the test area opposite to the consumption direction of the test area in the first pair, and are so disposed that parts to be used next in the test areas are prevented from overlapping with each other in the layer direction, the optical disk has a diameter of 12 cm, each of the test areas is formed with a radial width of about 250 μm in a range of 22.5 mm to 24.0 mm as a range of a radial position of the optical disk, the recording layers are so formed that a relative error in a radial position of the recording layers is within a tolerance of about 150 μm, an innermost circumference radial position of the test areas of the first pair and an outermost circumference radial position of the test areas of the second pair are disposed at positions that do not overlap with each other in the layer direction and have a gap distance of at least about 150 μm along a radial direction if the relative error in the radial position is zero, the two test areas of the first pair are formed at positions that do not overlap with each other in the layer direction and have a gap distance of at least about 50 μm along the radial direction if the relative error in the radial position is zero, and the two test areas of the second pair are formed at positions that do not overlap with each other in the layer direction and have a gap distance of at least about 50 μm along the radial direction if the relative error in the radial position is zero.

13. The recording method according to claim 12, wherein test write for laser power adjustment is so performed that parts to be used next in the test areas are prevented from overlapping with each other in the layer direction for the two test areas in each of the first pair and the second pair.

14. The recording method according to claim 13, further comprising the steps of:

determining whether or not a necessary gap distance dependent on an allowable tolerance relating to overlapping of the recording layers is ensured as a gap distance between the part to be used next in one of the test areas and the part to be used next in the other of the test areas about two test areas in a pair as the first pair or the second pair; and executing processing of changing a start position of the part to be next used in at least one of the test areas if the necessary gap distance is not ensured, to thereby prevent the parts to be used next in the test areas from overlapping with each other in the layer direction for the two test areas in the pair.

15. A recording method for a recordable optical disk that includes four recording layers provided over a disk substrate and an optically-transparent layer formed on a laser-incident surface side, four test areas for laser power control being each provided in an inner circumference side area closer to an inner circumference than a data zone in which user data is recorded in a respective one of the recording layers, the test areas of a first pair and the test areas of a second pair being so disposed as to be prevented from overlapping with each other in a layer direction if two test areas closer to a disk outer circumference, of the four test areas, are defined as the first pair and two test areas closer to a disk inner circumference, of the four test areas, are defined as the second pair, a management information recording/reproduction area for recording and reproduction of management information being provided in the inner circumference side area in each of the recording layers, the management information recording/reproduction areas being so disposed that, for each of the test areas in the recording layers, the number of management information recording/reproduction areas overlapping with the test area in the layer direction at a position closer to a laser-incident surface than the test area is equal to or smaller than one, the recording method comprising the step of managing, of the management information recording/reproduction area, a temporary management information area that is so disposed that capacity is substantially even in the recording layers in which the temporary management information area is allowed to be disposed, and recording management information of alternation recording by using the temporary management information area, wherein the two test areas of the second pair have the same consumption direction of the test area opposite to the consumption direction of the test area in the first pair, and are so disposed that parts to be used next in the test areas are prevented from overlapping with each other in the layer direction, the optical disk has a diameter of 12 cm, each of the test areas is formed with a radial width of about 250 μm in a range of 22.5 mm to 24.0 mm as a range of a radial position of the optical disk, the recording layers are so formed that a relative error in a radial position of the recording layers is within a tolerance of about 150 μm, an innermost circumference radial position of the test areas of the first pair and an outermost circumference radial position of the test areas of the second pair are disposed at positions that do not overlap with each other in the layer direction and have a gap distance of at least about 150 μm along a radial direction if the relative error in the radial position is zero, the two test areas of the first pair are formed at positions that do not overlap with each other in the layer direction and have a gap distance of at least about 50 μm along the radial direction if the relative error in the radial position is zero, and the two test areas of the second pair are formed at positions that do not overlap with each other in the layer direction and have a gap distance of at least about 50 μm along the radial direction if the relative error in the radial position is zero.

* * * * *

UNITED STATES PATENT AND TRADEMARK OFFICE
CERTIFICATE OF CORRECTION

| | | |
|---|---|---|
| PATENT NO. | : 8,811,140 B2 | Page 1 of 1 |
| APPLICATION NO. | : 13/060606 | |
| DATED | : August 19, 2014 | |
| INVENTOR(S) | : Yoshihiro Akimoto et al. | |

It is certified that error appears in the above-identified patent and that said Letters Patent is hereby corrected as shown below:

On the title page, Item (75), the Inventors' cities of residence information is incorrect. Item (75) should read:

--(75) Inventors: Yoshihiro Akimoto, Chiba (JP);
Shoei Kobayashi, Kanagawa (JP);
Motoshi Ito, Kadoma (JP);
Yasumori Hino, Kadoma (JP);
Hiroyasu Inoue, Nagano (JP);
Harukazu Miyamoto, Tokyo (JP);
Koichiro Nishimura, Kanagawa (JP);
Sung-hee Hwang, Suwon-si (KR);
In-oh Hwang, Seongnam-si (KR)--

Signed and Sealed this
Thirty-first Day of March, 2015

Michelle K. Lee
*Director of the United States Patent and Trademark Office*